United States Patent
Liu et al.

(10) Patent No.: US 12,520,494 B2
(45) Date of Patent: *Jan. 6, 2026

(54) THREE-DIMENSIONAL MEMORY DEVICE, MANUFACTURING METHOD THEREOF, AND MEMORY SYSTEM

(71) Applicant: YANGTZE MEMORY TECHNOLOGIES CO., LTD., Wuhan (CN)

(72) Inventors: Jiayi Liu, Wuhan (CN); Tingting Gao, Wuhan (CN); Changzhi Sun, Wuhan (CN); Xiaolong Du, Wuhan (CN); Xiaoxin Liu, Wuhan (CN); Zhiliang Xia, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 414 days.

This patent is subject to a terminal disclaimer.

(21) Appl. No.: 18/090,374

(22) Filed: Dec. 28, 2022

(65) Prior Publication Data

US 2024/0130130 A1    Apr. 18, 2024

Related U.S. Application Data

(63) Continuation of application No. PCT/CN2022/125342, filed on Oct. 14, 2022.

(51) Int. Cl.
*H10B 43/35* (2023.01)
*H10B 41/27* (2023.01)
(Continued)

(52) U.S. Cl.
CPC ............. *H10B 43/35* (2023.02); *H10B 41/27* (2023.02); *H10B 41/35* (2023.02); *H10B 43/27* (2023.02)

(58) Field of Classification Search
CPC .. H10D 30/0411; H10D 30/693; H10B 41/27; H10B 41/35; H10B 41/40; H10B 43/20; H10B 43/27; H10B 43/35
See application file for complete search history.

(56) References Cited

U.S. PATENT DOCUMENTS

| | | |
|---|---|---|
| 8,981,450 B2 | 3/2015 | Shin |
| 9,972,640 B1 | 5/2018 | Kai et al. |

(Continued)

FOREIGN PATENT DOCUMENTS

| | | |
|---|---|---|
| CN | 113410251 A | 9/2021 |
| JP | 2009206451 A | 9/2009 |
| KR | 10-2022-0039045 A | 3/2022 |

OTHER PUBLICATIONS

Extended European Search Report issued in corresponding European Application No. 22961781.6, mailed Sep. 30, 2025, 17 pages

*Primary Examiner* — Brook Kebede
(74) *Attorney, Agent, or Firm* — BAYES PLLC

(57) ABSTRACT

The present disclosure provides a three-dimensional memory device and a manufacturing method thereof. The three-dimensional memory device comprises: a plurality of stacked layers; a storage channel structure vertically penetrating the stacked layers and comprising a first channel layer; a select gate structure on the plurality of stacked layers and comprising a conductive layer sandwiched between two dielectric layers; and a select channel structure vertically penetrating the select gate structure and comprising a second channel layer.

20 Claims, 67 Drawing Sheets

(51) Int. Cl.
*H10B 41/35* (2023.01)
*H10B 43/27* (2023.01)

(56) References Cited

U.S. PATENT DOCUMENTS

| | | |
|---|---|---|
| 10,297,610 B2 | 5/2019 | Kai et al. |
| 11,309,436 B2 | 4/2022 | Lee et al. |
| 2017/0287928 A1 | 10/2017 | Kanamori et al. |
| 2020/0075728 A1 | 3/2020 | Sato |
| 2020/0395375 A1* | 12/2020 | Huo ............... H10B 43/27 |
| 2021/0143160 A1 | 5/2021 | Ryu et al. |
| 2022/0037350 A1 | 2/2022 | Billingsley et al. |
| 2022/0336347 A1* | 10/2022 | Lai ............... H01L 23/5226 |

* cited by examiner

THREE-DIMENSIONAL MEMORY DEVICE, MANUFACTURING METHOD THEREOF, AND MEMORY SYSTEM

CROSS-REFERENCE TO RELATED APPLICATIONS

This application is a continuation of International Application No. PCT/CN2022/125342, filed on Oct. 14, 2022, which is incorporated herein by reference in its entirety.

TECHNICAL FIELD

The present disclosure relates to the field of semiconductor technology. In particular, the present disclosure relates to a three-dimensional memory device, a manufacturing method thereof and a memory system.

BACKGROUND

The increase of storage density of memory devices relates closely to advancements of semiconductor manufacturing process. In order to further increase storage density, three-dimensional memory devices have been developed. A three-dimensional memory device includes stacked layers formed by a plurality of gate conductor layers and dielectric layers stacked alternatively, and a storage channel structure penetrating through the stacked layers. The storage channel structure may include an array of memory cell strings, wherein memory cells are formed at intersections between the memory cell strings and the gate conductor layers.

Several gate conductor layers on top of the stacked layers are typically used as the top select gates for controlling top select gate (TSG) transistors, thereby selecting memory cell strings. Some other gate conductor layers may serve as control gates for controlling memory cells.

SUMMARY

One aspect of the present disclosure provides a three-dimensional memory device, a memory system and a manufacturing method of the three-dimensional memory device. The three-dimensional memory device according to one aspect of the present disclosure comprises: stacked layers on a semiconductor layer; a storage channel structure penetrating through the stacked layers and comprising a first channel layer; a select gate structure located on a side of the stacked layers facing away from the semiconductor layer and comprising a conductive layer; and a select channel structure penetrating through the select gate structure and comprising a block layer and a second channel layer disposed from outside to inside.

In one implementation of the present disclosure, the conductive layer contacts the block layer, and in an extending direction of the select channel structure, a length of a portion of the conductive layer that contacts the block layer is the same as a length of the block layer.

In one implementation of the present disclosure, the three-dimensional memory device further comprises: a channel plug located between the storage channel structure and the select channel structure and contacting the first channel layer and the second channel layer, respectively.

In one implementation of the present disclosure, the block layer comprises silicon oxynitride.

In one implementation of the present disclosure, the conductive layer comprises one of polysilicon, doped polysilicon or metal silicide.

In one implementation of the present disclosure, the doped polysilicon comprises boron doped polysilicon.

In one implementation of the present disclosure, the select channel structure further comprises: a dielectric core located in a space defined by the second channel layer; and an insulating layer located between the block layer and the second channel layer.

A memory system according to one aspect of the present disclosure comprises: a three-dimensional memory device configured to store data and comprising: stacked layers on a semiconductor layer; a storage channel structure penetrating through the stacked layers and comprising a first channel layer; a select gate structure located on a side of the stacked layers facing away from the semiconductor layer and comprising a conductive layer; and a select channel structure penetrating through the select gate structure and comprising a block layer and a second channel layer disposed from outside to inside; and a memory controller coupled to the three-dimensional memory device and configured to control the three-dimensional memory device.

A manufacturing method of a three-dimensional memory according to one aspect of the present disclosure comprises: forming stacked layers on a substrate; forming a storage channel structure penetrating through the stacked layers, the storage channel structure comprising a first channel layer; and forming a select gate structure and a select channel structure on a side of the stacked layers facing away from the substrate, the select channel structure penetrating through the select gate structure, the select gate structure comprising conductive layers, and the select channel structure comprising a block layer and a second channel layer disposed from outside to inside.

In one implementation of the present disclosure, forming the select gate structure and the select channel structure on the side of the stacked layers facing away from the substrate comprises: converting a portion of the conductive layer into the block layer. In one implementation of the present disclosure, forming the select gate structure and the select channel structure on the side of the stacked layers facing away from the substrate comprising: forming an initial select gate structure on a side of the stacked layers facing away from the substrate, wherein the initial select gate structure comprises the conductive layer; processing the initial select gate structure to form the select gate structure; and forming the select channel structure penetrating through the select gate structure.

In one implementation of the present disclosure, the method further comprises: forming a channel plug in contact with the first channel layer at an end of the storage channel structure away from the substrate; in the process of processing the initial select gate structure to form the select gate structure, forming a channel hole penetrating through the initial select gate structure, wherein the channel hole exposes a surface of the channel plug away from the substrate; and forming the select channel structure penetrating through the select gate structure comprising: forming the select channel structure on the channel hole and the exposed channel plug, wherein the second channel layer contacts the channel plug.

In one implementation of the present disclosure, forming the select channel structure on the channel hole and the exposed channel plug comprises: converting the portion of the conductive layer along the sidewall of the channel hole into the block layer; and forming an insulating layer at least on the sidewall of the channel hole; and forming the second channel layer at least on a surface of the insulating layer and the exposed channel plug.

In one implementation of the present disclosure, the conductive layer comprises polysilicon, and converting the portion of the conductive layer along the sidewall of the channel hole into the block layer comprises: exposing the conductive layer in nitrogen-containing gases to nitriding the portion of the conductive layer along the sidewall of the channel hole into the block layer.

In one implementation of the present disclosure, the nitrogen-containing gases comprise one of $NH_3$, NO, $N_2O$, $N_2$ or any combination thereof.

In one implementation of the present disclosure, forming the insulating layer at least on the sidewall of the channel hole and forming the second channel layer on the surface of the insulating layer and the exposed channel plug comprises: forming an initial insulating layer on the sidewall of the channel hole and the exposed channel plug; removing a portion of the initial insulating layer that is located on the channel plug to form the insulating layer; and forming the second channel layer at least on the surface of the insulating layer and the exposed channel plug.

In one implementation of the present disclosure, forming the insulating layer at least on the sidewall of the channel hole and forming the second channel layer on the surface of the insulating layer and the exposed channel plug comprises: forming an initial insulating layer and a first initial channel layer successively on the sidewall of the channel hole and the exposed channel plug; removing a portion of the first initial channel layer that is located on the channel plug; removing a portion of the initial insulating layer that is located on the channel plug to form the insulating layer; and forming a second initial channel layer at least on a portion of the first initial channel layer that is located on the sidewall of the channel hole and on the exposed channel plug to form the second channel layer.

In one implementation of the present disclosure, forming the insulating layer at least on the sidewall of the channel hole and forming the second channel layer on the surface of the insulating layer and the exposed channel plug comprises: forming an initial insulating layer and a sacrificial layer successively on the sidewall of the channel hole and the exposed channel plug; removing a portion of the sacrificial layer that is located on the channel plug; removing a portion of the initial insulating layer that is located on the channel plug to form the insulating layer; removing a portion of the sacrificial layer that is located on the sidewall of the channel hole; and forming the second channel layer at least on the surface of the insulating layer and the exposed channel plug.

In one implementation of the present disclosure, forming the select channel structure further comprises: forming a dielectric core in a space defined by the second channel layer.

In one implementation of the present disclosure, the method further comprises: forming an electrode plug in contact with the second channel layer at an end of the select channel structure away from the substrate.

BRIEF DESCRIPTION OF DRAWINGS

Other features, objects and advantages of the present disclosure will become more apparent by reading the detail description of non-limiting implementations made with reference to the following drawings.

DETAILED DESCRIPTION

Figure 1:
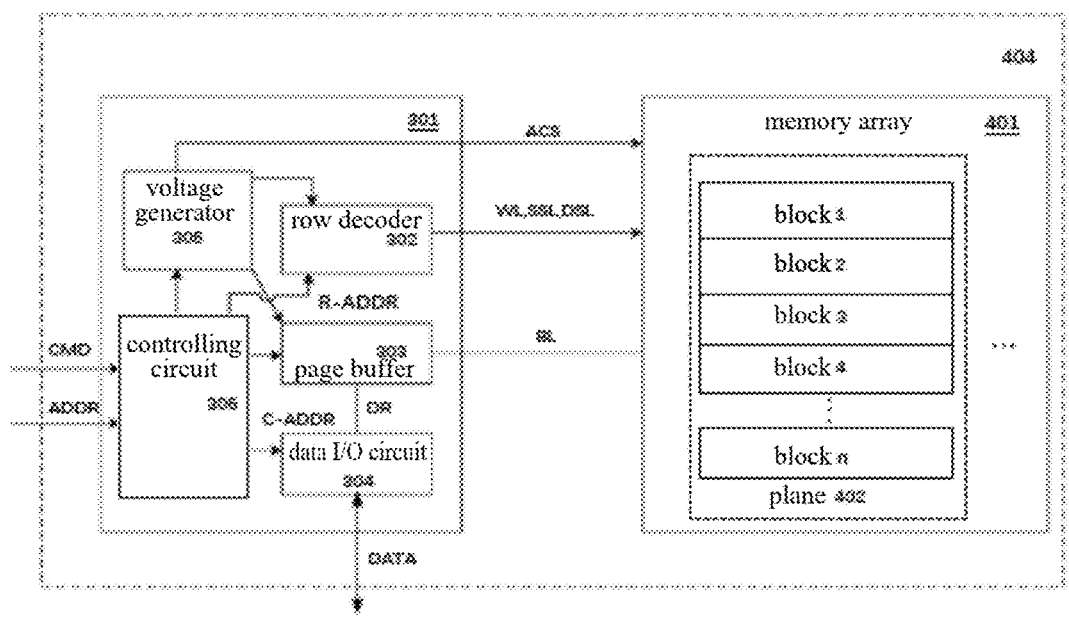
FIG. 1 is a schematic diagram of a three-dimensional memory device including a peripheral circuit according to some implementations of the present disclosure.

For better understanding of the present disclosure, various aspects of the present disclosure will be described in more detail with reference to accompanying drawings. It should be understood that these detailed descriptions are only for the purpose of explaining example implementations of the present disclosure and are not intended to limit the scope of the present disclosure in any way. Throughout the specification, identical reference numerals refer to identical elements.

It is noted that references in the specification to "one implementation", "implementations", "illustratively", "in some examples", "in some implementations", "optionally", "as an option", "some implementations" etc., indicate that the implementation described may include a particular feature, structure, or characteristic, but every implementation may not necessarily include the particular feature, structure, or characteristic. Moreover, such phrases do not necessarily refer to the same implementation. Further, when a particular feature, structure or characteristic is described in connection with an implementation, it would be within the knowledge of a person skilled in the pertinent art to effect such feature, structure or characteristic in connection with other implementations whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "layer" refers to a material portion including a region with a thickness. A layer can extend over the entirety of an underlying or overlying structure or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layers thereupon, thereabove, and/or therebelow. A layer can include multiple layers.

In the figures, thicknesses, dimensions and shapes of components have been somewhat adjusted for easy illustration. The figures are only examples and not strictly drawn to scale. For example, as used herein, terms "approximate", "about" and the like indicate approximation instead of degrees and are intended to mean inherent variations in measured or calculated values as realized by those of ordinary skills in the art.

It is also to be appreciated that, as used herein, terms "include", "comprise", "have" and/or "contain" indicate existence of the stated feature, element and/or component, but will not exclude existence or addition of one or more other features, elements, components and/or any combinations thereof. Furthermore, when the expression "at least one of" precedes a list of listed features, it modifies all the listed features instead of any individual ones. Furthermore, as used in the description of an implementation of the present disclosure, the term "may" is used to indicate "one or more implementations of the present disclosure". Also, the term "example" means to be exemplary or illustrative.

All the terms (including engineering terms and scientific and technical terms) used herein have the same meanings as those commonly understood by those of ordinary skills in the art, unless otherwise specified. It is also to be appreciated that the terms defined in common dictionaries should be interpreted to have the meanings consistent with their contexts in pertinent arts and should not be interpreted too ideally or formally, unless otherwise specified explicitly in the application.

It should be noted that implementations of the present disclosure and features thereof may be combined where there are no conflicts. Furthermore, specific operations contained in a method described in the present disclosure may not necessarily be performed in the described order and instead may be performed in any other order or in parallel, unless there is an explicit definition or any conflict with the context. The present disclosure will be described in detail hereafter in connection with implementations with reference to accompanying drawings.

As shown in FIG. 1, some implementations of the present disclosure provide a three-dimensional memory device 404. Optionally, the three-dimensional memory device 404 may be a 3D NAND memory device or a 3D NOR memory device. The three-dimensional memory device 404 includes a memory array 401 and peripheral circuits 301 coupled to the memory array 401. In some implementations, memory array 401 and peripheral circuits 301 may be arranged on the same wafer. In some other implementations, memory array 401 and peripheral circuits 301 may be arranged on different wafers, which may be electrically coupled with each other by processes such as bonding or the like. In some implementations, three-dimensional memory device 404 is an integrated circuit (IC) package with one or more array chips and CMOS chips packaged therein.

Optionally, the three-dimensional memory device 404 may be configured to store data in the memory array 401 and execute operations in response to received commands (CMD). In some implementations, the three-dimensional memory device 404 may receive write commands, read commands, erase commands etc. and may execute operations accordingly.

In general, the memory array 401 may include one or more memory planes 402 and each memory plane may include a plurality of memory blocks (such as block-1 to block-N shown in FIG. 1). In some examples, concurrent operations may occur at different memory planes 402. In some examples, a memory block may serve as the minimum execution unit for erase operation.

In some implementations, memory array 401 may be for example a flash memory array and may be implemented with 3D NAND flash technology.

Figure 2:
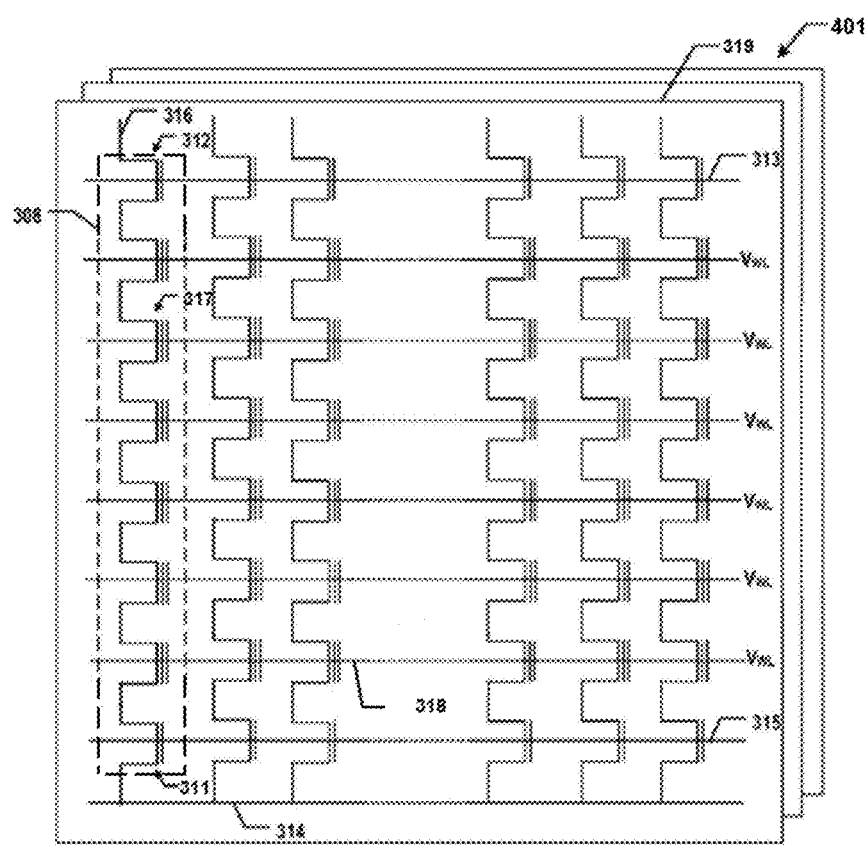
FIG. 2 is a schematic equivalent circuit diagram of a memory array included in a three-dimensional memory device according to some implementations of the present disclosure.

As shown in FIG. 2, the memory array 401 includes a plurality of memory blocks 319. It should be understood that the memory block 319 may be any one of block 1-block n shown in FIG. 1. The memory block 319 includes a plurality of memory cell strings 308. In some implementations, each memory cell string 308 includes a plurality of memory cells 317 coupled in series and stacked vertically. Each memory cell 317 can remain continuous analog values, for example, voltages or charges, depending on the number of electrons trapped in the region of the memory cell 317. Each memory cell 317 may be a memory cell of a floating-gate type that includes floating-gate transistors or a memory cell of a charge trapping type that includes charge trapping transistors.

In some implementations, the three-dimensional memory device 404 is of at least one of the SLC, MLC, TLC and QLC types. The SLC type indicates that each memory cell 317 stores 1 bit of data and has only two data states: "0" and "1". The MLC type indicates that each memory cell 317 stores 2 bits of data and has four data states: "00", "01", "10" and "11". The TLC type indicates that each memory cell 317 stores 3 bits of data and has eight data states: "000", "001", "010", "011", "100", "101", "110" and "111". Similarly, the TLC type indicates that each memory cell 317 stores 4 bits of data and has sixteen data states. It should be understood that memory cell 317 may store more than 4 bits of data.

With continued reference to FIG. 2, each memory cell string 308 may further include, at its drain end, a drain select gate transistor 312, which may also be referred to as a "top select gate transistor (i.e. TSG transistor)" in some examples with the drain select gate transistor disposed at the top of the memory cell string 308. Each memory cell string 308 may also include, at its source end, a source select gate transistor 311, which may also be referred to as a "bottom select gate (BSG) transistor" in some examples with the source select gate transistor disposed at the bottom of the memory cell string 308. TSG transistor 312 and BSG transistor 311 may be controlled by their respective top select gate TSG and bottom select gate BSG and configured to activate the corresponding memory cell string 308 during the operation of three-dimensional memory device. In some implementations, sources of memory cell strings 308 in the same memory block 319 are coupled together through the same source line 314. According to some implementations, each memory cell string 308 has its drain coupled to a corresponding bit line 316. In some implementations, corresponding select voltages may be applied to gates of corresponding drain select gate transistors 312 via one or more drain select lines 313. In some implementations, corresponding select voltages may also be applied to gates of corresponding source select gate transistors 311 via one or more source select lines 315.

Referring to FIG. 1, in some implementations, peripheral circuit 301 includes a row decoder 302, a page buffer 303, a data input/output (I/O) circuit 304, a voltage generator 305 and a control circuit 306 coupled together.

In some examples, the row decoder 302 may be configured to drive word lines (for example, word line 318 shown in FIG. 2) according to a row address (R-ADDR) from the control circuit 306 and a word line voltage generated by the voltage generator 305. In some implementations, row decoder (word line driver) 302 may also select/deselect and drive source select lines and drain select lines.

In some examples, the page buffer 303 is coupled to bit lines (for example, bit line 316 as shown in FIG. 2) of the memory array 401 and is configured to buffer data during the read/write operations according to control signals from the control circuit 306. Optionally, the page buffer 303 may sense low power signals representing stored data bits from bit lines (BLs) in read operation.

In some examples, the data I/O circuit 304 is coupled to the page buffer 303 via data lines DRs. In one example (for example, during read operation), the data I/O circuit 304 is configured to upload data read from the memory array 401 to external circuits (for example, the memory controller 406) via the page buffer 303 and BLs.

In some examples, the voltage generator 305 is configured to generate appropriate voltages for proper operation of the three-dimensional memory device 404. For example, the voltage generator 305 may generate appropriate read voltages, programming voltages or erasing voltages during operation of the three-dimensional memory device 404.

In some examples, the control circuit 306 is configured to receive a command (CMD) and an address (ADDR) and provide control signals to circuits such as row decoder 302, page buffer 303, data I/O circuit 304 and voltage generator 305 based on the command and the address. For example, the control circuit 306 may generate a row address R-ADDR and a column address C-ADDR based on the address ADDR and provide the row address R-ADDR to the row decoder 302 and the column address to the data I/O circuit 304. In some other examples, the control circuit 306 may control the voltage generator 305 to generate appropriate voltages based on the received CMD. The control circuit 306 may coordinate other circuits to provide signals to the memory array 401 at proper time and according to proper voltage.

Figure 3:
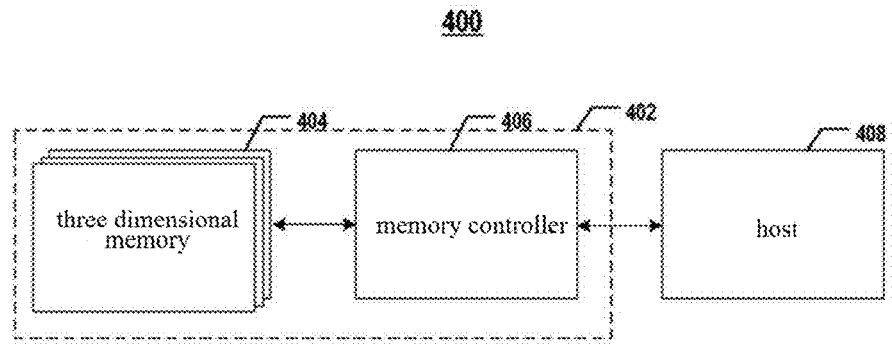
FIG. 3 is a block diagram of a schematic system including a three-dimensional memory device according to some implementations of the present disclosure.

As shown in FIG. 3, in some examples, system 400 may include a host 408 and a memory system 402 having one or more three dimensional memory devices 404 and a memory controller 406. The host 408 can be a processor of an electronic device, such as a central processing unit (CPU), or a system-on-chip (SoC) such as an application processor (AP). The host 408 can be configured to send or receive data stored in the memory device 404. Optionally, the system 400 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein.

According to some implementations, the memory controller 406 is coupled to the three-dimensional memory device 404 and the host 408 and is configured to control the three-dimensional memory device 404. Memory controller 406 can manage the data stored in three-dimensional memory device 404 and communicate with host 408. In some implementations, memory controller 406 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 406 is designed for operating in a high duty-cycle environment like SSDs or embedded multi-media-cards (eMMCs) used as data storage for mobile devices, such as smartphones, tablets, laptop computers, etc., and enterprise storage arrays. Memory controller 406 can be configured to control operations of memory device 404, such as read, erase, and program operations. Memory controller 406 can also be configured to manage various functions with respect to the data stored or to be stored in memory device 404 including, but not limited to bad-block management, garbage collection, logical-to-physical address conversion, wear leveling, etc. In some implementations, memory controller 406 is further configured to process error correction codes (ECCs) with respect to the data read from or written to memory device 404. Any other suitable functions may be performed by memory controller 406 as well, for example, formatting the three-dimensional memory device 404. Memory controller 406 can communicate with an external device (e.g., host 408) according to a particular communication protocol. For example, memory controller 406 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 4:
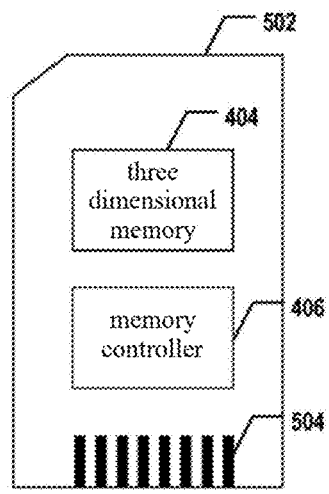
FIG. 4 is a schematic diagram of a schematic memory card including a three-dimensional memory device according to some implementations of the present disclosure.
Figure 5:
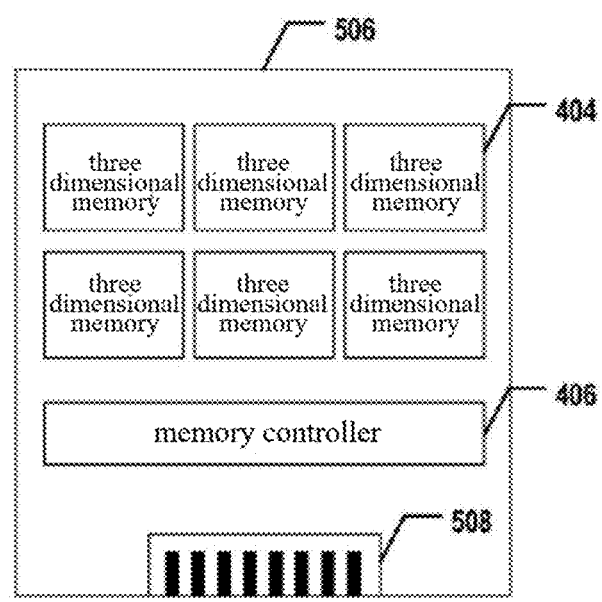
FIG. 5 is a schematic diagram of a schematic solid state drive (SSD) including a three-dimensional memory device according to some implementations of the present disclosure.

Memory controller 406 and one or more three dimensional memory devices 404 can be integrated into various types of storage devices, for example, be included in the same package, such as a universal Flash storage (UFS) package or an eMMC package. That is, memory system 402 can be implemented and packaged into different types of end electronic products. In one example as shown in FIG. 4, memory controller 406 and a single three-dimensional memory device 404 can be integrated into a memory card 502. Memory card 502 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 502 can further include a memory card connector 504 coupling memory card 502 with a host (e.g., the host 408 in FIG. 3). In another example as shown in FIG. 5, memory controller 406 and multiple three dimensional memory devices 404 can be integrated into an SSD 506. SSD 506 can further include an SSD connector 508 coupling SSD 506 with a host (e.g., the host 408 in FIG. 3). In some implementations, the storage capacity and/or the operation speed of SSD 506 is greater than those of memory card 502.

Three dimensional memory devices and manufacturing methods thereof according to some implementations of the present disclosure will be described below with respect to FIGS. 6-19M. While describing some implementations of the present disclosure, for easy illustration, diagrams depicting device structures are partially exaggerated instead of being drawn to general scale. The diagrams are just illustrative and in no way limit the scope of the application. Furthermore, three-dimensional spatial scales of length, width and depth should be included in practical fabrication. It should be understood that the operations shown in the method are not exhaustive and that other operations can be performed as well before, after, or between any of the illustrated operations.

Figure 6:
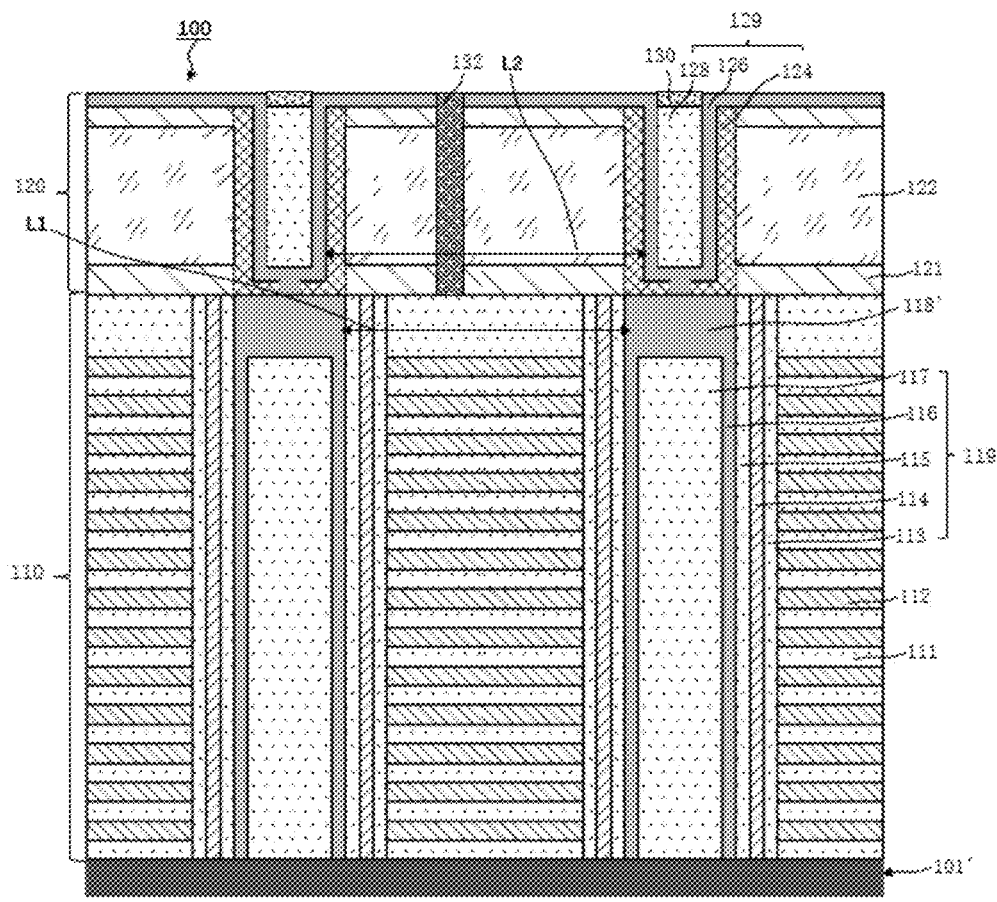
FIG. 6 is a partial schematic diagram of a three-dimensional memory device according to some implementations of the present disclosure.

FIG. 6 illustrates a partial diagram of a three-dimensional memory device 100 according to some implementations of the present disclosure. As shown in FIG. 6, the three-dimensional memory device 100 may serve as an example of the memory device 404 as described above. The three-dimensional memory device 100 may include for example a semiconductor layer 101', stacked layers 110 on the semiconductor layer 101', a plurality of storage channel structures 119 penetrating through the stacked layers 110, a select gate structure 120 on the side of the stacked layers 110 facing away from the semiconductor layer 101', a plurality of select channel structures 129 penetrating through the select gate structure 120 and channel plugs 118' between the storage channel structures 119 and the select channel structures 129.

In some examples, the materials for the semiconductor layer 101' include, for example, silicon (such as single crystal silicon and polysilicon), silicon germanium (SiGe), germanium (Ge), gallium arsenide (GaAs), gallium nitride (GaN), silicon carbide (SiC), III-V compound semiconductor or any combinations thereof.

In some examples, the stacked layers 110 may include a plurality of first dielectric layers 111 and a plurality of first conductive layers 112 stacked alternatively, wherein the first conductive layers 112 may serve as control gate layers for leading out word lines (not shown).

In some examples, the materials for the first conductive layers 112 may include, for example, metal conductive materials such as W, Co, Cu, Al, Ti, Ta, Ni or the like. In some examples, the materials for the first conductive layers 112 may include, for example, semiconductor materials such as polysilicon, doped silicon, metal silicide (such as NiSix, WSix, CoSix, TiSix) or any combination thereof.

In some examples, the materials for the first dielectric layers 111 may include for example silicon oxide, silicon nitride or silicon oxynitride.

With continued reference to FIG. 6, in some examples, the storage channel structures 119 may have for example profiles of pillar shape such as cylinder or "inverted cone" shape. In some examples, the semiconductor layers 101' may for example contact the first channel layers 116 and interconnect the first channel layers 116 of the respective storage channel structures 119.

In some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device. As an option, the first dielectric core 117 may be for example disposed in at least partial space defined by the first channel layer 116. Illustratively, as a solid body, the first dielectric core 117 may fill up the partial space defined by the first channel layer 116 in the direction close to the semiconductor layer 101'.

In some examples, the materials for the blocking layer 113 may include for example silicon oxide, silicon oxynitride, high-k dielectric or any combination thereof. The materials for the storage layer 114 may include for example silicon nitride, silicon oxynitride, silicon or any combination thereof. The materials for the tunneling layer 115 may include for example silicon oxide, silicon oxynitride or any combination thereof. In one implementation, the functional layer may be a composite layer including for example silicon oxide/silicon oxynitride/silicon oxide (ONO).

In some examples, the materials for the first channel layers 116 may include for example amorphous silicon, polysilicon or single crystalline silicon or the like. As an option, the first channel layer 116 may not be doped. As another option, the first channel layer 116 may be lightly P-doped. In some examples, the materials for the first dielectric core 117 may include for example insulating materials such as silicon oxide. Optionally, the channel plugs 118' may be positioned on the surface of the first dielectric core 117 opposite to the semiconductor layer 101' and contact sidewalls of the first channel layer 116. Optionally, the channel plugs 118', the storage channel structure 119 and the surface of the first dielectric layer 111 that is away from the semiconductor layer 101' may be flush with each other. In the three-dimensional memory device 100, the surface of the first dielectric core 117 that is away from the semiconductor layer 101' may be lower than the surfaces of the functional layer and the first channel layer 116 that are away from the semiconductor layer 101'. In some examples, in the direction away from the semiconductor layer 101', the length of the first dielectric core 117 may be smaller than the length of the first channel layer 116.

With continued reference to FIG. 6, in some implementations, the select gate structure 120 includes a second conductive layer 122 and second dielectric layers 121 on both sides of the second conductive layer 122. In some cases, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer for controlling the TSG transistor. As an option, one second dielectric layer 121 proximate to the semiconductor layer 101' and one first dielectric layer 111 away from the semiconductor layer 101' may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some examples, materials for the second dielectric layer 121 may be the same as materials for the first dielectric layer 111, which may for instance both includes silicon oxide. In some examples in which materials for the second dielectric layer 121 are the same as materials for the first dielectric layer 111, the first dielectric layer 111 in contact with the second dielectric layer 121 may form an integral structure.

It should be understood that the number of the second conductive layers 122 and second dielectric layers 121 adjacent thereto may be set as desired. For example, the number of the second conductive layers 122 may be 1, 2, 3, 4 or more.

In some examples, materials for the second conductive layers 122 include for example conductive materials that may include for example metallic conductive materials such as W, Co, Cu, Al, Ti, Ta and Ni. The work functions of metals should be satisfied that the controlled channel may be turned off by applying a corresponding off voltage to the TSG when the conductive layer 122 serves as the top select gate layer.

In some examples, the conductive materials for the second conductive layers 122 may further include semiconductor materials such as polysilicon, doped silicon, metal silicide (such as NiSix, WSix, CoSix, TiSix) or any combinations thereof. In some examples, the second conductive layer 122 may include for example P-doped (for example, boron doped) polysilicon such that the controlled channel may be turned off by applying a corresponding off voltage to the TSG when the second conductive layer 122 serves as the top select gate layer.

In some examples, materials for the second conductive layer 122 and the first conductive layer 112 may be different. For example, materials for the first conductive layer 112 may include for example metals such as W, Co, Cu, Al, Ti, Ta and Ni, and materials for the second conductive layer 122 may include for example undoped polysilicon or doped polysilicon or metal silicide. As one option, materials for the first conductive layer 112 may include for example W, and materials for the second conductive layer 122 may include boron doped polysilicon.

With continued reference to FIG. 6, in some implementations, the storage channel structure 119 and the select channel structure 129 are at least partially aligned in the extension direction of the storage channel structure 119 and the select channel structure 129. The select channel structure 129 may have for example a profile similar to that of the storage channel structure 119. Optionally, the profiles of the select channel structure 129 and the storage channel structure 119 may, for example, both include a shape similar to an "inverted cone" shape.

Optionally, in the direction parallel to the semiconductor layer 101', the maximum width (e.g., diameter) of a first end of the select channel structure 129 proximate to the semiconductor layer 101' is smaller than the maximum width (e.g., diameter) of the second end of the storage channel structure 119 away from the semiconductor layer 101'.

Optionally, in the direction parallel to the semiconductor layer 101', the shortest distance L2 between the second ends of adjacent two second channel layers 126 away from the semiconductor layer 101' is greater than the shortest distance L1 between the first ends of adjacent two first channel layers 116 away from the semiconductor layer 101'. It should be understood that the shortest distance between the second ends of adjacent two second channel layers 126 away from the semiconductor layer 101' represents the shortest distance between the outer periphery surfaces of the two adjacent second ends. The shortest distance between the first ends of adjacent two first channel layers 116 away from the semiconductor layer 101' represents the shortest distance between the outer periphery surfaces of the adjacent two first ends.

As shown in FIG. 6, the select channel structure 129 and the storage channel structure 119 may both include for example column shapes, and the diameter of the select channel structure 129 may be smaller than that of the storage channel structure 119. Optionally, the distance between adjacent two select channel structures 129 (such as the distance between outer periphery surfaces of the adjacent two select channel structures 129 in the direction parallel to the semiconductor layer 101') may be greater than the distance between adjacent two storage channel structures 110 (such as the distance between outer periphery surfaces of the adjacent two storage channel structures 110 in the direction parallel to the semiconductor layer 101').

In some examples, the select channel structure 129 may include for example an insulating layer 124 and a second channel layer 126 disposed successively from outside to inside. Optionally, the insulating layer 124 may be disposed between the top select gate (e.g., the second conductive layer 122) and the second channel layer 126 under its control. In some examples, transistors controlled by the top select gates may be for example MOS transistors. Optionally, at least a portion of the bottom surface of the second channel layer 126 proximate to the semiconductor layer 101' contacts the top surface of the channel plug 118' facing away from the second semiconductor layer 101'.

Illustratively, the materials for the second channel layers 126 may include for example amorphous silicon, polysilicon or single crystalline silicon. Optionally, materials for the second channel layer 126 may be the same as material for the first channel layer 116. Illustratively, the second channel layer 126 is for example lightly p-doped. As an option, materials for the insulating layer 124 may include for example insulating materials such as silicon dioxide.

As the number of stacked layers in a three-dimensional memory device increases, the stacked height of three-dimensional memory device increases accordingly, and electron transfer efficiency in the channel will be impacted. In the present implementation, it is possible to electrically connect the first channel layer 116 and the second channel layer 126 by disposing channel plugs 118'. Optionally, materials for channel plugs 118' include, for example, polysilicon. In some examples in which the channel plug 118' includes polysilicon, the channel plug 118' is for example heavily N-doped polysilicon, and the conductive particles for N-type doping include for example phosphorus. During operation of three-dimensional memory device 100, the heavily N-doped channel plug 118' can not only electrically connect channels (such as the second channel layer 126 and the first channel layer 116) controlled by the top select gate (such as the second conductive layer 122) and the control gate (such as the first conductive layer 112), respectively, but also can increase the electron density in the channel, thereby increasing the current.

In some examples, the select channel structure 129 further includes a second dielectric core 128 disposed in the space defined by the second channel layer 126. Optionally, as a solid body, the second dielectric core 128 may occupy a portion of the bottom of the defined space close to the semiconductor layer 101'. Illustratively, the material for the second dielectric core 128 may be the same as material for the first dielectric core 117. Optionally, the above-described insulating layer 124 may be positioned on the surface of the second channel layer 126 away from the second dielectric core 128.

It is assumed that the diameter of the channel structure 129 along the direction parallel to the semiconductor layer 101' is selected to be the same, as compared to the second channel layer 126 being a solid structure occupying the space defined by the insulating layer 124, the second channel layer 126 according to some example implementations of the present disclosure has a hollow structure with a relatively thin thickness, thereby improving the controlling capability of the gate over the channel. While operating the three-dimensional memory device 100, the TSG transistor according to some example implementations of the present disclosure has a relatively small threshold voltage, therefore it is easier to turn off the channel controlled by the TSG transistor.

In some implementations, the three-dimensional memory device 100 further includes for example an electrode plug 130 in a portion of the select channel structure 129 away from the semiconductor layer 101', and the electrode plug 130 may be disposed on the surface of the second dielectric core 128 away from the semiconductor layer 101' and connected with the second channel layer 126. Optionally, the electrode plug 130 may further serve as a portion of the drain of the corresponding memory cell string.

In some implementations, the three-dimensional memory device 100 further includes for example a gate line slit structure (not shown) penetrating through the stacked layers 110 and the select gate structure 120. Some example gate line slit structures may divide the memory array included in the three-dimensional memory device 100 (e.g., the memory array 401 shown in FIG. 1) into a plurality of block regions, some other example gate line slit structures may divide each block region into a plurality of finger-like regions. Therefore, it is possible to individually control memory cells of the individual finger-like region during the operation of the three-dimensional memory device 100.

In some implementations, the three-dimensional memory device 100 further includes for example a top select gate cut line 132 disposed in the select gate structure 120. As an option, the top select gate cut line may for example penetrate through the region between adjacent two select channel structures 129. Optionally, the top select gate cut line 132 may for example further penetrate through the second conductive layer 122 and stop at the bottom surface of one second dielectric layer 121 in contact with the stacked layers 110 that is proximate to the semiconductor layer 101'.

In some examples, the top select gate cut line 132 can divide the finger-like region into a plurality of sub-regions, thereby controlling desired sub-regions accurately during operation of the three-dimensional memory device, efficiently reducing time for programming, reading and erasing and data transmission time, and improving data processing efficiency. The top select gate cut line 132 may further enable the top select gate layer (e.g., the second conductive layer 122) in the select gate structure 120 to control corresponding TSG transistor independently.

With the three-dimensional memory device 100 according to some implementations of the present disclosure, since the distance between any adjacent two select channel structures 129 included therein is greater than the distance between any adjacent two storage channel structures 119 included therein, it is possible to guarantee the process window for the top select gate cut line 132 as much as possible, reduce the occupation of additional area of the stacked layers 110 by the top select gate cut line 132, thereby, to some extent, reducing the loss of storage density.

Figure 7:
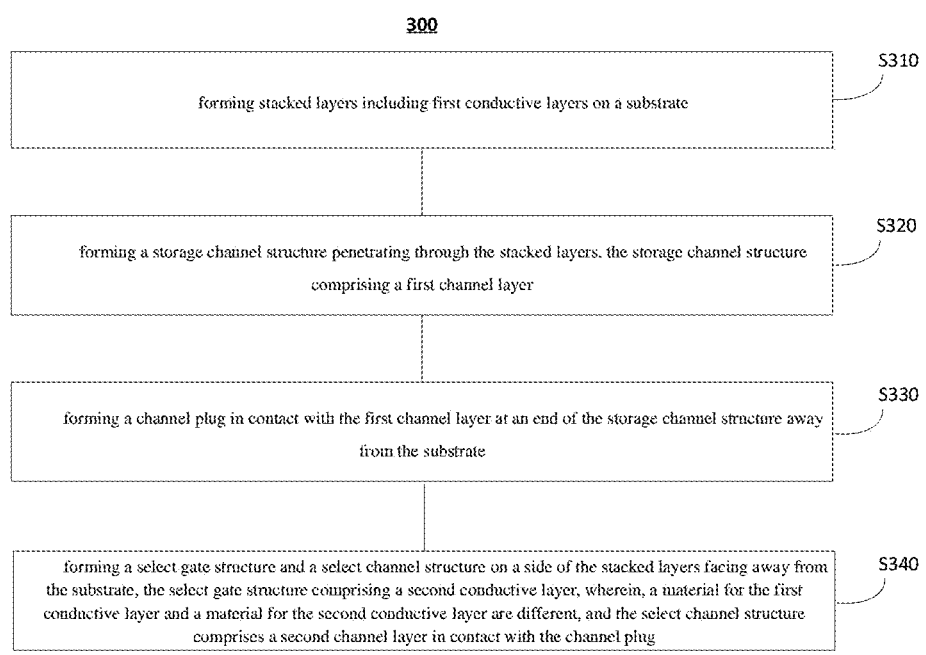
FIG. 7 is a schematic flow chart of a manufacturing method of a three-dimensional memory device according to some implementations of the present disclosure.

FIG. 7 illustrates a schematic flow diagram of a manufacturing method 300 for a three-dimensional memory device 100 according to some implementations of the present disclosure. The method 300 involves some operations of forming the memory array 401 as shown in FIG. 1. FIGS. 8A-8J illustrate partial schematic diagrams of the device structure after implementing some operations in the manufacturing method 300 of a three-dimensional memory device 100 according to some implementations of the present disclosure. The method 300 will be described in detail below with reference to FIGS. 6 to 8J.

With reference to FIG. 7, the manufacturing method 300 starts with operation S310, where stacked layers may be formed on the substrate, the stacked layers include a plurality of first conductive layers.

Figure 8A:
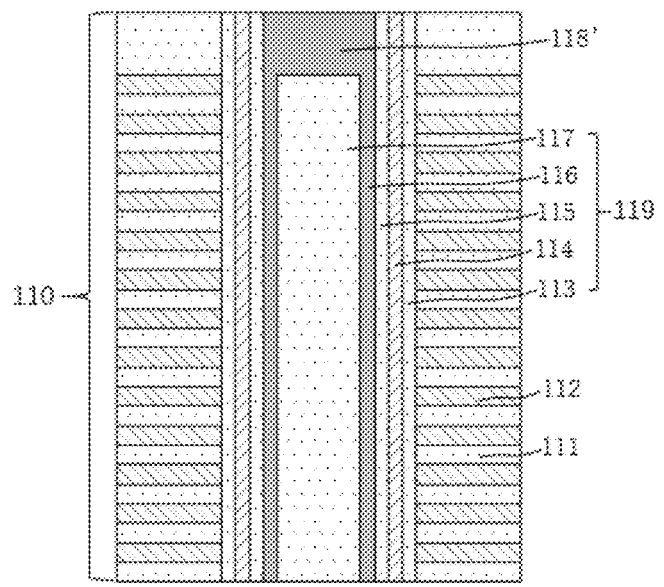
FIGS. 8A-8J are partial schematic diagrams of the device structure after implementing some operations in the manufacturing method of a three-dimensional memory device according to some implementations of the present disclosure.

As shown in FIG. 8A, stacked layers 110 may be formed on the substrate (not shown). In some implementations, any suitable semiconductor material such as single crystalline silicon (Si), single crystalline germanium (Ge), silicon germanium (GeSi), silicon carbide (SiC), silicon on insulator (SOI), germanium on insulator (GOI) or gallium arsenide may be selected for the preparation of the substrate.

In some examples, the stacked layers 110 include a plurality of conductive layer 112. The materials for the first conductive layers 112 may include, for example, metal conductive materials such as W, Co, Cu, Al, Ti, Ta, Ni or the like. Illustratively, the first conductive layer 112 may be formed with the gate replacement process. As an option, the gate replacement process includes for example: stacking alternatively a plurality of first dielectric layers 111 and a plurality of sacrificial dielectric layers (not shown) on a substrate, after for example forming gate line slits (not shown), removing the sacrificial dielectric layers via gate line slits and replacing with the above-described metal conductive material to form the first conductive layer 112. The above-described gate line slits are, for example, used to form the gate line slit structures.

In some examples, the materials for the first dielectric layers 111 may include for example silicon oxide, silicon nitride or silicon oxynitride.

As shown in FIG. 7, the method 300 proceeds to operation S320, where a storage channel structure penetrating through the stacked layers may be formed, the storage channel structure includes the first channel layer.

With continued reference to FIG. 8A, in some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device.

Illustratively, the first channel layer 116 is for example lightly p-doped. As an option, the first dielectric core 117 may for example fill at least a portion of space defined by the first channel layer 116. Illustratively, as a solid body, the first dielectric core 117 may fill up the portion of space defined by the first channel layer 116 in the direction proximate to the substrate.

In some examples, the materials for the blocking layer 113 may include for example silicon oxide, silicon oxynitride, high-k dielectric or any combination thereof. The materials for the storage layer 114 may include for example silicon nitride, silicon oxynitride, silicon or any combination thereof. The materials for the tunneling layer 115 may include silicon oxide, silicon oxynitride or any combination thereof. In one implementation, the functional layer may be for example a composite layer including silicon oxide/silicon oxynitride/silicon oxide (ONO).

In some examples, the materials for the first channel layers 116 may include for example amorphous silicon, polysilicon or single crystalline silicon etc. As an option, the first channel layer 116 may not be doped. As another option, the first channel layer 116 may be lightly P-doped. In some examples, the materials for the first dielectric core 117 may include for example insulating materials such as silicon oxide.

With reference to FIG. 7, the method 300 proceeds to operation S330, where channel plugs in contact with the first channel layer may be formed at an end of the storage channel structures away from the substrate.

With continued reference to FIG. 8A, a portion of the storage channel structure 119 away from the substrate may be removed and a channel plug 118' in contact with the first channel layer 116 is formed on the remaining portion of the storage channel structure 119. In some examples, the portion of the first dielectric core 117 away from the substrate may be removed by for example dry or wet etch process, and the channel plug 118' in contact with the first channel layer 116 may be formed by suitable deposition process on the remaining portion of the first dielectric core 117. Illustratively, the surface of the channel plug 118' away from the substrate may be planarized with for example chemical mechanical polishing (CMP) process such that the surface of the channel plug 118' away from the substrate is substantially flush with the surface of the stacked layers 110 away from the substrate.

Illustratively, the material for the channel plug 118' may be different from material for the first channel layer 116. Optionally, in the example in which the first channel layer 116 includes lightly P-doped polysilicon, the channel plug 118' may include for example heavily N-doped polysilicon.

With reference to FIG. 7, the method 300 proceeds to operation S340, where a select gate structure and a select channel structure may be formed on a side of the stacked layers facing away from the substrate, the select gate structure including a second conductive layer, wherein the material for the first conductive layer and the material for the second conductive layer are different, and the select channel structure includes a second channel layer in contact with the channel plug.

Figure 8B:
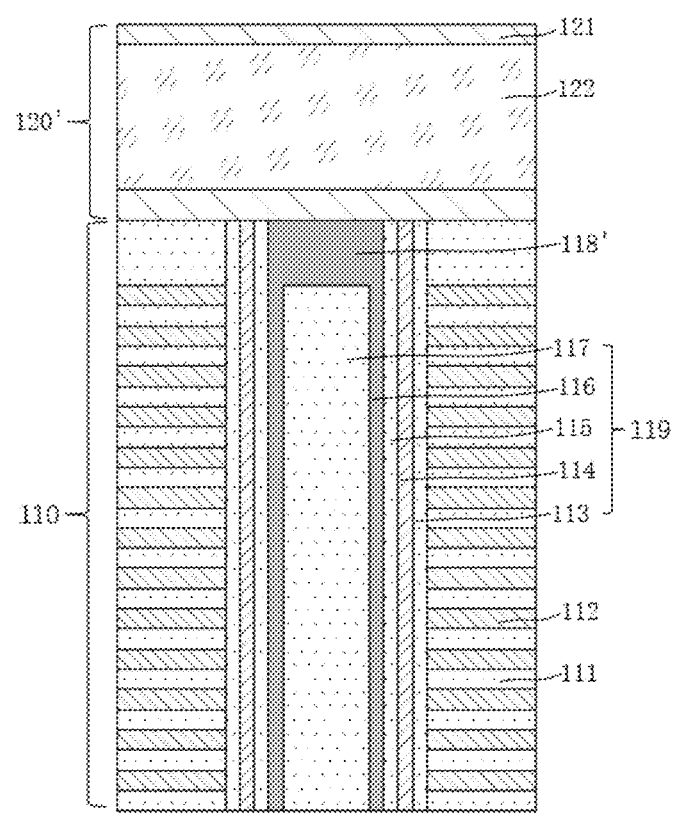

As shown in FIG. 8B, in contrast to the gate replacement process, in the examples in which the material for the second conductive layer 122 and the material for the first conductive layer 112 are different, for example, the second conductive layer 122 includes polysilicon or metal silicide and the first conductive layer 112 includes metal, it is possible to form the second conductive layer 122 and the second dielectric layers 121 on both sides of the second conductive layer 122 on the side of the stacked layers 110 (FIG. 8A) facing away from the substrate by using direct deposition process, such as chemical vapor deposition (CVD), physical vapor deposition (PVD), atomic layer deposition (ALD) or thin film deposition process of any combination thereof, thereby forming the initial select gate structure 120'. In some examples, the number of second conductive layers 122 included in the initial select gate structure 120' may be two or more, and the second dielectric layers 121 and the conductive layers 122 are disposed alternatively.

Optionally, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer for controlling the TSG transistor. As an option, one second dielectric layer 121 proximate to the substrate and one first dielectric layer 111 away from the substrate may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some other examples, it is also possible to form the initial select gate structure 120' by alternatively forming a plurality of second dielectric layers 121 and a plurality of second conductive layers 122 on the stacked layers 110, wherein the second dielectric layers 121 and the second conductive layers 122 are disposed in pair to extend from the side of the stacked layers 110 opposite to the substrate towards the direction facing away from the substrate.

In some examples, materials for the second dielectric layer 121 may be the same as materials for the first dielectric layer 111, which may for instance both includes silicon oxide.

Figure 8C:
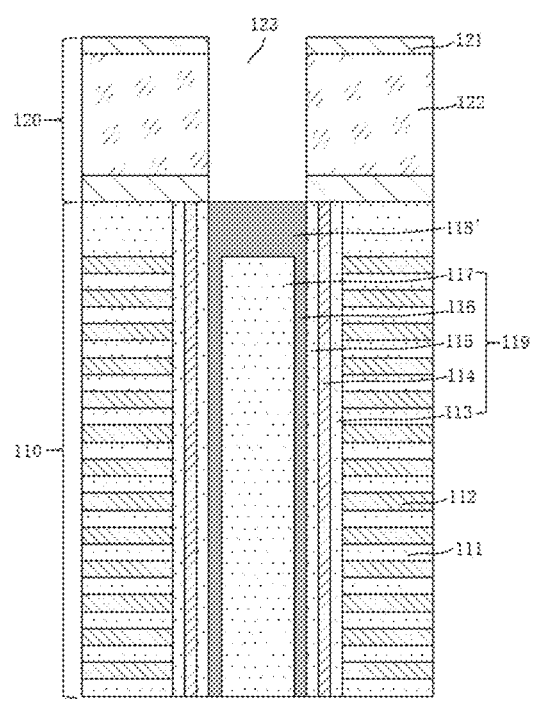

In some examples, it is possible to form a select gate structure in the initial select gate structure and form a select channel structure penetrating through the select gate structure. Specifically, as shown in FIG. 8C, a channel hole 123 penetrating through the initial select gate structure 120' may be formed therein by suitable dry or wet etch process, wherein, the initial select gate structure 120' formed with the channel hole 123 is the select gate structure 120. Optionally, the channel hole 123 may expose the surface of channel plug 118' away from the substrate. Optionally, in the extending direction of the storage channel structure 119 and the channel hole 123, the channel hole 123 and the storage channel structure 119 are aligned at least in part. Illustratively, the channel hole 123 may penetrate through the initial select gate structure 120' and expose the channel plug 118'. In some examples, the channel plug 118' may serve as the stop layer for the channel hole 123 such that the formed channel hole 123 may stop at the surface of the channel plug 118' away from the substrate. Optionally, the channel hole 123 may expose at least a portion of the channel plug 118' away from the substrate. In some examples, the channel hole 123 may have a profile similar to that of the storage channel structure 119. Optionally, in the direction parallel to the substrate, the maximum width (e.g., diameter) of the channel hole 123 proximate to the substrate is smaller than the maximum width (e.g., diameter) of the end of the storage channel structure 119 away from the substrate. In other implementations, the width of the cross section of the channel hole 123 at either location is less than the width of the cross section of the storage channel structure 119 at either location.

Figure 8D:
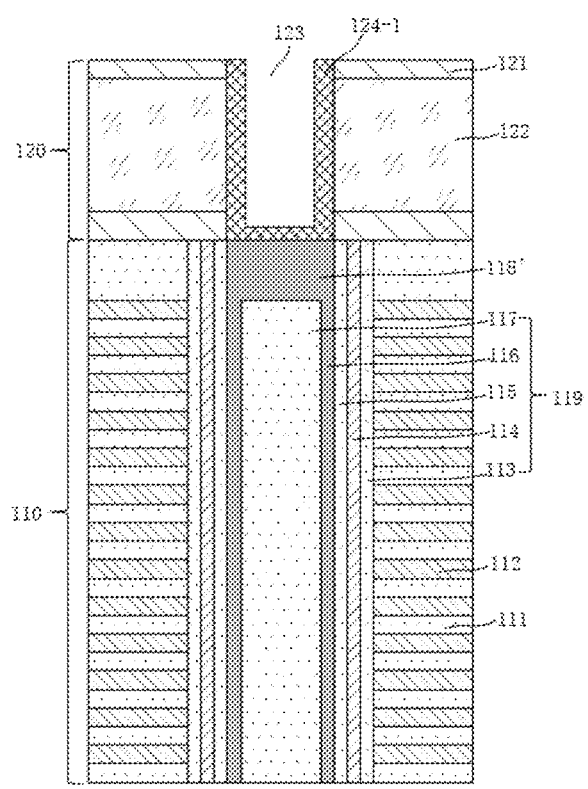
Figure 8E:
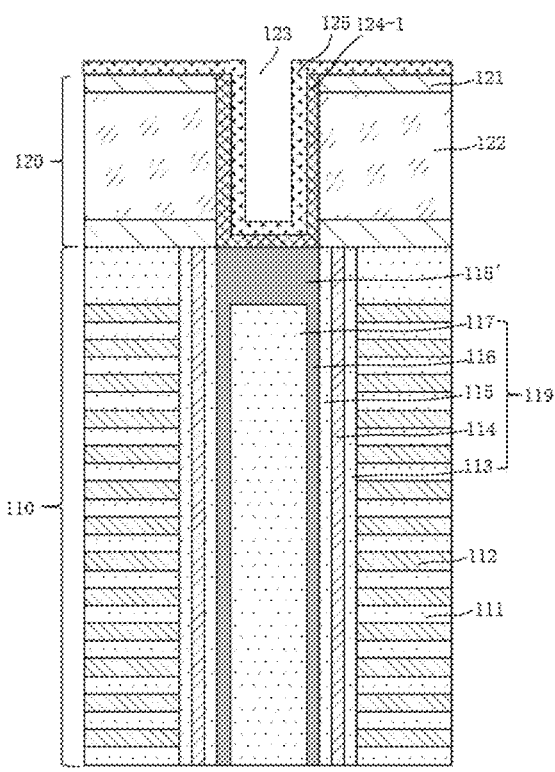
Figure 8F:
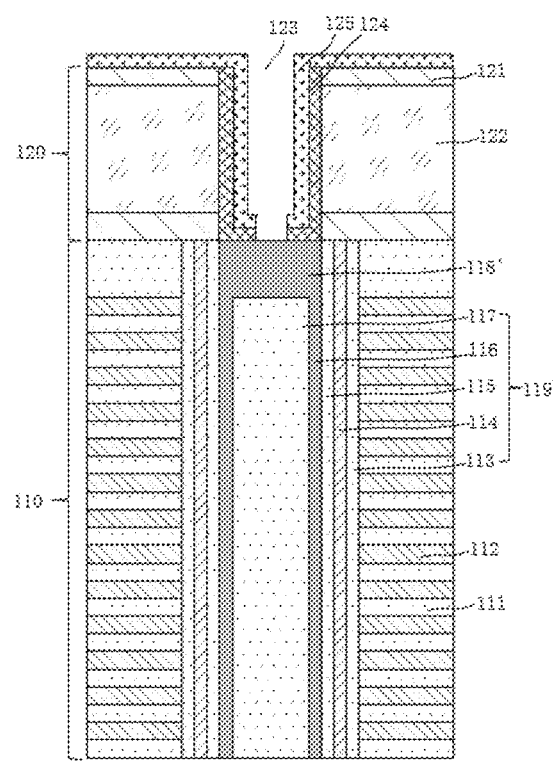
Figure 8G:
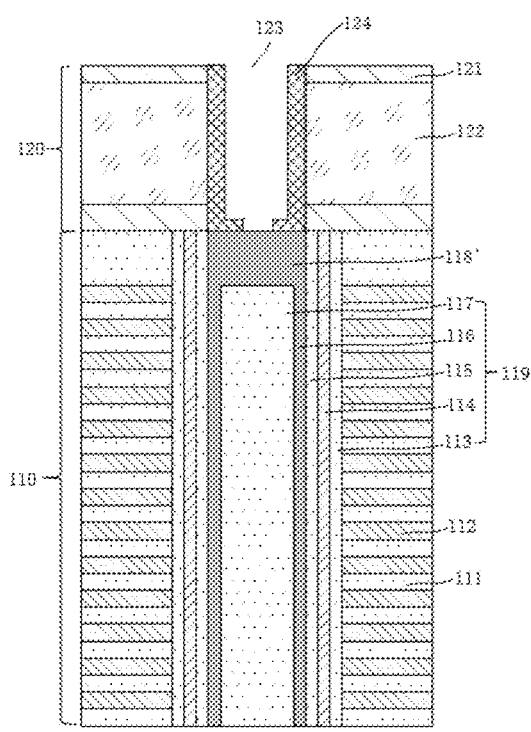
Figure 8H:
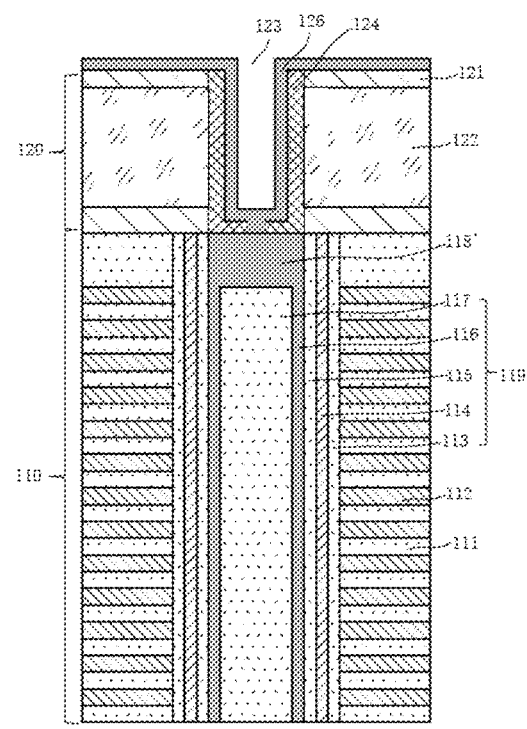
Figure 8I:
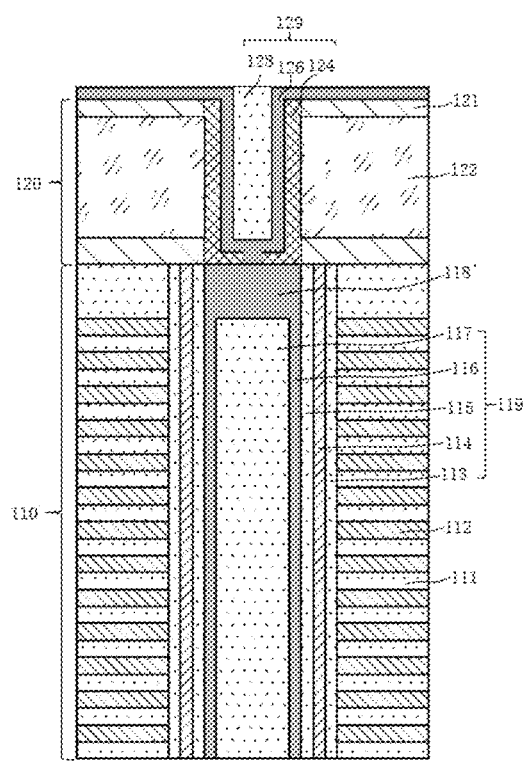

In some examples, referring to FIG. 8I, the select channel structure 129 may be formed in the channel hole 123, wherein the select channel structure 129 includes a channel plug 118' and a second channel layer 126. More specifically, referring to FIG. 8G, an insulating layer 124 is formed at least on the side wall of the channel hole 123 and the second channel layer 126 as shown in FIG. 8H in contact with the channel plug 118' is formed at least on the insulating layer 124. As an option, as shown in FIG. 8D, it is possible to form the initial insulating layer 124-1 on the inner wall of the channel hole 123 and the exposed channel plug 118' by thin film deposition process such as CVD, PVD, ALD and any combination thereof. Optionally, it is also possible to form the initial insulating layer 124-1 (not shown) on the top surface of second dielectric layer 121 further away from the substrate. Referring to FIG. 8G, in some examples, it is possible to remove a portion of the initial insulating layer 124-1 on the channel plug 118' by dry or wet etch process to form the insulating layer 124. With reference to FIG. 8H, in some examples, it is possible to form the second channel layer 126 in contact with the channel plug 118' on the surface of the insulating layer 124 by suitable deposition process.

As another option, as shown in FIG. 8E, a sacrificial layer 125 may be formed on the surface of the initial insulating layer 124-1 after forming the initial insulating layer 124-1. Illustratively, it is possible to form sacrificial layer 125 by depositing any suitable semiconductor materials on the surface of the initial insulating layer 124-1 by using one or more thin film deposition processes such as ALD, CVD, PVD, any other suitable processes or any combinations thereof to. As shown in FIG. 8F, in some examples, it is possible to remove portions of the sacrificial layer 125 and the initial insulating layer 124-1 that are on the channel plug 118' successively by using anisotropic dry etch process to expose the channel plug 118'. Optionally, after removing at least the above-mentioned portions, the initial insulating layer 124-1 forms the insulating layer 124.

In some examples, after exposing the channel plug 118', it is possible to remove the remaining portion of the sacrificial layer 125 by for example dry etch process, thereby exposing the insulating layer 124. In some examples, the sacrificial layer 125 may include for example silicon (polysilicon, single crystalline silicon), and the insulating layer 124 may include silicon oxide. In some cases, due to the difference in etch selection with respect to the initial insulating layer 124-1, the sacrificial layer 125 may serve as an etch protection layer for the initial insulating layer 124-1. For example, while etching a portion of the initial insulating layer 124-1 that is over the channel plug 118', the sacrificial layer 125 may serve as the etch protection layer to protect the insulating layer 124 as shown in FIG. 8F from damaging. Optionally, as shown in FIG. 8G, the remaining portion of the etch protection layer may be completely removed after the portion of the initial insulating layer 124-1 that is over the channel plug 118' is removed.

In some other cases where the sacrificial layer 125 includes polysilicon, the sacrificial layer 125 may serve as the first initial channel layer (not shown). It is possible to form a second initial channel layer (not shown) on a portion of the first initial channel layer that is on the sidewall of the channel hole 123 and on the channel plug 118' by suitable deposition process after removing portions of sacrificial layer 125 and the initial insulating layer 124-1 that are over the channel plug 118' successively. The portion of the first initial channel layer that is on the sidewall of the channel hole 123 and the second initial channel layer may together serve as the second channel layer 126.

In some examples, as shown in FIG. 8H, it is possible to form the second channel layer 126 on the surface of the insulating layer 124 and the exposed portion of the channel plug 118' by using one or more thin film deposition processes such as ALD, CVD, PVD, any other suitable processes or any combinations thereof. Optionally, the second channel layer 126 may be lightly P-doped to form the doped second channel layer 126.

With the method 300 according to some implementations of the present disclosure, it is possible to form the first channel layer 116 and the second channel layer 126 by two processes such that the two channel layers have uniform thickness, thereby improving the controlling capability of the gate over the channel.

In some implementations, as shown in FIG. 8I, it is possible to form the second dielectric core 128 in the space defined by the second channel layer 126, thereby forming the select channel structure 129. During the operation of the three-dimensional memory device, the select channel structure 129 is controlled by for example the top select gate (e.g., the second conductive layer 122). Illustratively, it is possible to form the second dielectric core 128 in the space defined by the second channel layer 126 by using a deposition process such as ALD, CVD, PVD, any other suitable process or any combinations thereof, and the material for the second dielectric core 128 includes for example silicon oxide. As an option, the material for the second dielectric core 128 may be the same as material for the first dielectric core 117.

In some implementations, the select channel structure 129 may have for example a profile similar to that of the storage channel structure 119. Optionally, the select channel structure 129 and the storage channel structure 119 may both include the column shape. In some examples, in the direction parallel to the substrate, the diameter of the select channel structure 129 at any place is smaller than that of the storage channel structure 119 at any place.

Figure 8J:
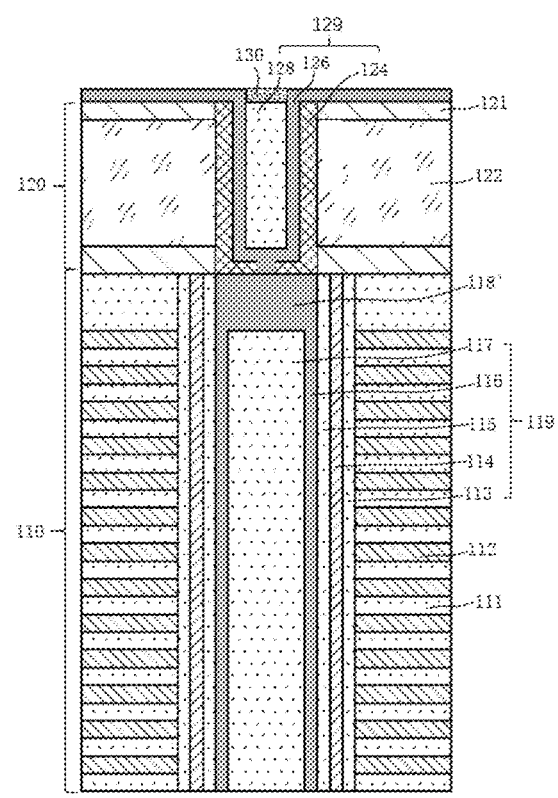

In some implementations, as shown in FIG. 8J, an electrode plug 130 in contact with the second channel layer 126 may be formed at the end of the select channel structure 129 away from the substrate. Illustratively, it is possible to remove a portion of the second dielectric core 128 away from the substrate by suitable etch processes, and then form an electrode plug 130 on the surface of the second dielectric core 128 away from the substrate by using a deposition process such as ALD, CVD, PVD or any combinations thereof. In some examples, the electrode plug 130 may further serve as a portion of the drain of the corresponding memory cell string.

In some implementations, it is possible to remove the substrate in suitable operations after forming the select channel structure 129, and then for example, form the semiconductor layer 101' as shown in FIG. 6 on the stacked layers 110 after removing the substrate. The semiconductor layer 101' may for example contact the first channel layer 116 and electrically connect the first channel layers 116 of the respective storage channel structures 119.

In some examples, it is further possible to perform for example back-end interconnection process on the surface of the semiconductor layer 101' opposite to the stacked layers 110 to electrically lead out for example the select channel structures 129 of the memory array 401. In some other examples, at least a portion of the substrate may be remained as the semiconductor layer 101'.

In some implementations, it is further possible to form the top select gate cut line 132 as shown in FIG. 6 in the select gate structure 120 in suitable operations, for example after forming the select channel structure 129.

Since the contents and structures involved in the forgoing description of the three-dimensional memory device 100 may be fully or partially suitable to the same or similar structures involved in the description of the manufacturing method 300 of three-dimensional memory device herein, no repetition will be made to the related or similar description.

Figure 9:
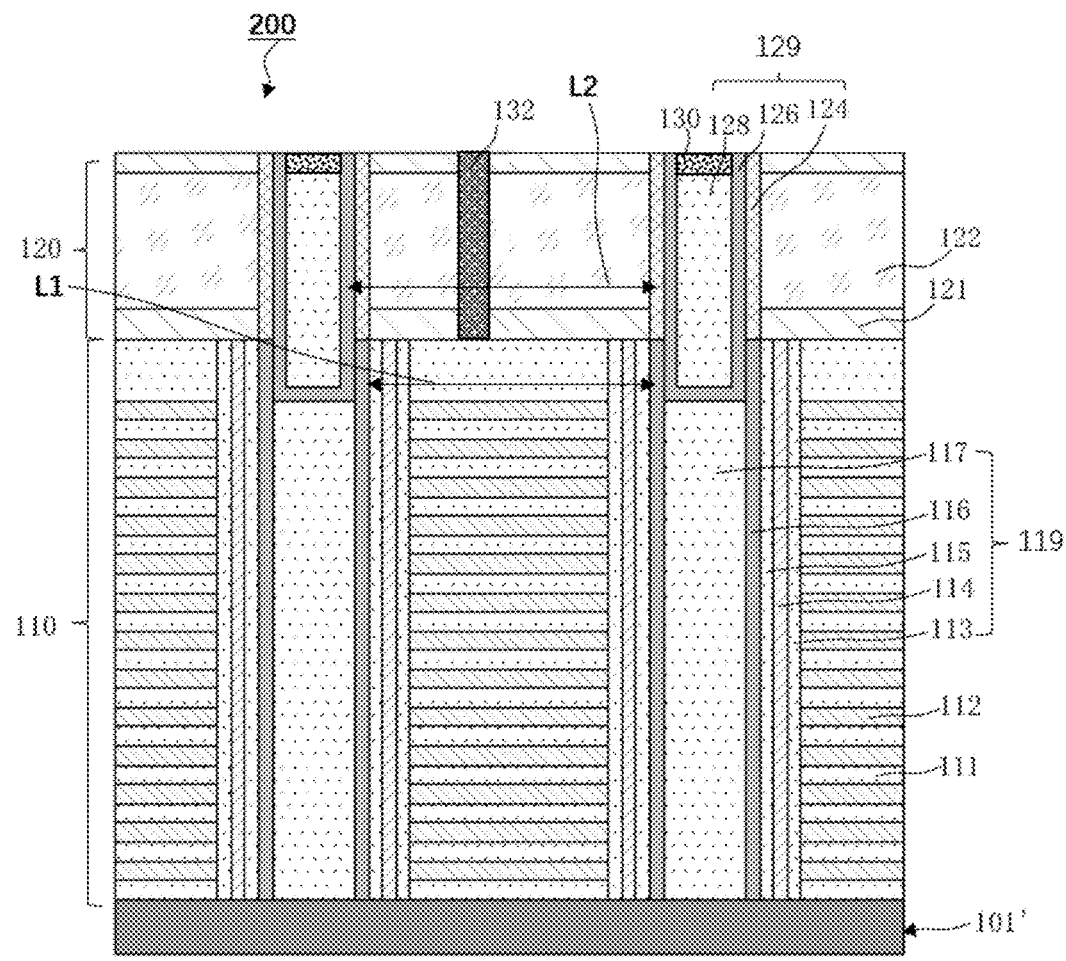
FIG. 9 is a partial schematic diagram of another three-dimensional memory device according to some implementations of the present disclosure.

FIG. 9 illustrates a partial diagram of another three-dimensional memory device 200 according to some implementations of the present disclosure. As shown in FIG. 9, the three-dimensional memory device 200 may serve as an example of the memory device 404 as described above. The three-dimensional memory device 200 may include for example a semiconductor layer 101', stacked layers 110 on the semiconductor layer 101', a plurality of storage channel structures 119 penetrating through the stacked layers 110, a select gate structure 120 on the side of the stacked layers 110 facing away from the semiconductor layer 101', and a plurality of select channel structures 129 penetrating through the select gate structure 120.

In some examples, the materials for the semiconductor layer 101' may include, for example, silicon (such as single crystal silicon and polysilicon), silicon germanium (SiGe), germanium (Ge), gallium arsenide (GaAs), gallium nitride (GaN), silicon carbide (SiC), III-V compound semiconductor or any combinations thereof.

In some examples, the stacked layers 110 may include a plurality of first dielectric layers 111 and a plurality of first conductive layers 112 stacked alternatively, wherein the first conductive layers 112 may serve as control gate layers for leading out word lines (not shown).

In some examples, the materials for the first conductive layers 112 may include, for example, metal conductive materials such as W, Co, Cu, Al, Ti, Ta, Ni or the like. In some examples, the materials for the first conductive layers 112 may also include, for example, semiconductor materials such as polysilicon, doped silicon, metal silicide (such as NiSix, WSix, CoSix, TiSix) or any combination thereof.

In some examples, the materials for the first dielectric layers 111 may include for example silicon oxide, silicon nitride or silicon oxynitride.

With continued reference to FIG. 9, in some examples, the storage channel structures 119 may for example include profiles of pillar shape such as cylinder or "inverted cone" shape. In some examples, the semiconductor layers 101' may for example contact the first channel layers 116 and interconnect storage channel structures 119 of the respective first channel layers 116.

In some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device.

As an option, the first dielectric core 117 may be for example disposed in at least a portion of space defined by the first channel layer 116 and, as a solid body, occupy the portion of the defined space close to the bottom of the semiconductor layer 101'. Optionally, the surface of the first dielectric core 117 away from the semiconductor layer 101' may be lower than the surfaces of the functional layer and the first channel layer 116 away from the semiconductor layer 101'. In some examples, in the direction away from the semiconductor layer 101', the length of the first dielectric core 117 may be smaller than the length of the first channel layer 116.

In some examples, the materials for the blocking layer 113 may include for example silicon oxide, silicon oxynitride, high-k dielectric or any combination thereof. The materials for the storage layer 114 may include for example silicon nitride, silicon oxynitride, silicon or any combination thereof. The materials for the tunneling layer 115 may include for example silicon oxide, silicon oxynitride or any combination thereof. In one implementation, the functional layer may be for example a composite layer including silicon oxide/silicon oxynitride/silicon oxide (ONO).

In some examples, the materials for the first channel layers 116 may include for example amorphous silicon, polysilicon or single crystalline silicon or the like. As an option, the first channel layer 116 may not be doped. As another option, the first channel layer 116 may be lightly P-doped. In some examples, the materials for the first dielectric core 117 may include for example insulating materials such as silicon oxide.

With continued reference to FIG. 9, in some implementations, the select gate structure 120 includes a second conductive layer 122 and a second dielectric layer 121, wherein the second conductive layer 122 may be between adjacent second dielectric layers 121. In some cases, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer for controlling the TSG transistor. As an option, one second dielectric layer 121 proximate to the semiconductor layer 101' and one first dielectric layer 111 away from the semiconductor layer 101' may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some examples, materials for the second dielectric layer 121 may be the same as materials for the first dielectric layer 111, which may for instance both includes silicon oxide.

It should be understood that the number of the second conductive layers 122 and second dielectric layers 121 adjacent thereto may be set as desired. For example, the number of the second conductive layers 122 may be 1, 2, 3, 4 or more.

In some examples, materials for the second conductive layers 122 include for example conductive materials that may include for example metallic conductive materials such as W, Co, Cu, Al, Ti, Ta and Ni. The work functions of metals should be satisfied that the controlled channel may be turned off by applying a corresponding off voltage to the TSG when the conductive layer 122 serves as the top select gate layer.

In some examples, the conductive materials for the second conductive layers 122 may further include semiconductor materials such as polysilicon, doped silicon, metal silicide (such as NiSix, WSix, CoSix, TiSix) or any combinations thereof. In some examples, the second conductive layer 122 may include for example P-doped (for example, boron doped) polysilicon such that the controlled channel may be turned off by applying a corresponding off voltage to the TSG when the second conductive layer 122 serves as the top select gate layer.

In some examples, materials for the second conductive layer 122 and the materials for first conductive layer 112 may be different. For example, materials for the first conductive layer 112 may include for example metals such as W, Co, Cu, Al, Ti, Ta and Ni, and materials for the second conductive layer 122 may include for example undoped polysilicon or doped polysilicon or metal silicide. As one option, materials for the first conductive layer 112 may include for example W, and materials for the second conductive layer 122 may include boron doped polysilicon.

In some other options, materials for the first conductive layer 112 and the materials for second conductive layer 122 may be identical. For example, both may be polysilicon.

With continued reference to FIG. 9, in some implementations, the storage channel structure 119 and the select channel structure 129 are at least partially aligned in the extension direction of the storage channel structure 119 and the select channel structure 129. The select channel structure 129 may have for example a profile similar to that of the storage channel structure 119. Optionally, the profiles of the select channel structure 129 and the storage channel structure 119 may for example be both similar to an "inverted cone" shape.

Optionally, in the direction parallel to the semiconductor layer 101', the shortest distance L2 between the second ends of adjacent two second channel layers 126 away from the semiconductor layer 101' is greater than the shortest distance L1 between the first ends of adjacent two first channel layers 116 away from the semiconductor layer 101'. It should be understood that the shortest distance between the second ends of adjacent two second channel layers 126 away from the semiconductor layer 101' indicates the shortest distance between the outer periphery surfaces of the adjacent two second ends. The shortest distance between the first ends of adjacent two first channel layers 116 away from the semiconductor layer 101' indicates the shortest distance between the outer periphery surfaces of the adjacent two first ends.

As shown in FIG. 9, the select channel structure 129 and the storage channel structure 119 may both include for example pillar shape, and the diameter of the select channel structure 129 may be smaller than that of the storage channel structure 119. Optionally, the distance between adjacent two select channel structures 129 (such as the distance between outer periphery surfaces of the adjacent two select channel structures 129 in the direction parallel to the semiconductor layer 101') may be greater than the distance between adjacent two storage channel structures 119 (such as the distance between outer periphery surfaces of the adjacent two storage channel structures 110 in the direction parallel to the semiconductor layer 101').

In some examples, the select channel structure 129 may include for example an insulating layer 124 and a second channel layer 126 disposed successively from outside to inside. Optionally, the insulating layer 124 may be disposed between the top select gate (e.g., the second conductive layer 122) and the second channel layer 126 under its control. In some examples, transistors controlled by the top select gates may be for example MOS transistors.

Illustratively, the materials for the second channel layers 126 may include for example amorphous silicon, polysilicon or single crystalline silicon. Optionally, materials for the second channel layer 126 may be the same as materials for the first channel layer 116. Optionally, the second channel layer 126 is for example lightly p-doped. As an option, materials for the insulating layer 124 may include for example insulating materials such as silicon dioxide.

Illustratively, the first end of the first channel layer 116 away from the semiconductor layer 101' may contact the second end of the second channel layer 126 proximate to the semiconductor layer 101'. Optionally, in the direction parallel to the semiconductor layer 101', the maximum width (e.g., diameter) of a first end of the first channel layer 116 is greater than the maximum width (e.g., diameter) of the second end of the second channel layer 126. In some examples, the diameter of the space defined by the second channel layer 126 in any direction parallel to the semiconductor layer 101' may be smaller than the diameter of the space defined by the first channel layer 116 in any direction parallel to the semiconductor layer 101'.

In some examples, in the extending direction of the storage channel structure 119 and the select channel structure 129, the second channel layer 126 may extend into the space defined by the first channel layer 116 and contact the surface of the first dielectric core 117 away from the semiconductor layer 101'.

As an option, the first end of the first channel layer 116 away from the semiconductor layer 101' may enclose outer periphery surfaces of the second end of the second channel layer 126 proximate to the semiconductor layer 101'.

In case that the second channel layer 126 and the first channel layer 116 include the same material, it may be difficult to distinguish the interface where the second channel layer 126 contacts the first channel layer 116, such that the second channel layer 126 and the first channel layer 116 form an integral structure.

As the number of stacked layers in a three-dimensional memory device increases, the stacked height of three-dimensional memory device increases accordingly, and electron transfer efficiency in the channel will be impacted. In some three dimensional memory devices, N-doped channel plugs may be disposed between the select gate structure 120 and the stacked layers 110 to electrically connect channels (such as the second channel layer 126 and the first channel layer 116) controlled by the top select gate (such as the second conductive layer 122) and the control gate (such as the first conductive layer 112), respectively, thereby increasing the current. However, in the programming operation, while applying programming voltage on the word line to be programmed, electrons in the channel plugs would move towards high potential position along the channel. For memory cells that do not need to be programmed, their potentials cannot be increased effectively, allowing electrons to tunnel into memory cells 114 easily, thereby resulting in programming interference. The three-dimensional memory device 200 according to some implementations of the present disclosure includes a first channel layer 116 and a second channel layer 126 that may contact each other directly, thereby improving programming interference problem caused by the introduction of the channel plugs.

In some examples, the select channel structure 129 further includes a second dielectric core 128 disposed in the space defined by the second channel layer 126 and occupies a portion of the bottom of the defined space proximate to the semiconductor layer 101'. Illustratively, the material for the second dielectric core 128 may be the same as material for the first dielectric core 117. Optionally, the above-described insulating layer 124 may be positioned on the surface of the second channel layer 126 facing away from the second dielectric core 128.

It is assumed that the diameter of the channel structure 129 along the direction parallel to the semiconductor layer 101' is selected to be the same, as compared to the second channel layer 126 being a solid structure occupying the space defined by the insulating layer 124, the second channel layer 126 according to some example implementations of the present disclosure has a hollow structure with a relatively thin thickness, thereby improving the controlling capability of the gate over the channel. While operating the three-dimensional memory device 200, the TSG transistor according to some example implementations of the present disclosure has a relatively small threshold voltage, therefore it is easier to turn off the channel controlled by the TSG transistor.

In some implementations, the three-dimensional memory device 200 further includes for example an electrode plug 130 in a portion of the select channel structure 129 away from the semiconductor layer 101', and the electrode plug 130 may be disposed on the surface of the second dielectric core 128 away from the semiconductor layer 101' and connected with the second channel layer 126. Optionally, the electrode plug 130 may further serve as a portion of the drain of the corresponding memory cell string.

In some implementations, the three-dimensional memory device 200 further includes for example a gate line slit structure (not shown) penetrating through the stacked layers 110 and the select gate structure 120. Some example gate line slit structures may divide the memory array included in the three-dimensional memory device 200 (e.g., the memory array 401 shown in FIG. 1) into a plurality of block regions, some other example gate line slit structures may divide each block region into a plurality of finger-like regions. Therefore, it is possible to individually control memory cells of the individual finger-like region during operation of the three-dimensional memory device 200.

In some implementations, the three-dimensional memory device 200 further includes for example a top select gate cut line 132 disposed in the select gate structure 120. As an option, the top select gate cut line may for example penetrate through the region between adjacent two select channel structures 129. Optionally, the top select gate cut line 132 may for example further penetrate through the second conductive layer 122 and stop at the bottom surface of one second dielectric layer 121 in contact with the stacked layers 110 that is proximate to the semiconductor layer 101'.

In some examples, the top select gate cut line 132 can divide the finger-like region into a plurality of sub-regions, thereby controlling desired sub-regions accurately during operation of the three-dimensional memory device, efficiently reducing programming, reading and erasing time and data transmission time, and improving data processing efficiency. The top select gate cut line 132 may further enable the top select gate layer (e.g., the second conductive layer 122) in the select gate structure 120 to control corresponding TSG transistor independently.

With the three-dimensional memory device 200 according to some implementations of the present disclosure, since the distance between any adjacent two select channel structures 129 included therein is greater than the distance between any adjacent two storage channel structures 119 included therein, it is possible to guarantee the process window for the top select gate cut line 132 as much as possible, reduce the occupation of additional area of the stacked layers 110 by the top select gate cut line 132, thereby, to some extent, reducing the loss of storage density.

Figure 10:
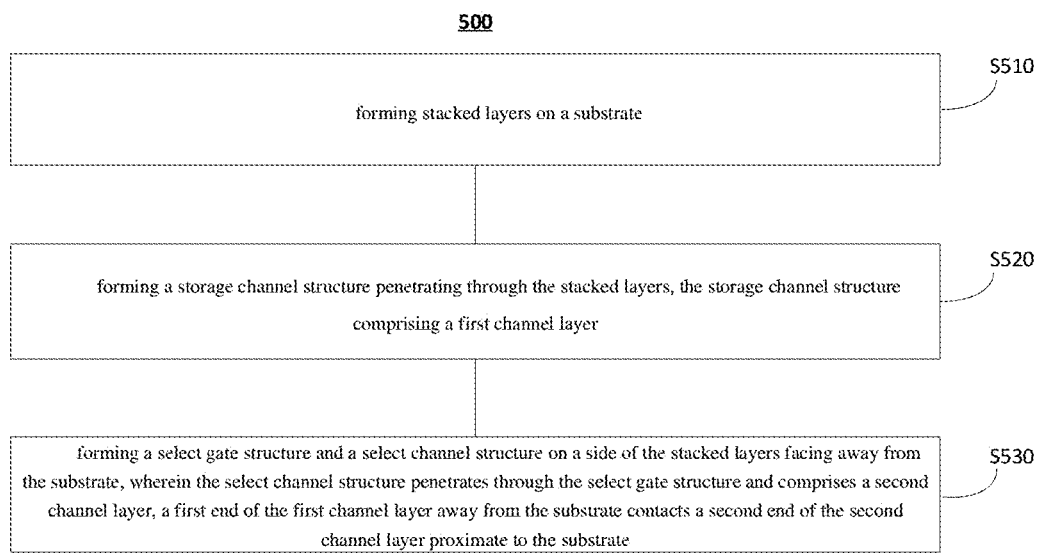
FIG. 10 is a schematic flow chart of a manufacturing method of another three-dimensional memory device according to some implementations of the present disclosure.

FIG. 10 illustrates a schematic flow diagram of a manufacturing method 500 for a three-dimensional memory device 200 according to some implementations of the present disclosure. FIGS. 11A-11L illustrate partial schematic diagrams of the device structure after implementing some operations in the manufacturing method 500 of a three-dimensional memory device 200 according to some implementations of the present disclosure. The method 500 will be described in detail below with reference to FIGS. 10 to 11L.

Figure 11A:
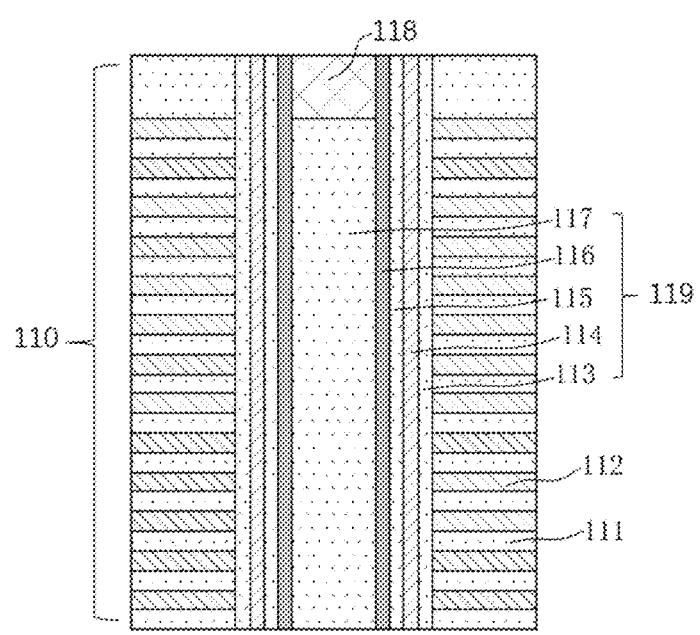
FIGS. 11A-11L are partial schematic diagrams of the device structure after implementing some operations in the manufacturing method of another three-dimensional memory device according to some implementations of the present disclosure.

With reference to FIG. 10, the manufacturing method 500 starts with operation S510, where stacked layers may be formed on the substrate. As shown in FIG. 11A, stacked layers 110 may be formed on the substrate (not shown). In some implementations, any suitable semiconductor material such as single crystalline silicon (Si), single crystalline germanium (Ge), silicon germanium (GeSi), silicon carbide (SiC), silicon on insulator (SOI), germanium on insulator (GOI) or gallium arsenide may be selected for the preparation of the substrate.

In some examples, the stacked layers 110 may include a plurality of first dielectric layers 111 and a plurality of first conductive layers 112 stacked alternatively, wherein the first conductive layers 112 may serve as control gate layers for leading out word lines (not shown). In some examples, when the first conductive layer 112 includes for example metallic conductive materials, the first conductive layer 112 may be formed with the gate replacement process. As an option, the gate replacement process includes for example: stacking alternatively a plurality of first dielectric layers 111 and a plurality of sacrificial dielectric layers (not shown) on a substrate, then after for example forming gate line slits (not shown), removing the sacrificial dielectric layers via the gate line slits and replacing with the above-described metallic conductive material to form the first conductive layer 112. The above-described gate line slits are used, for example, to form the gate line slit structures.

In some examples, the materials for the first dielectric layers 111 may include for example silicon oxide, silicon nitride or silicon oxynitride.

Referring to FIG. 10, the method 500 proceeds to operation S520, where a storage channel structure penetrating through the stacked layers may be formed, the storage channel structure includes the first channel layer With continued reference to FIG. 11A, in some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device.

Illustratively, the first channel layer 116 is for example lightly p-doped. As an option, the first dielectric core 117 may for example fill at least a portion of space defined by the first channel layer 116. Illustratively, as a solid body, the first dielectric core 117 may fill up the portion of space defined by the first channel layer 116 in the direction proximate to the substrate.

In some examples, the materials for the blocking layer 113 may include for example silicon oxide, silicon oxynitride, high-k dielectric or any combination thereof. The materials for the storage layer 114 may include for example silicon nitride, silicon oxynitride, silicon or any combination thereof. The materials for the tunneling layer 115 may include for example silicon oxide, silicon oxynitride or any combination thereof. In one implementation, the functional layer may be for example a composite layer including silicon oxide/silicon oxynitride/silicon oxide (ONO).

In some examples, the materials for the first channel layers 116 may include for example amorphous silicon, polysilicon or single crystalline silicon or the like. As an option, the first channel layer 116 may not be doped. As another option, the first channel layer 116 may be lightly P-doped. In some examples, the materials for the first dielectric core 117 may include for example insulating materials such as silicon oxide.

With reference to FIG. 10, the method 500 proceeds to operation S530, where a select gate structure and a select channel structure may be formed on a side of the stacked layers facing away from the substrate, wherein the select channel structure penetrates through the select gate structure and includes a second channel layer, the first end of the first channel layer away from the substrate contacts the second end of the second channel layer proximate to the substrate.

With continued reference to FIG. 11A, a portion of the storage channel structure 119 away from the substrate may be removed and a sacrificial plug 118 in contact with the first channel layer 116 is formed on the remaining portion of the storage channel structure 119. In some examples, the portion of the first dielectric core 117 away from the substrate may be removed by using for example dry or wet etch process, and the sacrificial plug 118 in contact with the first channel layer 116 may be formed by using suitable deposition processes on the remaining portion of the first dielectric core 117. Illustratively, the surface of the sacrificial plug 118 away from the substrate may be planarized by using for example chemical mechanical polishing (CMP) process such that the surface of the sacrificial plug 118 away from the substrate is substantially flush with the surface of the stacked layers 110 away from the substrate. Illustratively, the material for the sacrificial plug 118 may be the same as material for the first channel layer 116. As an option, the sacrificial plug 118 may serve as an etch stop layer in subsequent processes such that the etch process may stop at the surface of the sacrificial plug 118 away from the substrate.

Figure 11B:
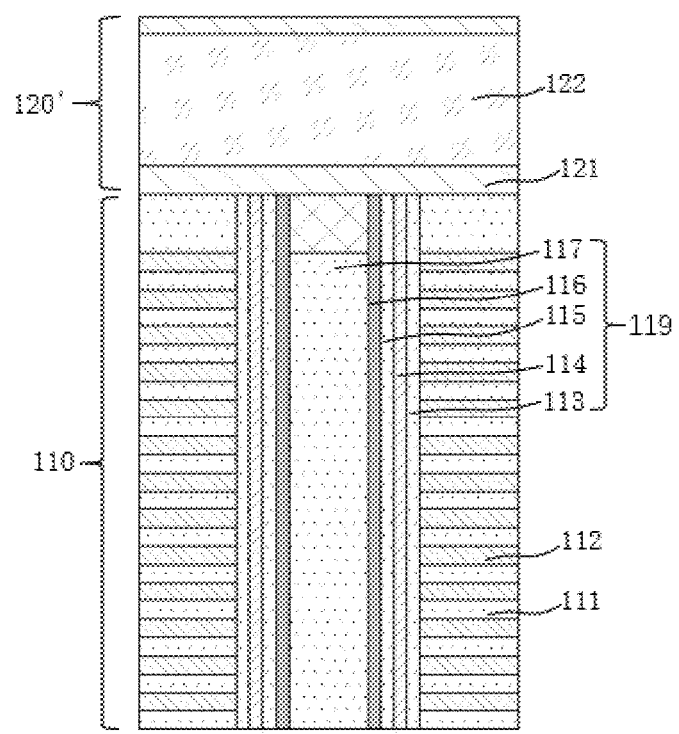

As shown in FIG. 11B, in contrast to the gate replacement process, in the example in which the material for the second conductive layer 122 and the material for the first conductive layer 112 are different, for example, the second conductive layer 122 includes polysilicon or metal silicide, and the first conductive layer 112 includes metal, it is possible to form the initial select gate structure 120' by forming the second conductive layer 122 and the second dielectric layers 121 on the side of the stacked layers 110 (FIG. 11A) facing away from the substrate with direct deposition process, such as CVD, PVD, ALD or thin film deposition process of any combination thereof, wherein the second conductive layer 122 may be located between adjacent second dielectric layers 121.

Optionally, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer. As an option, one second dielectric layer 121 proximate to the substrate and one first dielectric layer 111 away from the substrate may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some examples, the channel hole 123 may have for example a profile similar to that of the storage channel structure 119. Optionally, in the direction parallel to the substrate, the maximum width (e.g., diameter) of the end of the channel hole 123 proximate to the substrate is smaller than the maximum width (e.g., diameter) of the end of the storage channel structure 119 away from the substrate.

In some other examples, it is also possible to alternatively form a plurality of second dielectric layers 121 and a plurality of second conductive layers 122 on the stacked layers 110 to form the initial select gate structure 120', wherein the second dielectric layers 121 and the second conductive layers 122 are disposed in pair to extend from the side of the stacked layers 110 facing away from the substrate towards the direction away from the substrate.

In some examples, materials for the second dielectric layer 121 may be the same as material for the first dielectric layer 111, which may for instance both includes silicon oxide.

Figure 11C:
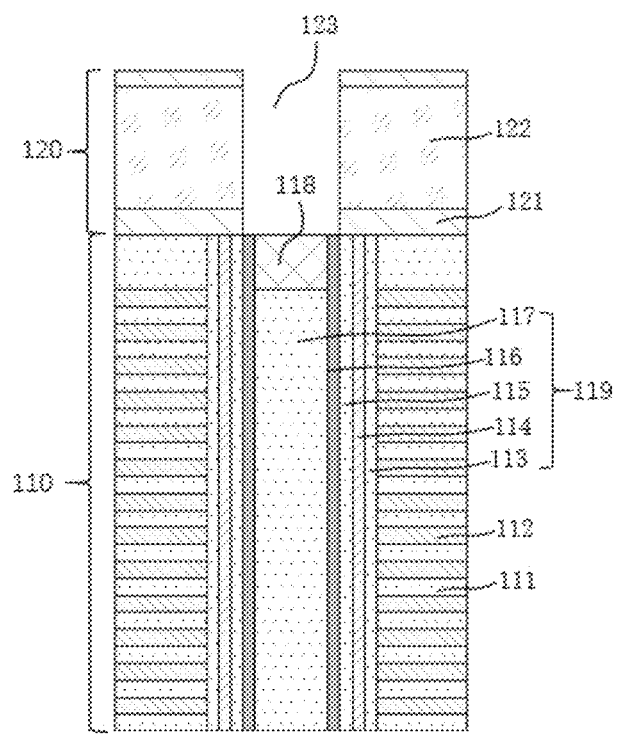

In some implementations, as shown in FIG. 11C, a channel hole 123 penetrating through the initial select gate structure 120' may be formed therein by suitable dry or wet etch process, wherein the initial select gate structure 120' formed with the channel hole 123 is the select gate structure 120. Optionally, in the extending direction of the storage channel structure 119 and the channel hole 123, the channel hole 123 and the storage channel structure 119 are aligned at least in part. Illustratively, the channel hole 123 may penetrate through the initial select gate structure 120' and expose the sacrificial plug 118. In some examples, the channel plug 118' may serve as the stop layer for the channel hole 123 such that the formed channel hole 123 may stop at the surface of the channel plug 118' away from the substrate. Optionally, the channel hole 123 may expose at least a portion of the channel plug 118' away from the substrate.

Figure 11D:
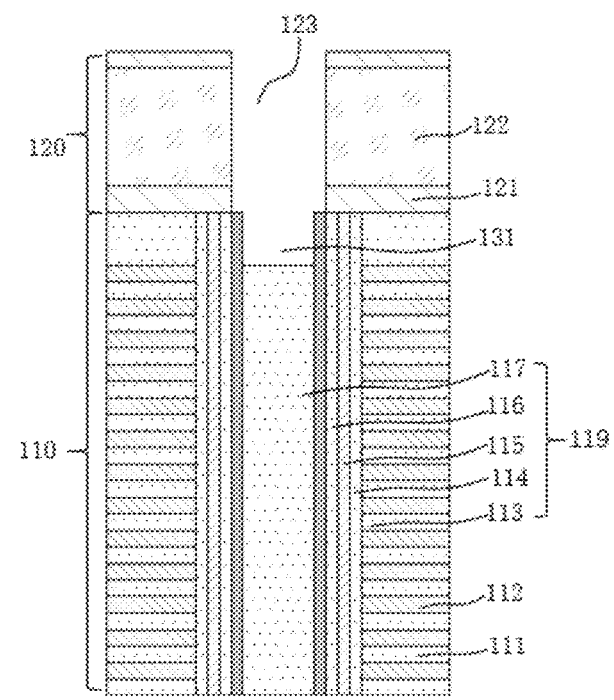

In some examples, referring to FIG. 11D, the sacrificial plug 118 may be removed by dry etch process, wet etch process or any combinations thereof, and the space formed after removal of the sacrificial plug 118 is a cavity 131. Illustratively, a select channel structure may be formed in the channel hole 123 and the cavity 131. More specifically, an insulating layer 124 as shown in FIG. 11I is formed on the side wall of the channel hole 123 and the second channel layer 126 as shown in FIG. 11J in contact with the first channel layer 116 is formed on the surface of the insulating layer 124 and in the cavity 131.

Figure 11E:
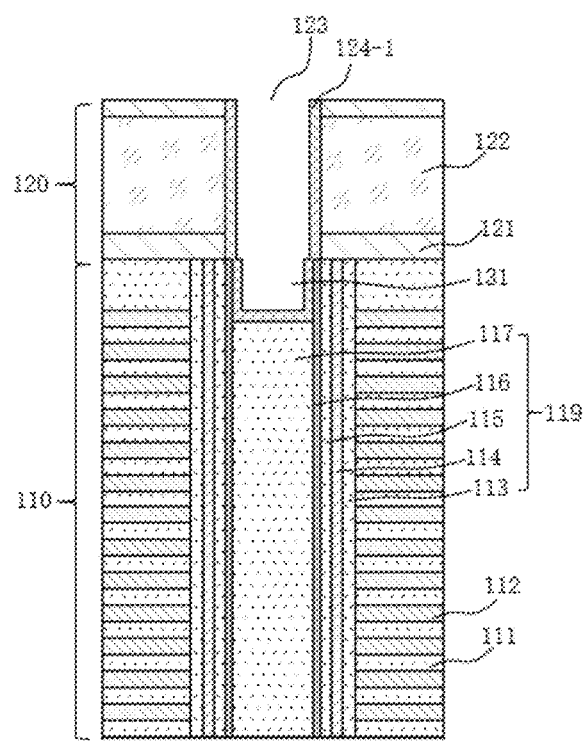

As an option, as shown in FIG. 11E, it is possible to form the initial insulating layer 124-1 on the side wall of the channel hole 123 and on the inner wall of the cavity 131 by thin film deposition process such as CVD, PVD, ALD and any combination thereof. Optionally, it is also possible to form the initial insulating layer 124-1 (not shown) on the top surface of one second dielectric layer 122 away from the substrate. Referring to FIG. 11I, in some examples, it is possible to remove a portion of the initial insulating layer 124-1 in the cavity 131 by using dry or wet etch process to form the insulating layer 124. With reference to FIG. 11J, in some examples, it is possible to form the second channel layer 126 in contact with the first channel layer 116 on the surface of the insulating layer 124 and on the inner wall of the cavity 131 by using suitable deposition process.

Figure 11F:
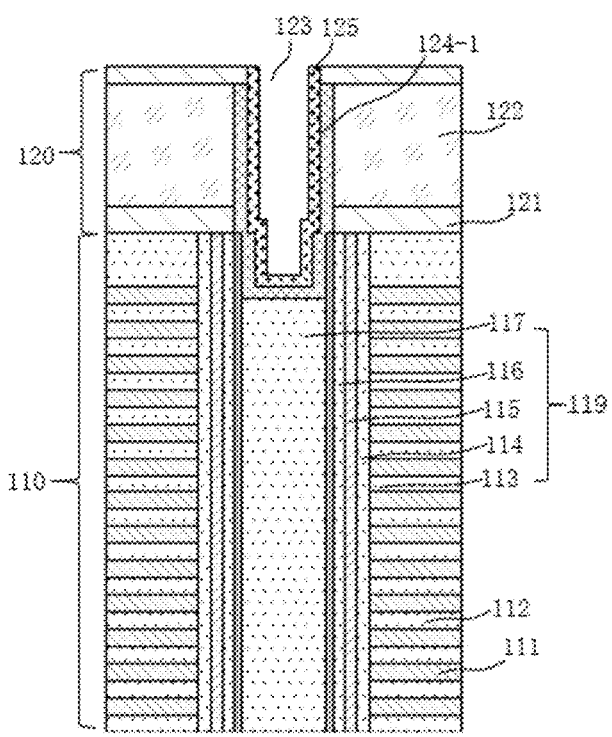
Figure 11G:
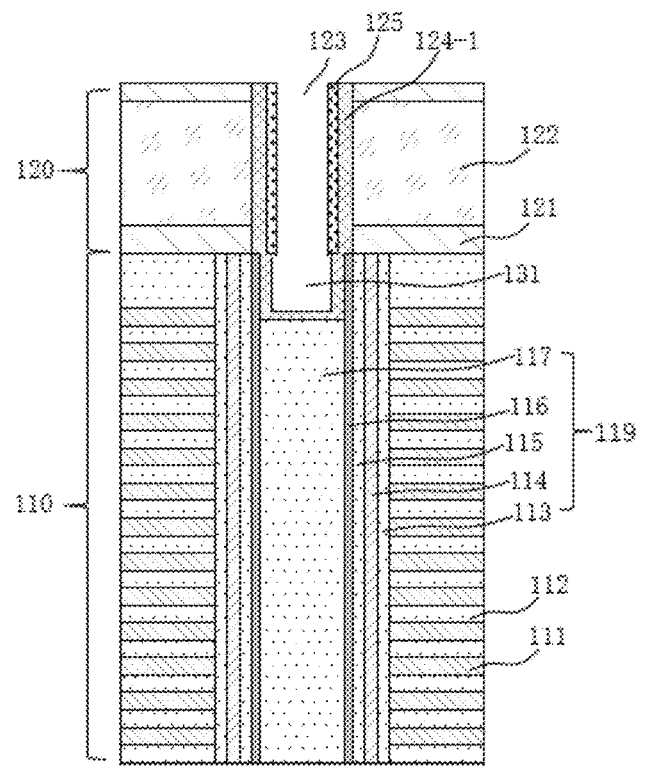

As another option, as shown in FIG. 11F, a sacrificial layer 125 may be formed on the surface of the initial insulating layer 124-1 after forming the initial insulating layer 124-1. Illustratively, it is possible to deposit any suitable semiconductor materials on the surface of the initial insulating layer 124-1 by using one or more thin film deposition processes such as ALD, CVD, PVD, any other suitable processes or any combinations thereof to form the sacrificial layer 125. As shown in FIG. 11G, in some examples, it is possible to remove the portion of the sacrificial layer 125 that are on the inner wall of the cavity 131 by using anisotropic dry etch process. In some examples, the sacrificial layer 125 and the insulating layer 124 may include different materials such that they have difference in etch selection. For example, the sacrificial layer 125 may include silicon (poly silicon, single crystalline silicon), and the insulating layer 124 may include silicon oxide.

Figure 11H:
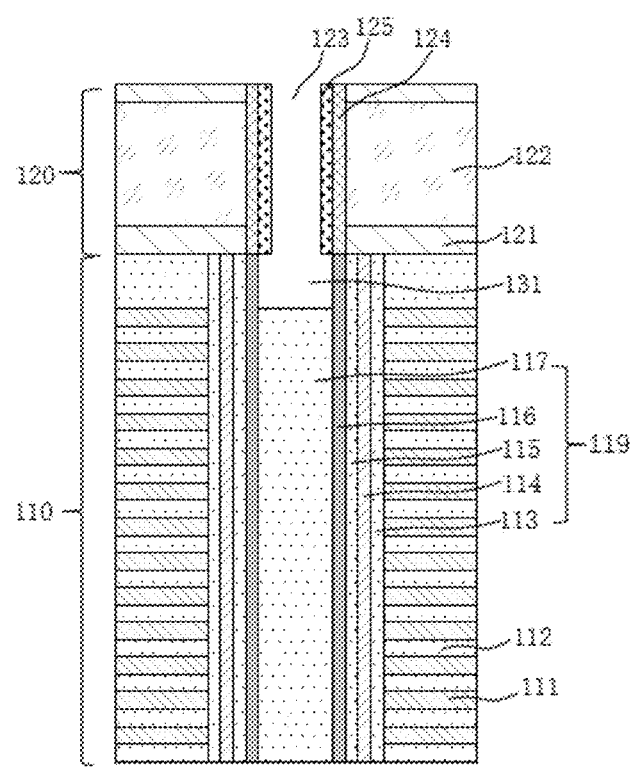
Figure 11I:
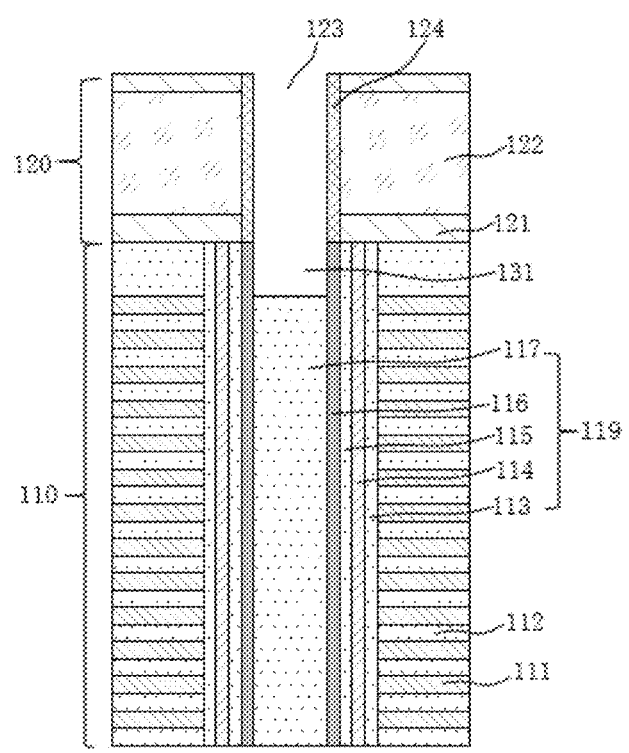
Figure 11J:
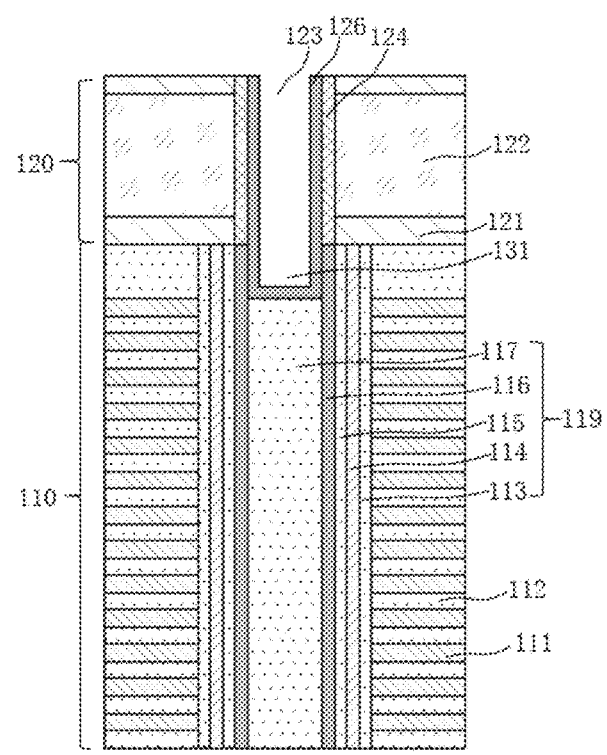

In some implementations, as shown in FIG. 11H, it is possible to continue to remove a portion of the insulating layer 124 that is on the inner wall of the cavity 131 by suitable etch process to expose the first channel layer 116 in the direction away from the substrate. Optionally, after removing portion of the insulating layer 124 that is on the inner wall of the cavity 131, the initial insulating layer 124-1 forms the insulating layer 124. In the process of removing the portion of the insulating layer 124 that is on the inner wall of the cavity 131 by etch process, the sacrificial layer 125 may serve as the etch protection layer such that the portion of the initial insulating layer 124-1 on the side wall of the channel hole 123 would not be damaged in the above process, thereby protecting the insulating layer 124 as shown in FIG. 11H. Optionally, it is further possible to expose the surface of the first dielectric core 117 away from the substrate in the process of removing the portion of the insulating layer 124 that is on the inner wall of the cavity 131.

Optionally, as shown in FIG. 11I, the remaining portion of the etch protection layer may be completely removed after the portion of the initial insulating layer 124-1 that is on the inner wall of the cavity 131 is removed.

In some other examples in which the sacrificial layer 125 includes polysilicon, the sacrificial layer 125 may serve as the first initial channel layer (not shown). It is possible to form a second initial channel layer (not shown) on a portion of the first initial channel layer that is on the sidewall of the channel hole 123 and on the inner wall of the cavity 131 by using suitable deposition process after removing the portions of the sacrificial layer 125 and the initial insulating layer 124-1 that are in the cavity 131 successively. The portion of the first initial channel layer that is on the sidewall of the channel hole 123 and the second initial channel layer may together serve as the second channel layer 126.

In some examples, as shown in FIG. 11J, it is possible to form the second channel layer 126 on the surface of the insulating layer 124 and on the inner wall of the cavity 131 by using one or more thin film deposition processes such as ALD, CVD, PVD, any other suitable processes or any combinations thereof. Optionally, it is further possible to form a second channel layer 126 in contact with the first channel layer 116 on the exposed surface of the first dielectric core 117. Optionally, the second channel layer 126 may be lightly P-doped to form the doped second channel layer 126.

In case that the second channel layer 126 and the first channel layer 116 include the same material, it may be difficult to distinguish the interface between the second channel layer 126 and the first channel layer 116, such that the second channel layer 126 and the first channel layer 116 form an integral structure.

With the method 300 according to some implementations of the present disclosure, on the one hand, it is possible to form the first channel layer 116 and the second channel layer 126 by two processes such that the two channel layers have uniform thickness, thereby improving the controlling capability of the gate over the channel; and on the other hand, the first channel layer 116 can contact and connect with the second channel layer 126 directly, thereby avoiding introduction of the channel plug and mitigating the problem of programming interference.

Figure 11K:
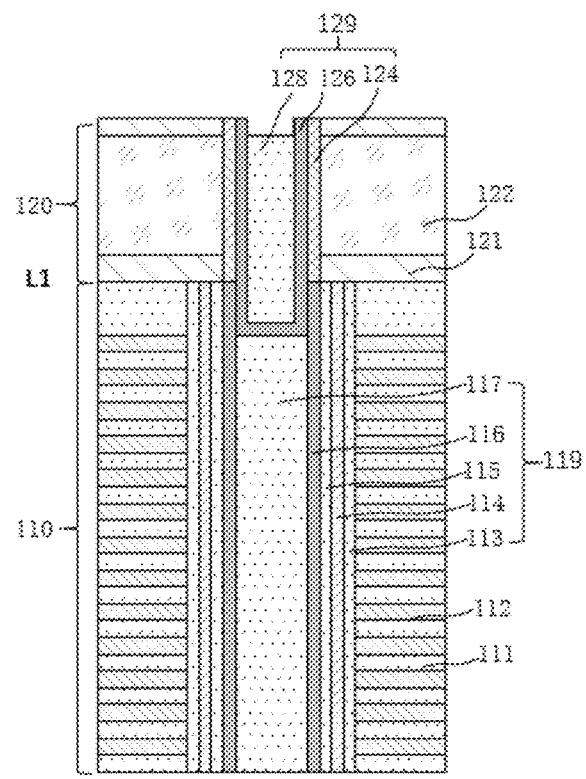

In some implementations, as shown in FIG. 11K, it is possible to form the second dielectric core 128 in at least portion of the space defined by the second channel layer 126, thereby forming the select channel structure 129. During the operation of the three-dimensional memory device, the select channel structure 129 is controlled by for example the top select gate (e.g., the second conductive layer 122). Illustratively, it is possible to form the second dielectric core 128 in the space defined by the second channel layer 126 by using a deposition process such as ALD, CVD, PVD, any other suitable process or any combinations thereof. The materials for the second dielectric core 128 include for example silicon oxide. As an option, the materials for the second dielectric core 128 may be the same as materials for the first dielectric core 117.

In some implementations, the select channel structure 129 may have for example a profile similar to that of the storage channel structure 119. Optionally, the select channel structure 129 and the storage channel structure 119 may both include the pillar shape. In some examples, in the direction parallel to the substrate, the diameter of the select channel structure 129 at any place is smaller than that of the storage channel structure 119 at any place.

Figure 11L:
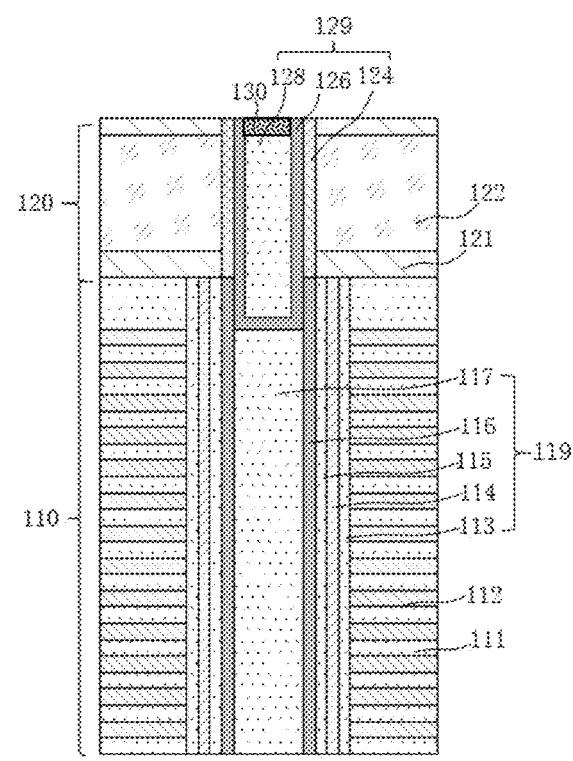

In some implementations, as shown in FIG. 11L, an electrode plug 130 in contact with the second channel layer 126 may be formed at the end of the select channel structure 129 away from the substrate. Illustratively, it is possible to remove a portion of the second dielectric core 128 away from the substrate by suitable etch process, and then form an electrode plug 130 on the surface of the second dielectric core 128 away from the substrate by using a deposition process such as ALD, CVD, PVD or any combinations thereof. In some examples, the electrode plug may further serve as a portion of the drain of the corresponding memory cell string. In in some examples including the electrode plug 130, in the direction perpendicular to or substantially perpendicular to the substrate, the length of the second dielectric core 128 may be smaller than that of the second channel layer 126.

In some implementations, it is possible to remove the substrate in suitable operations after forming the select channel structure 129, and then for example, form the semiconductor layer 101' as shown in FIG. 9 on the stacked layers 110 after removing the substrate. The semiconductor layer 101' may be for example in contact with the first channel layer 116 and electrically connect the first channel layers 116 of the respective storage channel structures 119.

In some implementations, it is further possible to form the top select gate cut line 132 as shown in FIG. 9 in the select gate structure 120 in suitable operations, for example after forming the select channel structure 129.

Since the contents and structures involved in the forgoing description of the three-dimensional memory device 200 may be fully or partially suitable to serve as the same or similar structures involved in the description of the manufacturing method 500 of three-dimensional memory device herein, no repetition will be made to the related or similar description.

Figure 12:
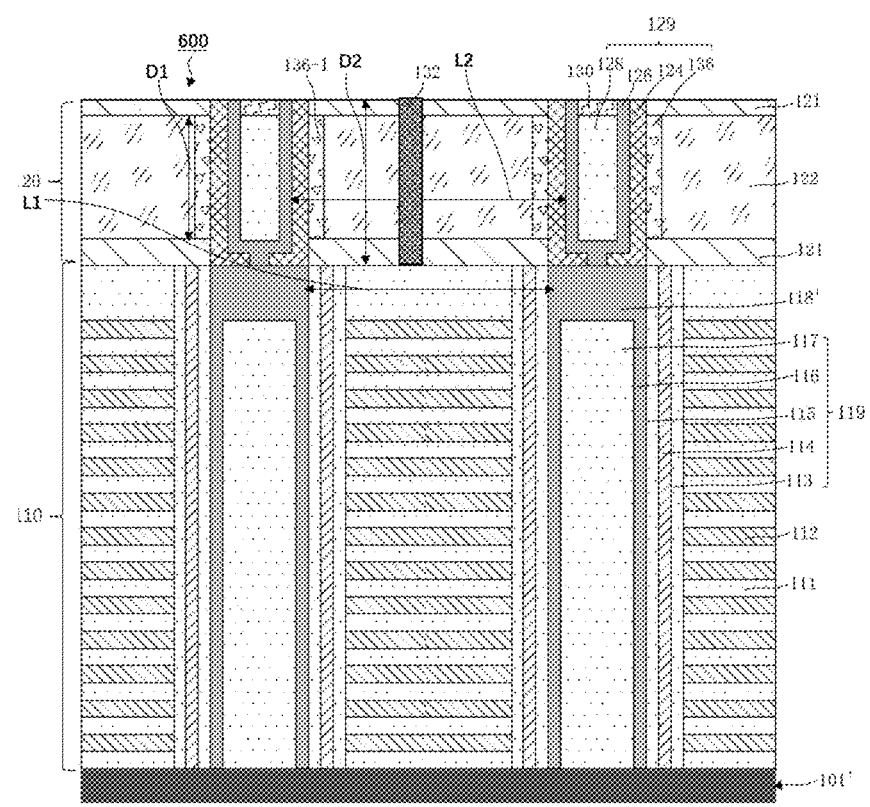
FIG. 12 is a partial schematic diagram of yet another three-dimensional memory device according to some implementations of the present disclosure.
Figure 13:
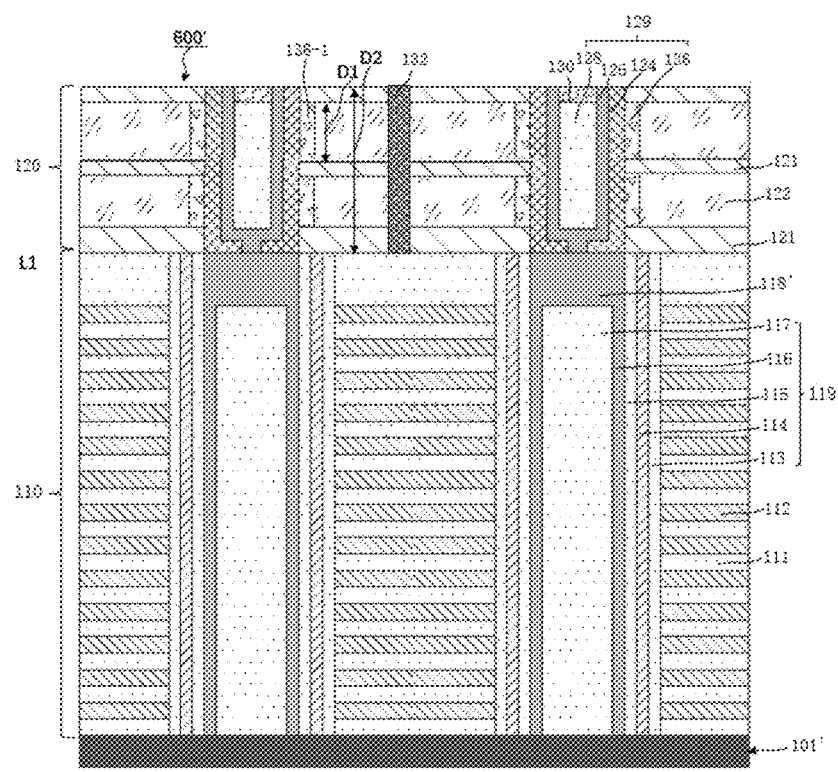
FIG. 13 is a partial schematic diagram of yet another three-dimensional memory device according to some implementations of the present disclosure.
Figure 14:
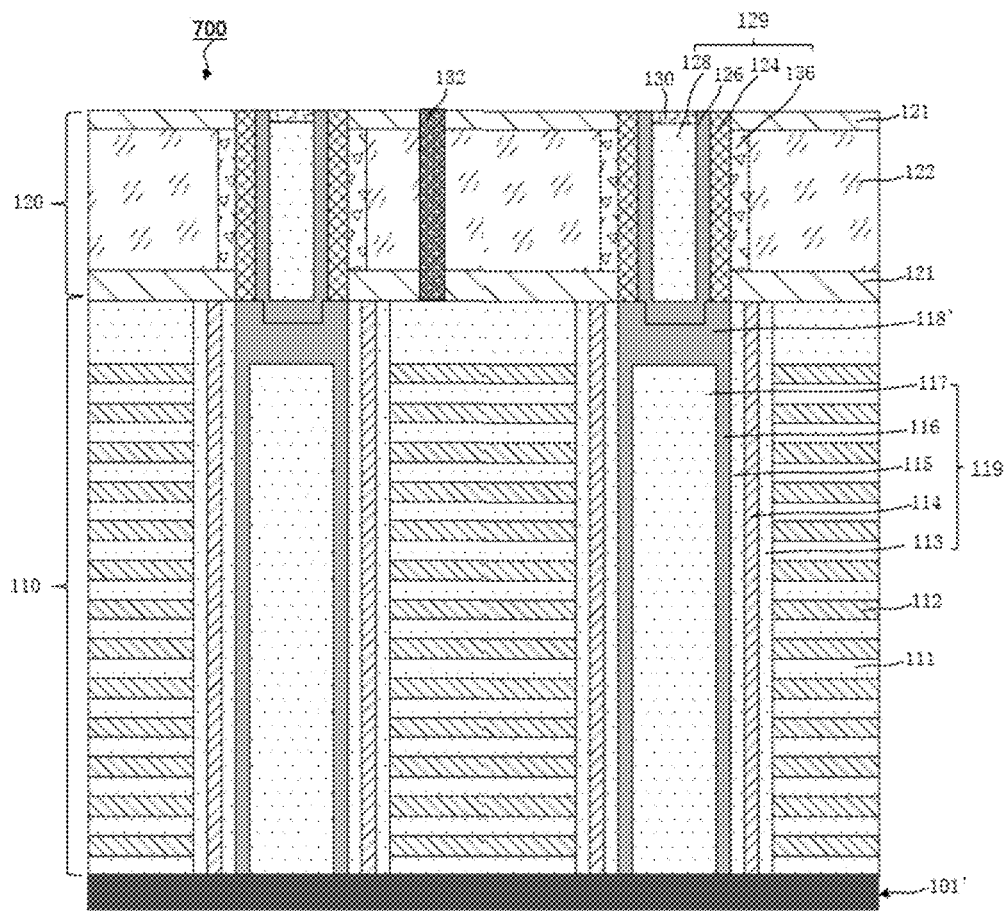
FIG. 14 is a partial schematic diagram showing yet another three-dimensional memory device according to some implementations of the present disclosure.

FIGS. 12 to 14 illustrate partial schematic diagrams of three-dimensional memory device 600, three-dimensional memory device 600' and three-dimensional memory device 700 according to some implementations of the present disclosure. The three-dimensional memory device 600, three-dimensional memory device 600' and three-dimensional memory device 700 may serve as three examples of the memory device 404 as described above. Relevant features of the semiconductor layers 101', the stacked layers 110, the channel plugs 118', the select gate structures 120, the storage channel structures 119, the select channel structures 129, the gate line slit structures and the top select gate cut lines 132 included in the three-dimensional memory device 600, three-dimensional memory device 600' and three-dimensional memory device 700 according to the implementation, respectively, are at least in part the same as or similar to the features included in corresponding structures in three-dimensional memory device 100. Therefore, same or similar contents will not be repeated herein.

In the three-dimensional memory device 100, when the second conductive layer 122 includes doped conductive particles such as boron doped polysilicon, on the one hand, due to small atomic weights, boron atoms tend to diffuse such that it is difficult to increase doping concentration, thereby weakening the capability of adjusting threshold voltage of TSG transistors. On the other hand, the second conductive layer 122 contacts the insulating layer 124 directly, which allows boron atoms to diffuse into the insulating layer 124, thereby bringing about adverse effect on reliability of TSG transistors during operation of the three-dimensional memory device 100.

As shown in FIG. 12, the select channel structure 129 of three-dimensional memory device 600 may include a block layer 136, an insulating layer 124, a second channel layer 126 and a second dielectric core 128 stacked from outside to inside. It should be understood that the expression "from outside to inside" used herein may indicate the direction from the outer surface of the select channel structure 129 that contacts the select gate structure 120 towards the center axis of the select channel structure 129.

In some examples, the conductive layer 122 may contact the block layer 136. In the extending direction of the select channel structure 129, the length of the portion of the conductive layer 122 that contacts the block layer 136 is the same as the length of the block layer 136.

FIG. 12 shows an example in which the number of the second conductive layer 122 is one. In the example, the block layer 136 includes for example a block portion 136-1. Optionally, the block portion 136-1 may be disposed between adjacent second dielectric layers 121 for example. Optionally, the block portion 136-1 may be on the surface of the corresponding second conductive layer 122 in the extending direction of the select channel structure 129 such that the block portion 136-1 may be located between the respective second conductive layer 122 and the insulating layer 124. As an option, the length of the block portion 136-1 in the extending direction of the select channel structure 129 may be the same as that of the corresponding second conductive layer 122 in the same direction. Optionally, in the same horizontal direction parallel to the semiconductor layer 101', the diameter of the second conductive layer 122 is smaller than that of the second dielectric layer 121.

Illustratively, in the three-dimensional memory device 600, the insulating layer 124 may be on the surfaces of the block portion 136-1 and the second dielectric layer 121 in the extending direction of the select channel structure 129, and the second channel layer 126 may be on the surface of the insulating layer 124. Therefore, in the extending direction of the select channel structure 129, the length D1 of the block portion 136-1 is smaller than the length D2 of at least one of the insulating layer 124 or the second channel layer 126 in the same direction.

FIG. 13 shows an example in which the number of the second conductive layer 122 is two. As shown in FIG. 13, the block layer 136 of the three-dimensional memory device 600' may include two block portions 136-1 disposed in segments. In some other examples, e.g., a plurality of examples in which the number of the second conductive layers 122 is more than three, the block layer 136 may include a plurality of discontinuous block portions 136-1. The number of block portions 136-1 is not limited herein. In an example in which the block layer 136 includes a plurality of block portions 136-1, in the extending direction of the select channel structure 129, the length of the block layer 136 (i.e., the total length of the plurality of block portions 136-1) may be smaller than the length D2 of at least one of the insulating layer 124 or the second channel layer 126 in the same direction.

The block layer 136 according to some implementations of the present disclosure may effectively prevent conductive particles doped in the second conductive layer 122 (e.g., boron atoms) from diffusing towards the insulating layer 124, which on the one hand can improve the doping concentration of the second conductive layer 122, thereby improving the conductivity of the second conductive layer 122; and on the other hand can reduce the diffusion concentration of impurity such as boron atoms in the insulating layer 124, thereby reducing influence of impurity on reliability of the TSG transistors.

In some examples, the dielectric constant of the block layer 136 may be greater than that of the insulating layer 124. In some examples, the materials for the block layer 136 may include for example silicon oxynitride, and the materials for the insulating layer 124 may include for example silicon oxide. In the example in which the material for the block layer 136 includes for example silicon oxynitride, as nitrogen contents in the block layer 136 increases, the content of the diffused impurity such as boron atoms in the insulating layer 124 decreases accordingly. Therefore, to some extent, increasing nitrogen content in the block layer 136 may enhance its blocking function for impurity diffusion.

In the three dimensional memory devices as shown in FIGS. 12 and 13, in addition to the surfaces of the block layer 136 and the second dielectric layer 121 in the direction of the select channel structure 129, the insulating layer 124 may also be on at least a portion of the surface of the channel plug 118' away from the semiconductor layer 101'. In the three-dimensional memory device 700 shown in FIG. 14, the second channel layer 126 may extend into the channel plug 118'.

In some other examples in which the three-dimensional memory device 700 does not include the channel plug 118', the end of the second channel layer 126 proximate to the semiconductor layer 101' may directly contact the end of the first channel layer 116 away from the semiconductor layer 101' for electrical connection of each other. In some cases where the second channel layer 126 and the first channel layer 116 include the same material, the second channel layer 126 and the first channel layer 116 may further form an integral structure.

Figure 15:
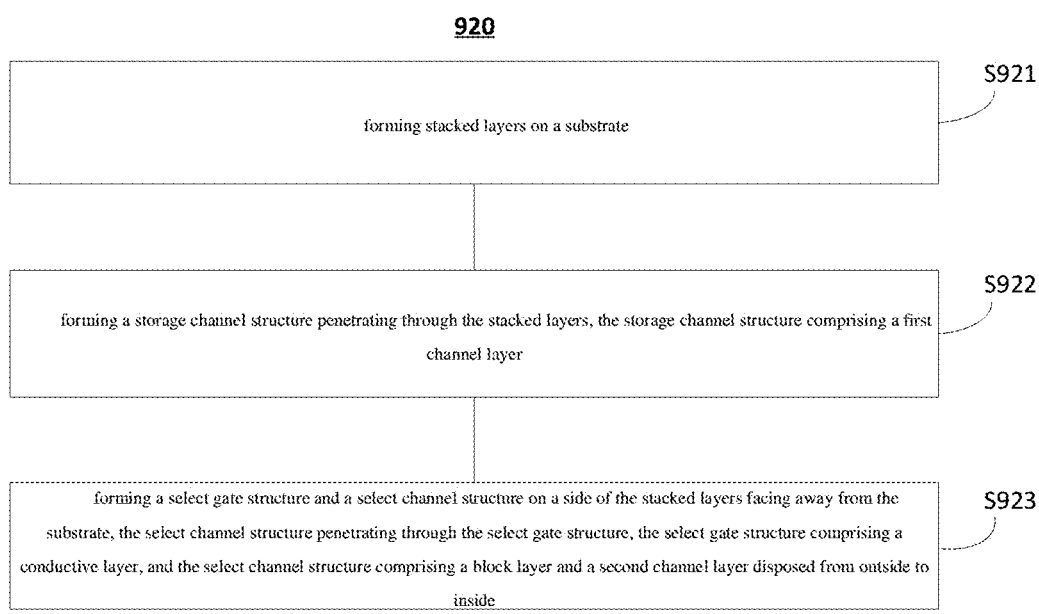
FIG. 15 is a schematic flow chart of a manufacturing method of yet another three-dimensional memory device according to some implementations of the present disclosure.
Figure 16A:
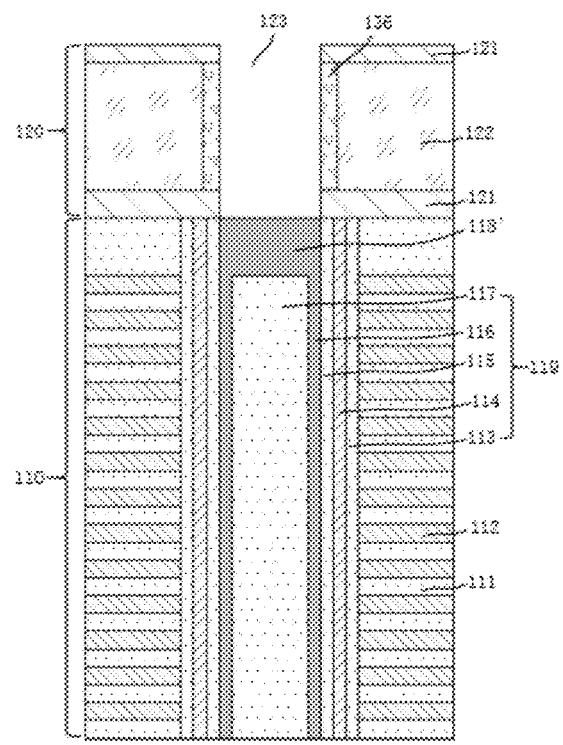
FIGS. 16A-16R are partial schematic diagrams of the device structure after implementing some operations in the manufacturing method of yet another three-dimensional memory device according to some implementations of the present disclosure.
Figure 16B:
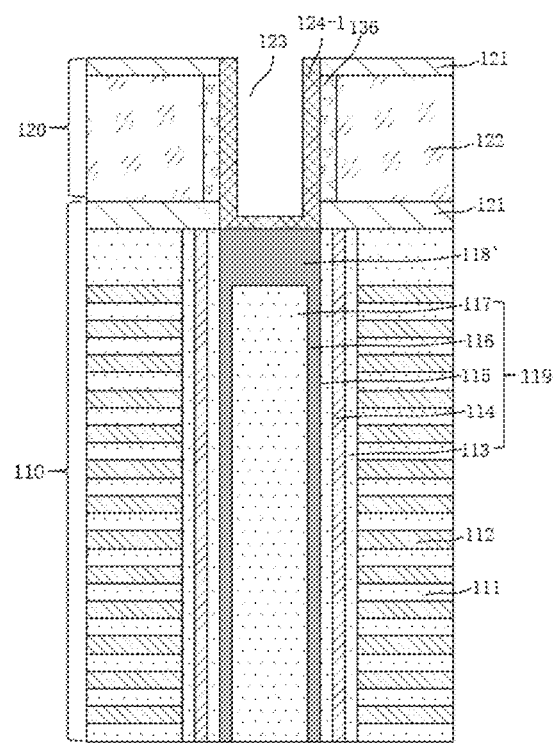
Figure 16C:
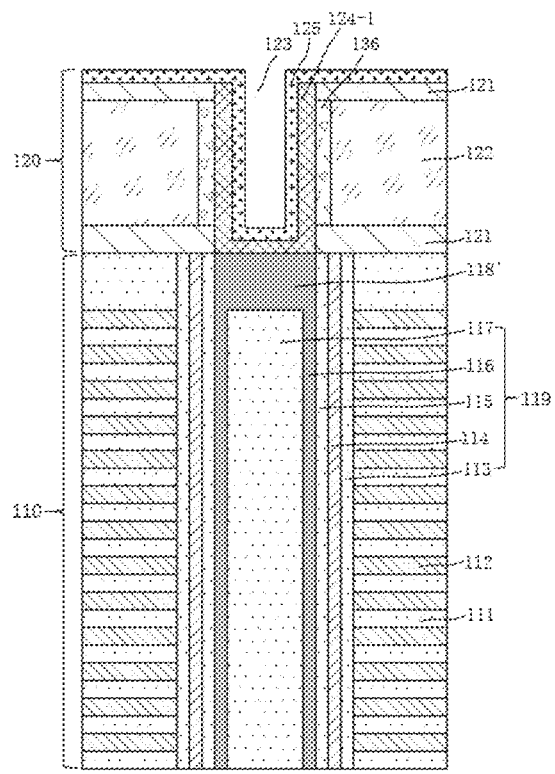
Figure 16D:
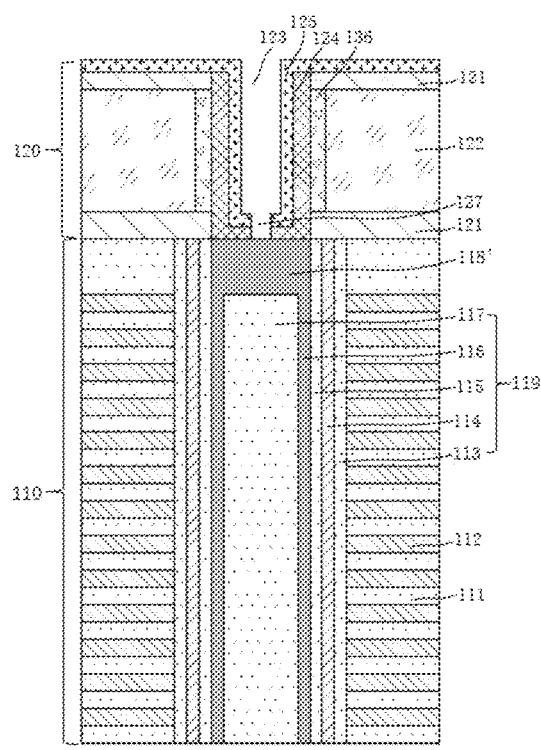
Figure 16E:
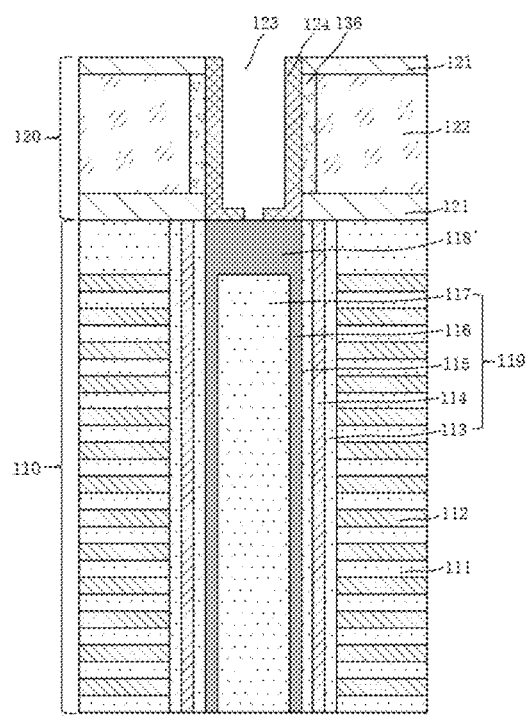
Figure 16F:
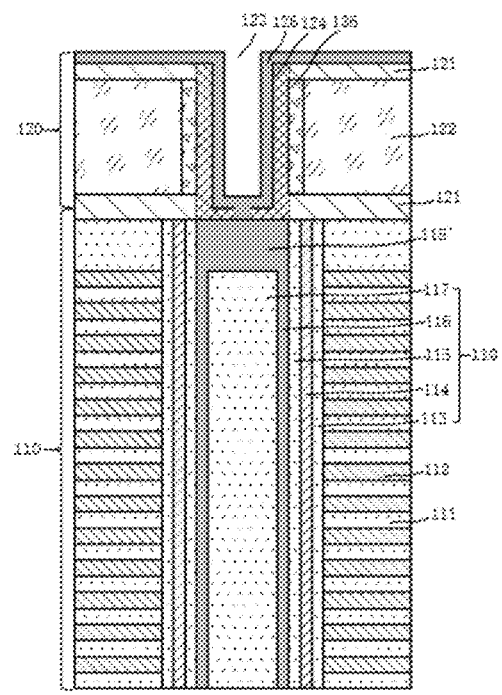
Figure 16G:
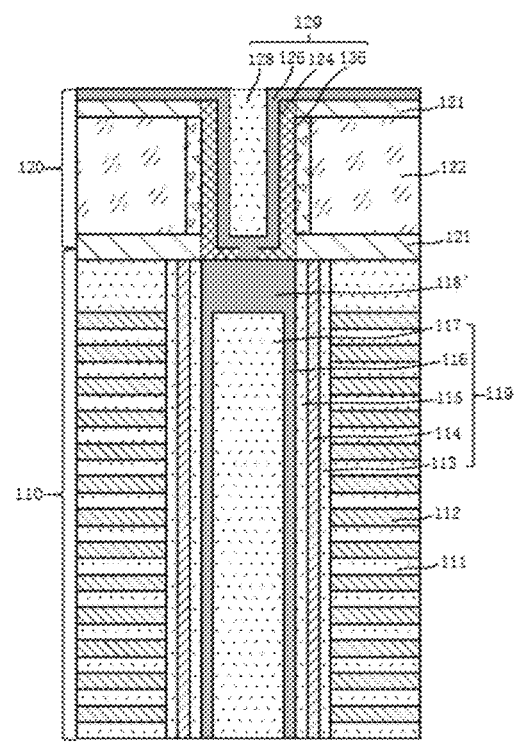
Figure 16H:
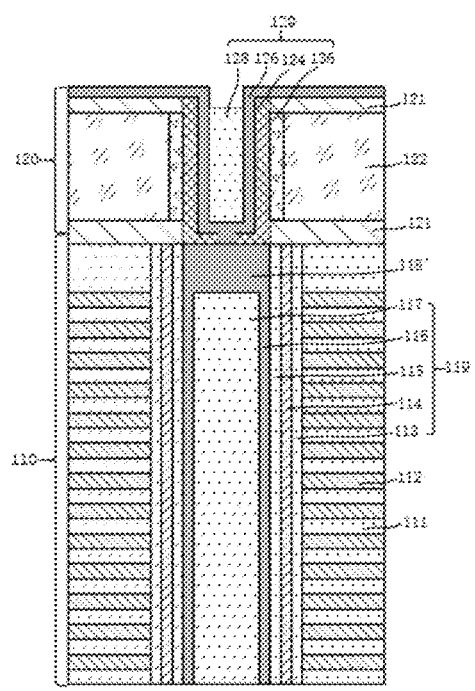
Figure 16I:
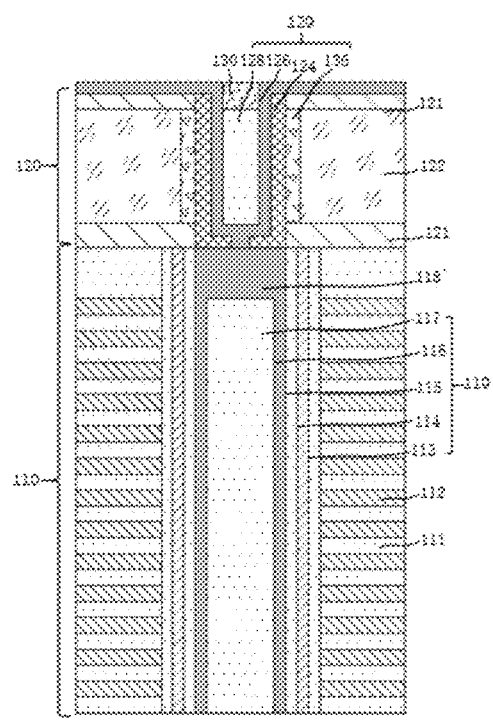
Figure 16J:
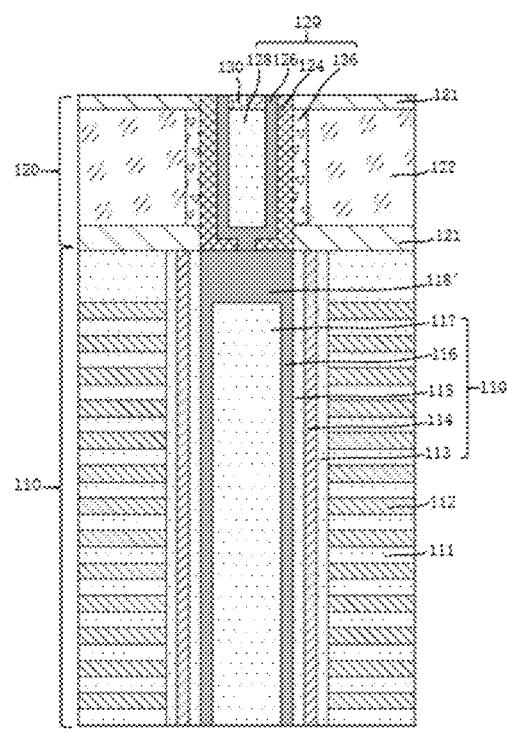
Figure 16K:
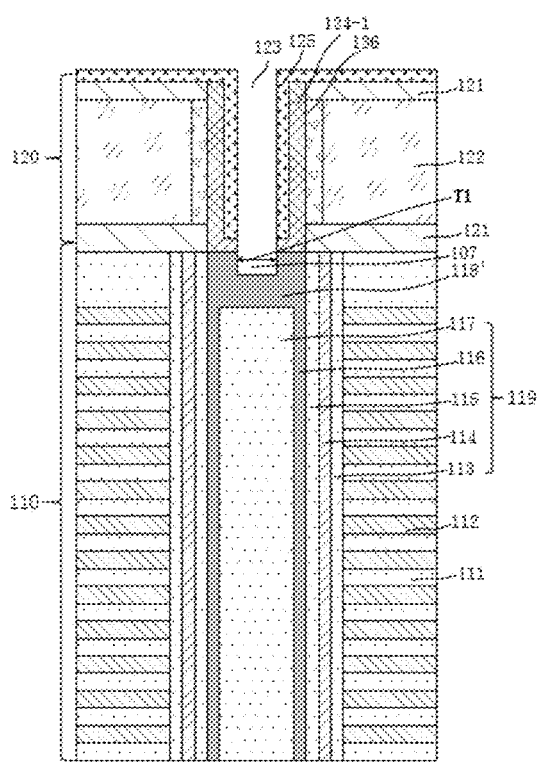
Figure 16L:
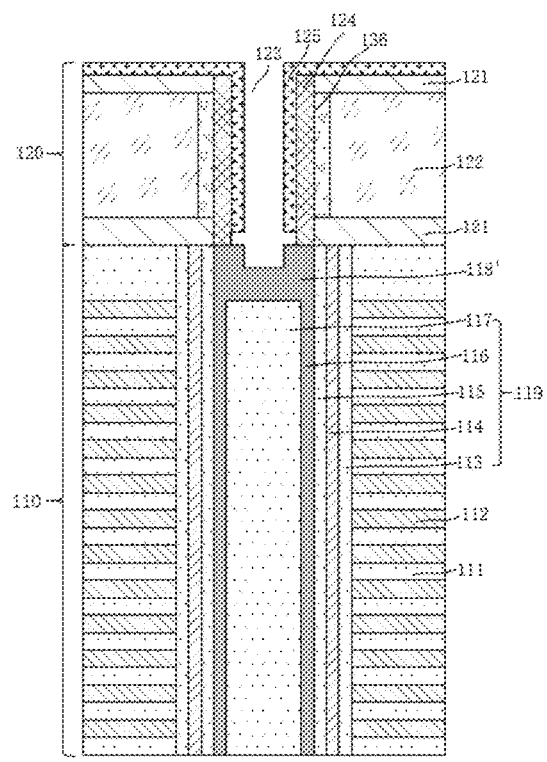
Figure 16M:
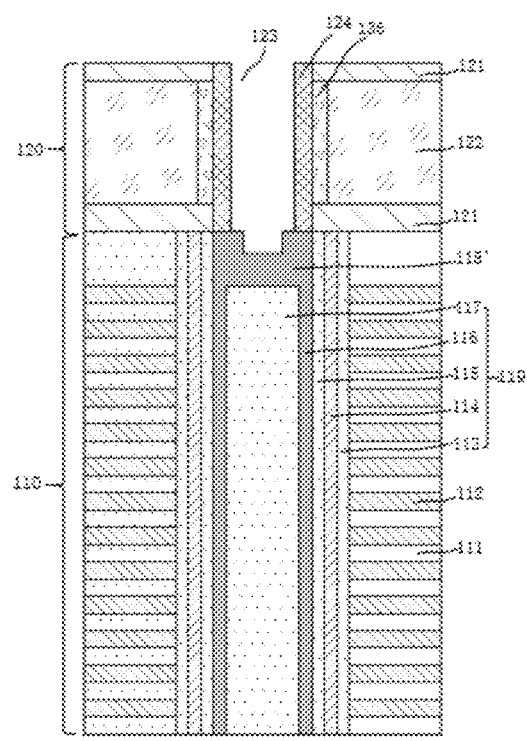
Figure 16N:
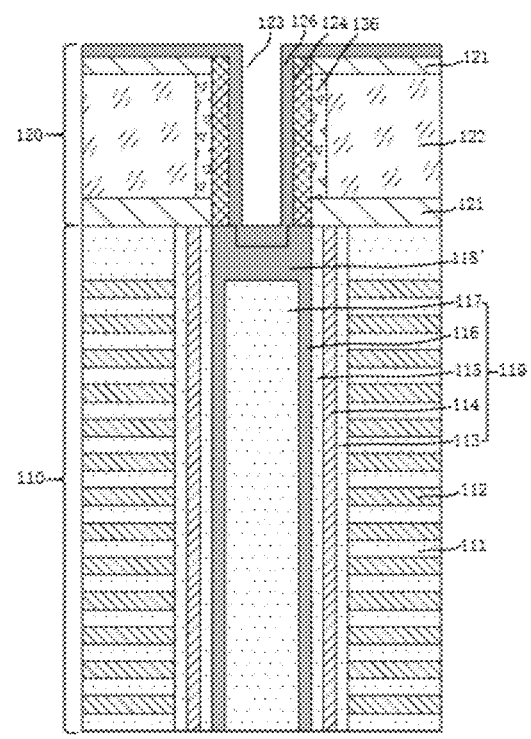
Figure 16O:
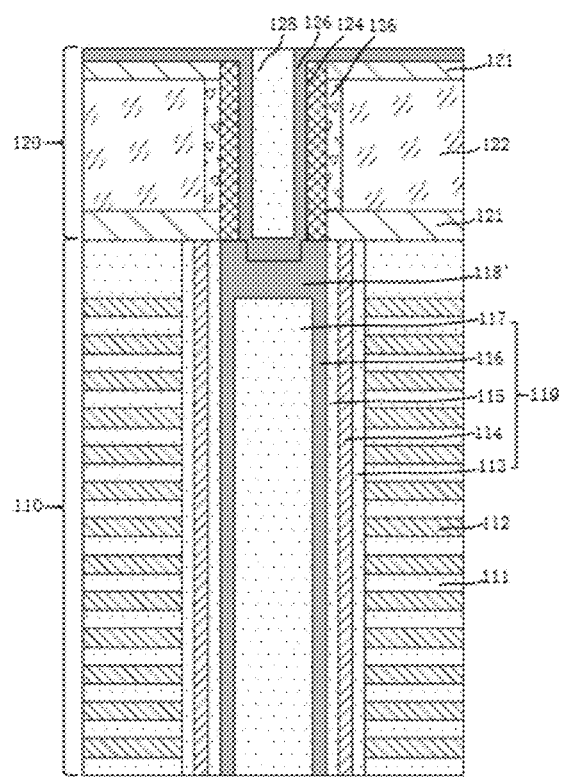
Figure 16P:
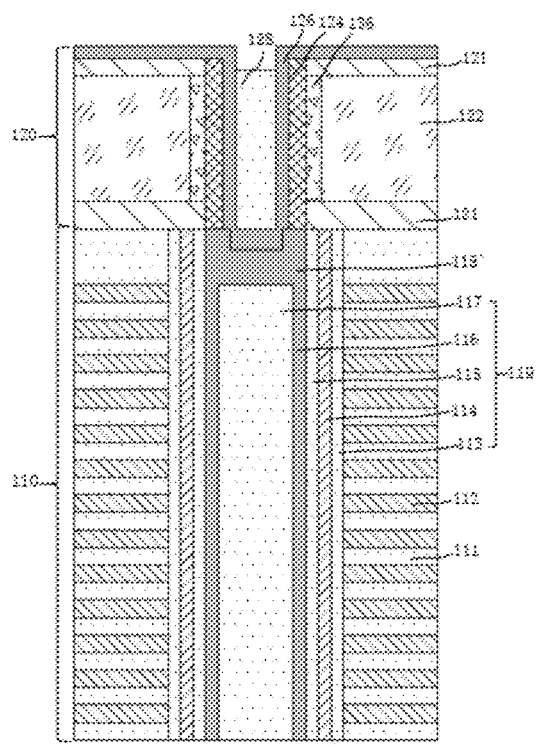
Figure 16Q:
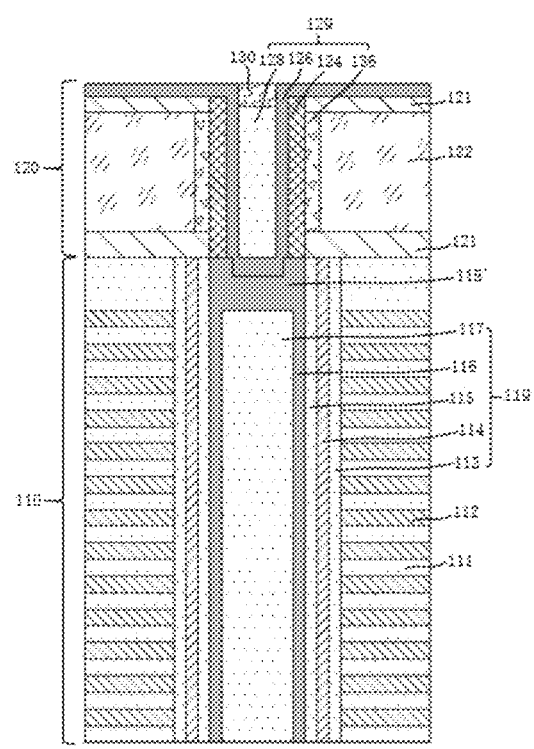
Figure 16R:
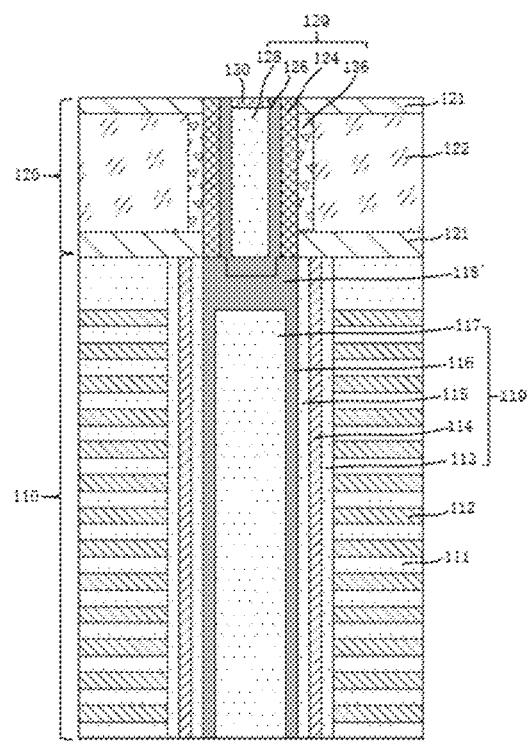

FIG. 15 is a schematic flow chart of a manufacturing method 920 of a three-dimensional memory device according to some implementations of the application, and FIGS. 16A-16R are partial schematic diagrams of device structures formed in various stages of a manufacturing method of a three-dimensional memory device according to some implementations of the application. The method 920 will be described in detail below with reference to FIGS. 15-16R.

Referring to FIG. 15, the method 920 includes operation S921, where stacked layers may be formed on a substrate; and the method 920 further includes operation S922, where a storage channel structure penetrating through the stacked layers may be formed, the storage channel structure comprising the first channel layer. Since the processes and structural features involved in describing operations S310, S320 and S330 in method 300 may be partially or entirely applied to operations S921 and S922 in the present implementation, contents same as or similar to those of the method 300 will not be repeated for the present implementation.

The method 920 proceeds to operation S923, where a select gate structure and a select channel structure may be formed on a side of the stacked layers facing away from the substrate, the select channel structure penetrating through the select gate structure, the select gate structure comprising conductive layers, and the select channel structure comprising a block layer and a second channel layer disposed from outside to inside. In some examples, it is possible to convert a portion of the conductive layer in the extending direction of the select channel structure into the block layer.

It should be understood that the processes and structural features involved in describing the initial select gate structure 120', the channel hole 123 penetrating through the initial select gate structure 120' and the select gate structure 120 in operation 340 may be at least in part applicable to the same structures in operation S923, therefore same or similar contents involved in operation S923 will not be repeated herein. As shown in FIG. 16A, in an example in which the number of the second conductive layer 122 is one, for example, it is possible to expose the sidewall of the second conductive layer 122 along the channel hole 123 to nitrogen-containing gas for rapid thermal nitridation to convert a portion of the second conductive layer 122 along sidewall of the channel hole 123 into a block layer 136 containing nitrogen, the block layer 136 includes for example one block portion 136-1 as shown in FIG. 12.

In some implementations in which the number of the second conductive layers 122 is more than three (the structure not shown in figures), it is possible to convert a plurality of portions of the plurality of second conductive layers 122 corresponding to the plurality of sidewalls into a plurality of block portions 136-1 disposed with spacings, thereby forming the discontinuous block layer 136.

In some implementations, for example in examples in which the second conductive layer 122 includes conductive material containing silicon (such as polysilicon), it is possible to expose the sidewall of the second conductive layer 122 along the channel hole 123 to nitrogen-containing gas containing $NH_3$, $NO$, $N_2O$, $N_2$ or any combination thereof for annealing, thereby nitridizing a portion of the second conductive layer 122 into the block layer 136. The block layer 136 includes for example silicon oxynitride.

According to some implementations of the present disclosure, after forming the channel hold 123, the sidewall of the second conductive layer 122 (e.g., polysilicon) along the channel hole 123 may include unbonded silicon free radicals; while in the annealing process, the gases in the nitrogen-containing atmosphere may break chemical bonds, forming some free radicals including nitrogen free radicals, oxygen free radicals, thereby unbonded silicon free radicals, unbonded nitrogen free radicals and unbonded oxygen free radicals may experience recombination of chemical bonds, thereby forming a dense layer of silicon oxynitride.

In some implementations, it is possible to adjust the thickness and nitrogen content of the formed block layer 136 by adjusting the kinds, partial pressures of gases in the above-described nitrogen-containing atmosphere and the annealing time.

As one example, the gases used in the annealing of the above-described nitrogen-containing atmosphere include a combination of $NH_3$ and $N_2O$, the annealing temperature is 600 to 1200 degree Celsius, and the annealing duration is 10 minutes to 120 minutes. By annealing with the above-mentioned process parameters, it is possible to form a block layer 136 with good compactness, less electron and hole defects and a thickness in range of 10-20 angstroms, which can effectively block diffusion of impurity (such as boron atoms) doped in the second conductive layer 122.

Referring to FIG. 16E, in some examples, an insulating layer 124 is formed on at least the sidewall of the channel hole 123 and the second channel layer 126 as shown in FIG. 16F in contact with the channel plug 118' is formed on at least the surface of the insulating layer 124 and the exposed channel plug 118'.

As an option, as shown in FIG. 16B, it is possible to form the initial insulating layer 124-1 on the inner wall of the channel hole 123 by thin film deposition process such as CVD, PVD, ALD and any combination thereof. In particular, it is possible to form the initial insulating layer 124-1 on the block layer 136, a portion of the second dielectric layer 121 along the sidewall of the channel hole 123 and the exposed portion of the channel plug 118'. Optionally, it is also possible to form the initial insulating layer 124-1 (not shown) on the top surface of one second dielectric layer 122 away from the substrate.

Referring to FIG. 16E, in some examples, it is possible to remove a portion of the initial insulating layer 124-1 on the channel plug 118' by using dry or wet etch process to form the insulating layer 124. Optionally, the materials for the insulating layer 124 may include, for example, silicon oxide. In some examples, the insulating layer 124 may serve as the gate dielectric layer of a CMOS transistor.

With reference to FIG. 16F, in some examples, it is possible to form the second channel layer 126 in contact with the channel plug 118' on the surface of the insulating layer 124 by using suitable deposition process.

In some other examples in which the channel plug 118' is not included, the end of the second channel layer 126 proximate to the substrate may directly contact the end of the first channel layer 116 away from the substrate for electrical connection of each other. In some cases in which the second channel layer 126 and the first channel layer 116 include the same material, the second channel layer 126 and the first channel layer 116 may further form an integral structure.

In an example in which the block layer 136 includes a plurality of block portions 136-1, the insulating layer 124 may be on the plurality of block portions 136-1 and the sidewall of the second dielectric layer 121 along the channel hole 123. Therefore, in the longitudinal direction (e.g., axial direction) of the channel hole 123, the total length of the plurality of block portions 136-1 (i.e., the length of the block layer 136) may be smaller than the length of the insulating layer 124.

In the present implementation, a portion of the second conductive layer 122 along the sidewall of the channel hole 123 is converted into the block layer 136 before forming the insulating layer 124, which enables the block layer 136 to be located between the second conductive layer 122 and the insulating layer 124. The block layer formed according to the present implementation can effectively block impurity doped into the second conductive layer 122 from diffusing towards the insulating layer 124, which on the one hand can increase the doping concentration of the second conductive layer 122, thereby increasing the conductivity of the second conductive layer 122; and on the other hand can reduce the diffusion concentration of impurity in the insulating layer 124, thereby reducing influence of impurity on reliability of the TSG transistors.

In the example in which the material for the block layer 136 includes silicon oxynitride, as nitrogen contents in the block layer 136 increases, the content of the diffused impurity (such as boron atoms) in the insulating layer 124 decreases accordingly. Therefore, to some extent, increasing of nitrogen content in the block layer 136 may enhance its blocking function for impurity diffusion.

As another option, as shown in FIG. 16C, a sacrificial layer 125 may be formed on the surface of the initial insulating layer 124-1 after forming the initial insulating layer 124-1. Illustratively, it is possible to deposit any suitable semiconductor materials on the surface of the insulating layer 124 by using one or more thin film deposition processes such as ALD, CVD, PVD, any other suitable processes or any combinations thereof to form the sacrificial layer 125.

As shown in FIG. 16D, in some examples, it is possible to remove at least portions of the sacrificial layer 125 and the initial insulating layer 124-1 that are on the channel plug 118' successively by anisotropic dry etch process to expose the channel plug 118'. Optionally, after removing at least the above portions, the initial insulating layer 124-1 forms the insulating layer 124.

In some examples, after exposing the channel plug 118', it is possible to remove the remaining portion of the sacrificial layer 125 by using for example dry etch process, exposing the insulating layer 124. In some examples, the sacrificial layer 125 may include for example silicon (polysilicon, single crystalline silicon), and the insulating layer 124 may include silicon oxide. In some cases, due to difference in etch selection with respect to the initial insulating layer 124-1, the sacrificial layer 125 may serve as an etch protection layer for the initial insulating layer 124-1. In, for example, performing an etching process on a portion of the initial insulating layer 124-1 that is over the channel plug 118', the sacrificial layer 125 may serve as the etch protection layer to protect the insulating layer 124 as shown in FIG. 16D from damaging.

Optionally, as shown in FIG. 16E, the remaining portion of the etch protection layer may be completely removed after the portion of the initial insulating layer 124-1 that is over the channel plug 118' is removed.

With continued reference to FIG. 16D, a concave 127 is formed after the portions of the sacrificial layer 125 and the insulating layer 124 that are on the channel plug 118' are removed. In the direction parallel to the substrate, the width of the concave 127 is smaller than the diameter of the channel hole 123.

In some other cases in which the sacrificial layer 125 includes polysilicon, the sacrificial layer 125 may serve as the first initial channel layer (not shown). It is possible to form a second initial channel layer (not shown) on a portion of the first initial channel layer that is on the sidewall of the channel hole 123 and on the channel plug 118' by using suitable deposition process after removing the portions of the sacrificial layer 125 and the initial insulating layer 124-1 that are over the channel plug 118' successively. The portion of the first initial channel layer that is on the sidewall of the channel hole 123 and the second initial channel layer may together serve as the second channel layer 126.

In some examples, as shown in FIG. 16F, it is possible to form the second channel layer 126 on the surface of the insulating layer 124 and the exposed portion of the channel plug 118' by using one or more thin film deposition processes such as ALD, CVD, PVD, any other suitable processes or any combinations thereof. With the method 920 according to some implementations of the present disclosure, it is possible to form the first channel layer 116 and the second channel layer 126 by two processes such that the two channel layers have uniform thickness, thereby improving the controlling capability of the gate over the channel.

In some implementations, as shown in FIG. 16G, it is possible to form the second dielectric core 128 in the space defined by the second channel layer 126, thereby forming the select channel structure 129. During the operation of the three-dimensional memory device, the select channel structure 129 is controlled by for example the top select gate (e.g., the second conductive layer 122). Illustratively, it is possible to form the second dielectric core 128 in the space defined by the second channel layer 126 by using a deposition process such as ALD, CVD, PVD, any other suitable process or any combinations thereof. As an option, the material for the second dielectric core 128 may be the same as material for the first dielectric core 117.

In some implementations, the select channel structure 129 may have for example a profile similar to that of the storage channel structure 119.

Optionally, the select channel structure 129 and the storage channel structure 119 may both include the pillar shape. In some examples, in the direction parallel to the substrate, the diameter of the select channel structure 129 at any place is smaller than that of the storage channel structure 119 at any place.

In some implementations, as shown in FIG. 16I, an electrode plug 130 in contact with the second channel layer 126 may be formed at the end of the select channel structure 129 away from the substrate. In particular, as shown in FIG. 16H, it is possible to remove a portion of the second dielectric core 128 away from the substrate by suitable etch process, and then form an electrode plug 130 as shown in FIG. 16I on the surface of the second dielectric core 128 away from the substrate by using a deposition process such as ALD, CVD, PVD or any combinations thereof.

Optionally, as shown in FIG. 16J, the surface of the electrode plug 130 away from the substrate may be planarized by CMP process. In some examples, the electrode plug 130 may further serve as a portion of the drain of the corresponding memory cell string.

In some implementations, it is possible to remove the substrate in suitable operations after forming the select channel structure 129, and then, for example, form the semiconductor layer 101' as shown in FIG. 12 on the stacked layers 110 after removing the substrate. The semiconductor layer 101' may be for example in contact with the first channel layer 116 and electrically connect the first channel layers 116 of the respective storage channel structures 119.

In some implementations, it is further possible to form the top select gate cut line 132 as shown in FIG. 12 in the select gate structure 120 in suitable operations, for example after forming the select channel structure 129.

Referring to FIG. 16D, in some other implementations, after removing the first portions of the sacrificial layer 125 and the insulating layer 124-1 that are on the surface of the channel plug 118' away from the substrate, the second portions of the sacrificial layer 125 and the initial insulating layer 124-1 that are on the surface of the channel plug 118' away from the substrate are removed subsequently to form the groove 107 as shown in FIG. 16K. In the direction parallel to the substrate, the width T1 of the groove 107 may be the same as the diameter of the channel hole 123. In the example as shown in FIG. 16K, a portion of the channel plug 118' may be removed subsequently via at least partial surface of the exposed channel plug 118' by isotropic wet etch process.

In some other implementations, as shown in FIG. 16L, it is possible to remove the third portion of the initial insulating layer 124-1 that is on the surface of the channel plug 118' away from the substrate by for example anisotropic dry etch process. In particular, it is possible to remove a portion of the initial insulating layer 124-1 that is between the channel plug 118' and the sacrificial layer 125 along the channel hold 123 to form the insulating layer 124. The above-described processing may increase the exposed area of the surface of the channel plug 118' away from the substrate such that the second channel layer 126 subsequently formed in contact with the channel plug 118' may have a large contact area, thereby increasing transfer efficiency of electrons.

In some other implementations, as shown in FIG. 16M, it is possible to remove remaindering portion of the sacrificial layer 125 by suitable dry etch process, which in turn exposes the insulating layer 124.

In some other examples, as shown in FIG. 16N, it is possible to form the second channel layer 126 on the surface of the insulating layer 124 and the exposed surface of the channel plug 118' by using one or more thin film deposition processes such as ALD, CVD, PVD, any other suitable processes or any combinations thereof. Optionally, the second channel layer 126 may be lightly P-doped to form the doped second channel layer 126.

In some implementations, as shown in FIG. 16O, it is possible to form the second dielectric core 128 in at least portion of the space defined by the second channel layer 126, thereby forming the select channel structure 129. During the operation of the three-dimensional memory device, the select channel structure 129 is controlled by for example the top select gate (e.g., the second conductive layer 122). Illustratively, it is possible to form the second dielectric core 128 in the space defined by the second channel layer 126 by using a deposition process such as ALD, CVD, PVD, any other suitable process or any combinations thereof. As an option, the material for the second dielectric core 128 may be the same as material for the first dielectric core 117.

In some implementations, as shown in FIG. 16Q, an electrode plug 130 in contact with the second channel layer 126 may be formed at the end of the select channel structure 129 away from the substrate. In particular, as shown in FIG. 16P, it is possible to remove a portion of the second dielectric core 128 away from the substrate by suitable etch process, and then form an electrode plug 130 as shown in FIG. 16Q on the surface of the second dielectric core 128 away from the substrate by using a deposition process such as ALD, CVD, PVD or any combinations thereof. Optionally, as shown in FIG. 16R, the surface of the electrode plug 130 away from the substrate may be planarized by CHIP process.

In some implementations, the select channel structure 129 may have for example a profile similar to that of the storage channel structure 119. Optionally, the select channel structure 129 and the storage channel structure 119 may both include the pillar shape. In some examples, in the direction parallel to the substrate, the diameter of the select channel structure 129 at any place is smaller than that of the storage channel structure 119 at any place.

In some implementations, it is possible to remove the substrate in suitable operations after forming the select channel structure 129, and then, for example, form the semiconductor layer 101' as shown in FIG. 14 on the stacked layers 110 after removing the substrate. The semiconductor layer 101' may be for example in contact with the first channel layer 116 and electrically connect the first channel layers 116 of the respective storage channel structures 119.

In some implementations, it is further possible to form the top select gate cut line 132 as shown in FIG. 14 in the select gate structure 120 in suitable operations, for example after forming the select channel structure 129.

Since the contents and structures involved in the forgoing description of the three-dimensional memory device 600, the three-dimensional memory device 600' and the three-dimensional memory device 700 may be fully or partially suitable to the same or similar structures involved in the description of the manufacturing method 920 of three-dimensional memory device herein, no repetition will be made to the related or similar description.

Figure 17:
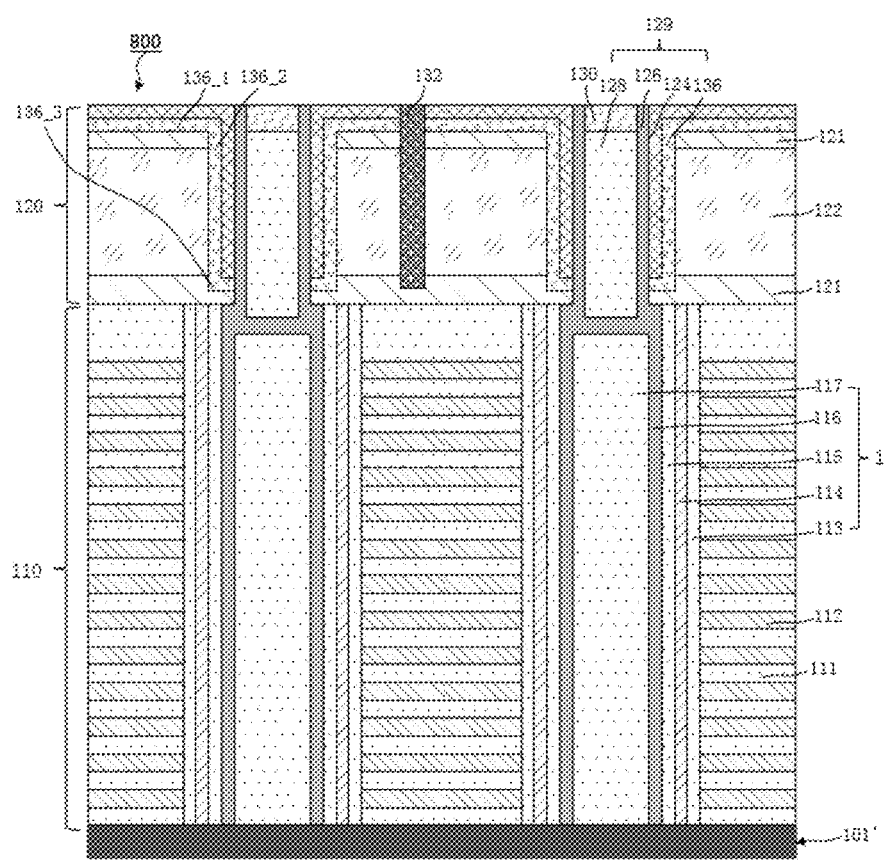
FIG. 17 is a partial schematic diagram of yet another three-dimensional memory device according to some implementations of the present disclosure.

FIG. 17 illustrates a partial schematic diagram of a three-dimensional memory device 800 according to some implementations of the present disclosure. The three-dimensional memory device 800 according to the present implementation may serve as an example of the memory device 404 as described above. The three-dimensional memory device 800 includes a semiconductor layer 101', stacked layers 110 on the semiconductor layer 101', a plurality of storage channel structures 119 penetrating through the stacked layers 110, a select gate structure 120 on a side of the stacked layers 110 facing away from the semiconductor layer 101', and a plurality of select channel structures 129 penetrating through the select gate structure 120. As one example, the semiconductor layer 101' may include polysilicon.

In some examples, the stacked layers 110 may include a plurality of first dielectric layers 111 and a plurality of first conductive layers 112 stacked alternatively, wherein the first conductive layers 112 may, for example, serve as control gate layers for leading out word lines (not shown).

In some examples, the materials for the first conductive layers 112 may include, for example, metal conductive materials such as W, Co, Cu, Al, Ti, Ta, Ni or the like. In some other examples, the materials for the first conductive layers 112 may include, for example, semiconductor materials such as polysilicon, doped silicon, metal silicide (such as NiSix, WSix, CoSix, TiSix) or any combination thereof.

In some examples, the materials for the first dielectric layers 111 may include for example silicon oxide, silicon nitride or silicon oxynitride.

With continued reference to FIG. 17, in some examples, the storage channel structures 119 may for example include profiles of pillar shape (such as cylinder) or "inverted cone" shape. In some examples, the semiconductor layers 101' may for example contact the first channel layers 116 and interconnect the first channel layers 116 of the respective storage channel structures 119.

In some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device. Illustratively, the first channel layer 116 is, for example, lightly p-doped.

As an option, the first dielectric core 117 may be for example disposed in the space defined by the first channel layer 116 and occupy a portion of the defined space proximate to the bottom of the semiconductor layer 101' such that the surface of the first dielectric core 117 away from the semiconductor layer 101' may be lower than the surfaces of the functional layer and the first channel layer 116 away from the semiconductor layer 101'. In some examples, in the direction away from the semiconductor layer 101', the length of the first dielectric core 117 is smaller than the length of the first channel layer 116.

In some examples, the materials for the blocking layer 113 may include for example silicon oxide, silicon oxynitride, high-k dielectric or any combination thereof. The materials for the storage layer 114 may include for example silicon nitride, silicon oxynitride, silicon or any combination thereof. The materials for the tunneling layer 115 may include silicon oxide, silicon oxynitride or any combination thereof. In one implementation, the functional layer may be for example a composite layer including silicon oxide/silicon oxynitride/silicon oxide (ONO).

In some examples, the materials for the first channel layers 116 may include for example amorphous silicon, polysilicon or single crystalline silicon etc. As an option, the first channel layer 116 may not be doped. As another option, the first channel layer 116 may be lightly P-doped. In some examples, the materials for the first dielectric core 117 may include for example insulating materials such as silicon oxide.

With continued reference to FIG. 17, in some implementations, the select gate structure 120 includes at least one second conductive layer 122 and at least two second dielectric layers 121 adjacent thereto, wherein, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer for controlling the TSG transistor. As an option, one second dielectric layer 121 proximate to the semiconductor layer 101' and one first dielectric layer 111 away from the semiconductor layer 101' may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some examples, materials for the second dielectric layer 121 may be the same as material for the first dielectric layer 111.

It should be understood that the number of the second conductive layers 122 and second dielectric layers 121 adjacent thereto may be set as desired. For example, the number of the second conductive layers 122 may be 1, 2, 3, 4 or more.

In some examples, materials for the second conductive layers 122 include for example conductive materials that may include for example metallic conductive materials such as W, Co, Cu, Al, Ti, Ta and Ni. The work functions of metals should be satisfied that the controlled channel may be turned off by applying a corresponding off voltage to the TSG when the conductive layer 122 serves as the top select gate layer.

In some examples, the conductive materials for the second conductive layers 122 may further include semiconductor materials such as polysilicon, doped silicon, metal silicide (such as NiSix, WSix, CoSix, TiSix) or any combinations thereof. In some examples, the second conductive layer 122 may include for example P-doped (for example, boron doped) polysilicon such that the controlled channel may be turned off by applying a corresponding off voltage to the TSG when the second conductive layer 122 serves as the top select gate layer.

In some examples, materials for the second conductive layer 122 and the first conductive layer 112 may be different. For example, materials for the first conductive layer 112 may include for example metals such as W, Co, Cu, Al, Ti, Ta and Ni, and materials for the second conductive layer 122 may include for example undoped polysilicon, doped polysilicon or metal silicide. As one option, materials for the first conductive layer 112 may include for example W, and materials for the second conductive layer 122 may include boron doped polysilicon.

In some other options, materials for the first conductive layer 112 and the second conductive layer 122 may be identical. For example, both may be polysilicon.

With continued reference to FIG. 17, in some implementations, the storage channel structure 119 and the select channel structure 129 are at least partially aligned in the extension direction of the storage channel structure 119 and the select channel structure 129. The select channel structure 129 may have for example a profile similar to that of the storage channel structure 119. Optionally, the profiles of the select channel structure 129 and the storage channel structure 119 may both include shape similar to an "inverted cone" shape.

In some example, in the direction parallel to the semiconductor layer 101', the diameter of the select channel structure 120 at either location is smaller than the diameter of the storage channel structure 119 at either location. As shown in FIG. 17, the select channel structure 129 and the storage channel structure 119 may both include for example pillar shapes, and the diameter of the select channel structure 129 may be smaller than that of the storage channel structure 119. Optionally, the distance between adjacent two select channel structures 129 (such as the distance between outer periphery surfaces of the adjacent two select channel structures 129 in the direction parallel to the semiconductor layer 101') may be greater than the distance between any adjacent two storage channel structures 119 (such as the distance between outer periphery surfaces of the adjacent two storage channel structures 110 in the direction parallel to the semiconductor layer 101').

Illustratively, the select channel structure 129 may include for example an insulating layer 124 and a second channel layer 126 disposed successively from outside to inside. Optionally, the insulating layer 124 may be disposed between the top select gate (e.g., the second conductive layer 122) and the second channel layer 126 under its control. In some examples, transistors controlled by the top select gates may be for example MOS transistors.

Illustratively, the materials for the second channel layers 126 may include for example amorphous silicon, polysilicon or single crystalline silicon. Optionally, materials for the second channel layer 126 may be the same as materials for the first channel layer 116. Optionally, the second channel layer 126 is for example lightly p-doped. As an option, materials for the insulating layer 124 may include for example insulating materials such as silicon dioxide.

Illustratively, the first end of the first channel layer 116 away from the semiconductor layer 101' may contact the second end of the second channel layer 126 proximate to the semiconductor layer 101'. Optionally, in the direction parallel to the semiconductor layer 101', the shortest distance L2 between the second ends of adjacent two second channel layers 126 away from the semiconductor layer 101' is greater than the shortest distance L1 between the first ends of adjacent two first channel layers 116 away from the semiconductor layer 101'. It should be understood that the shortest distance between the second ends of adjacent two second channel layers 126 away from the semiconductor layer 101' indicates the shortest distance between the outer periphery surfaces of the adjacent two second ends. The shortest distance between the first ends of adjacent two first channel layers 116 away from the semiconductor layer 101' indicates the shortest distance between the outer periphery surfaces of the adjacent two first ends.

In some examples, the maximum width (such as the diameter) of the space defined by the second channel layer 126 in the direction parallel to the semiconductor layer 101' may be smaller than the maximum width (such as the diameter) of the space defined by the first channel layer 116 in the direction parallel to the semiconductor layer 101'.

In some examples, in the extending direction of the storage channel structure 119 and the select channel structure 129, the second channel layer 126 may extend into the space defined by the first channel layer 116 and contact the surface of the first dielectric core 117 away from the semiconductor layer 101'. As an option, the portion of the second channel layer 126 proximate the semiconductor layer 101' may contact the portion of the first channel layer 116 away from the semiconductor layer 101'. As an option, the first end of the first channel layer 116 away from the semiconductor layer 101' may enclose outer periphery surfaces of the second end of the second channel layer 126 close to the semiconductor layer 101'.

In case that the second channel layer 126 and the first channel layer 116 include the same material, it may be difficult to distinguish the interface where the second channel layer 126 contacts the first channel layer 116, such that the second channel layer 126 and the first channel layer 116 form an integral structure.

In some examples in which the three-dimensional memory device 800 includes a channel plug such as the channel plug 118' shown in FIG. 6, the channel plug 118' may be located for example between the select channel structure 129 and the storage channel structure 119. The end of the second channel layer 126 proximate to the semiconductor layer 101' and the end of the first channel layer 116 away from the semiconductor layer 101' may contact the channel plug 118', respectively, to implement electrical connection between the second channel layer 126 and the first channel layer 116 via the channel plug 118'.

With continued reference to FIG. 17, in some implementations, the select channel structure 129 further includes for example a block layer 136. Optionally, the materials for the block layer 136 include, for example, silicon oxynitride. Illustratively, the block layer 136 includes a plurality of block portions. Optionally, the block layer 136 includes for example a first block portion 136_1 at the end surface of the insulating layer 124 proximate to the semiconductor layer 101' and a second block portion 136_2 at the end surface of the insulating layer 124 facing away from the second channel layer 126.

In some examples, the block layer 136 further includes for example a third block portion 136_3 at the surface of the select gate structure 120 facing away from the semiconductor layer 101'. Optionally, in the plane formed by any direction parallel to the semiconductor layer 101' and the extending direction of the select channel structure 129, the third block portion 136_3, the second block portion 136_2 and the first block portion 136_1 are generally distributed as letter "z", thereby reducing diffusion of impurity such as boron atoms in the second conductive layer 122 into the insulating layer 124 in various directions.

The block layer 136 provided in the present implementation may be located between the second conductive layer 122 and the insulating layer 124, and can effectively block conductive particles doped in the second conductive layer 122 (e.g., boron atoms) from diffusing towards the insulating layer 124, which on the one hand can increase the doping concentration of the second conductive layer 122, thereby increasing the conductivity of the second conductive layer 122; and on the other hand can reduce the diffusion concentration of impurity such as boron atoms in the insulating layer 124, thereby reducing influence of impurity on reliability of the TSG transistors.

In some examples, the dielectric constant of the block layer 136 may be greater than that of the insulating layer 124. In some examples, the materials for the block layer 136 may include for example silicon oxynitride, and the materials for the insulating layer 124 may include for example silicon oxide. In the example in which the material for the block layer 136 includes for example silicon oxynitride, the nitrogen content in the block layer 136 is in negative correlation with the content of impurity such as boron atoms diffused in the insulating layer 124.

In some examples, the select channel structure 129 further includes a second dielectric core 128 disposed in the space defined by the second channel layer 126 and occupies a portion of the defined space proximate to the bottom of the semiconductor layer 101'. In some examples, in the direction away from the semiconductor layer 101', the length of the second dielectric core 128 is smaller than the length of the second channel layer 126. Illustratively, the material for the second dielectric core 128 may be the same as material for the first dielectric core 117. Optionally, the above-described insulating layer 124 may be positioned on the surface of the second channel layer 126 facing away from the second dielectric core 128.

It is assumed that the diameter of the channel structure 129 along the direction parallel to the semiconductor layer 101' is selected to be the same, as compared to the second channel layer 126 being a solid structure occupying the space defined by the insulating layer 124, the second channel layer 126 according to some example implementations of the present disclosure has a hollow structure with a relatively thin thickness, thereby improving the controlling capability of the gate over the channel. While operating the three-dimensional memory device 200, the TSG transistor according to some example implementations of the present disclosure has a relatively small threshold voltage, therefore it is easier to turn off the channel controlled by the TSG transistor.

With continued reference to FIG. 17, in some implementations, the three-dimensional memory device 800 further includes for example an electrode plug 130 at a portion of the select channel structure 129 away from the semiconductor layer 101', which may be disposed on the surface of the second dielectric core 128 away from the semiconductor layer 101' and connected with the second channel layer 126. Optionally, the electrode plug 130 may further serve as a portion of the drain of the corresponding memory cell string.

In some implementations, the three-dimensional memory device 800 further includes for example a gate line slit structure (not shown) penetrating through the stacked layers 110 and the select gate structure 120. Some example gate line slit structures may divide the memory array included in the three-dimensional memory device 800 (e.g., the memory array 401 shown in FIG. 1) into a plurality of block regions, some other example gate line slit structures may divide each block region into a plurality of finger-like regions. Therefore, it is possible to individually control memory cells of the finger-like regions during operation of the three-dimensional memory device 800.

In some implementations, the three-dimensional memory device 800 further includes for example a top select gate cut line 132 disposed in the select gate structure 120. As an option, the top select gate cut line may for example penetrate through the region between adjacent select channel structures 129. Optionally, the top select gate cut line 132 may for example further penetrate through the second conductive layer 122 and stop at the bottom surface of one second dielectric layer 121 in contact with the stacked layers 110 that is proximate to the semiconductor layer 101'.

In some examples, the top select gate cut line 132 can divide the finger-like region into a plurality of sub-regions, thereby controlling desired sub-regions accurately during operation of the three-dimensional memory device, efficiently reducing programming, reading and erasing time and data transmission time, and increasing data processing efficiency. The top select gate cut line 132 may further enable the top select gate layer (e.g., the second conductive layer 122) in the select gate structure 120 to control corresponding TSG transistor independently.

With the three-dimensional memory device 800 according to some implementations of the present disclosure, since the distance between any adjacent select channel structures 129 included therein is greater than the distance between any adjacent storage channel structures 119 included therein, it is possible to guarantee the process window for the top select gate cut line 132 as much as possible, reduce the occupation of additional area of the stacked layers 110 by the top select gate cut line 132, thereby, to some extent, reducing the loss of storage density.

Figure 18:
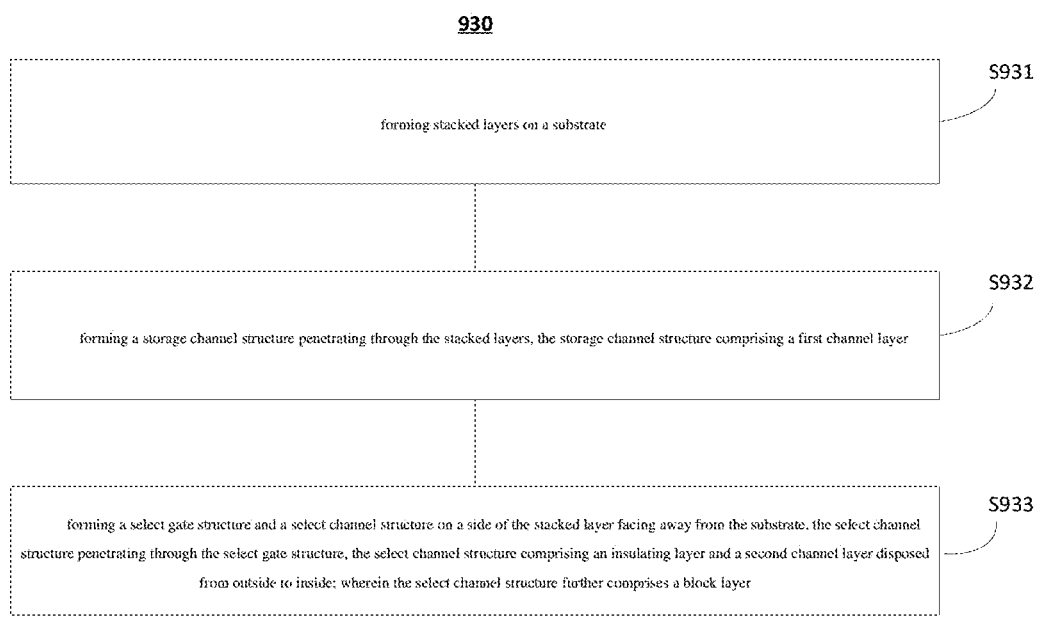
FIG. 18 is a schematic flow chart of a manufacturing method of yet another three-dimensional memory device according to some implementations of the present disclosure.

FIG. 18 illustrates a schematic flow diagram of a manufacturing method 930 for a three-dimensional memory device 800 according to some implementations of the present disclosure. FIGS. 19A-19M illustrate partial schematic diagrams of the device structure after implementing some operations in the manufacturing method 930 of a three-dimensional memory device 800 according to some implementations of the present disclosure. The method 500 will be described in detail below with reference to FIGS. 18 to 19M.

With reference to FIG. 18, the method 930 starts with operation S931, where stacked layers may be formed on the substrate.

Figure 19A:
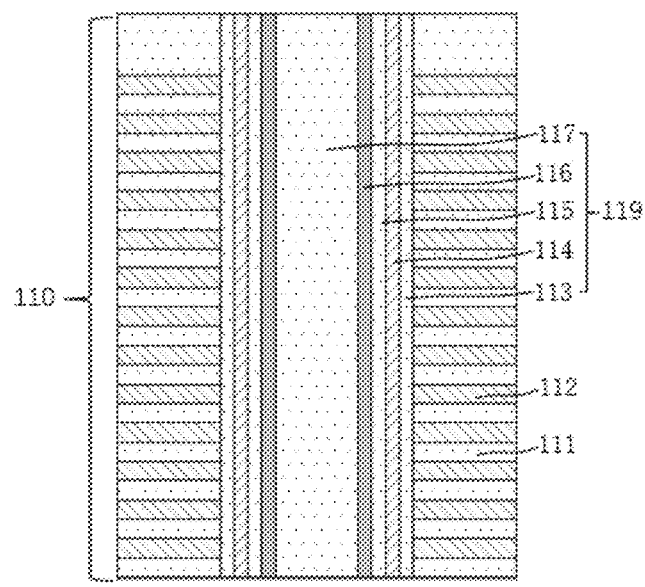
FIGS. 19A-19M are partial schematic diagrams of the device structure after implementing some operations in the manufacturing method of yet another three-dimensional memory device according to some implementations of the present disclosure.

As shown in FIG. 19A, stacked layer 110 may be formed on the substrate (not shown). In some implementations, any suitable semiconductor material such as single crystalline silicon (Si), single crystalline germanium (Ge), silicon germanium (GeSi), silicon carbide (SiC), silicon on insulator (SOI), germanium on insulator (GOI) or gallium arsenide may be selected for the preparation material of the substrate.

In some examples, the stacked layers 110 includes a plurality of first conductive layer 112. The materials for the first conductive layers 112 may include, for example, metal conductive materials such as W, Co, Cu, Al, Ti, Ta, Ni or the like. Illustratively, the first conductive layer 112 may be formed with the gate replacement process. As an option, the gate replacement process includes for example: stacking alternatively a plurality of first dielectric layers 111 and a plurality of sacrificial dielectric layers (not shown) on a substrate, then after for example forming gate line slits (not shown), removing the sacrificial dielectric layers via gate line slits and replacing with the above-described metallic conductive material to form the first conductive layer 112. The above-described gate line slits are used to form the gate line slit structures for example.

Referring to FIG. 18, the method 930 proceeds to operation S932, where a storage channel structure penetrating through the stacked layers may be formed, the storage channel structure including the first channel layer.

With continued reference to FIG. 19A, in some examples, the storage channel structures 119 include for example a functional layer, a first channel layer 116 and a first dielectric core 117 disposed successively from outside to inside. In some examples, the functional layer may include for example a blocking layer 113, a storage layer 114 and a tunneling layer 115 disposed successively from outside to inside. The storage channel structures 119 have the data storage function and the storage layer 114 may function to store data during operation of the three-dimensional memory device.

Illustratively, the first channel layer 116 is for example lightly p-doped. As an option, the first dielectric core 117 may for example fill at least a portion of space defined by the first channel layer 116. Illustratively, as a solid body, the first dielectric core 117 may fill up the partial space defined by the first channel layer 116 in the direction proximate to the substrate.

Referring to FIG. 18, the method 930 proceeds to operation S933, where a select gate structure and a select channel structure may be formed on a side of the stacked layers facing away from the substrate, the select channel structure penetrating through the select gate structure, and the select channel structure including an insulating layer and a second channel layer disposed from outside to inside; wherein the select channel structure further includes a block layer. In some examples, the block layer includes a first block portion at the end surface of the insulating layer proximate to the substrate; and a second block portion at the surface of the insulating layer facing away from the second channel layer.

Figure 19B:
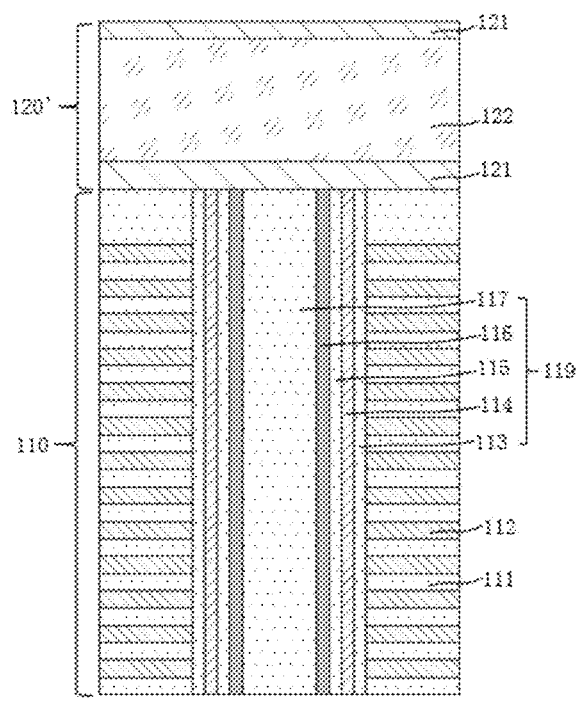

As shown in FIG. 19B, in contrast to the gate replacement process, in the example in which the material for the second conductive layer 122 and the material for the first conductive layer 112 are different, for example, the second conductive layer 122 includes polysilicon or metal silicide, and the first conductive layer 112 includes metal, it is possible to form the second conductive layer 122 and the second dielectric layers 121 on both sides of the second conductive layer 122 on the side of the stacked layers 110 (FIG. 11A) facing away from the substrate by using direct deposition process, such as CVD, PVD, ALD or film deposition process of any combination thereof, thereby forming the initial select gate structure 120'.

Optionally, the stacking direction of the second conductive layer 122 and the second dielectric layers 121 may be the same as the stacking direction of the first dielectric layer 111 and the first conducting layer 112. In some examples, the second conductive layer 122 may serve as for example the top select gate layer. As an option, one second dielectric layer 121 proximate to the substrate and one first dielectric layer 111 away from the substrate may be adjoined to increase the thickness of the dielectric layers, which, on one hand, can avoid short circuit due to direct contact between the second conductive layer 122 and the first channel layer 116; and on the other hand, allows the thickened dielectric layer to serve as the stop layer for subsequently etching the select gate structure 120.

In some examples, the channel hole 123 may have for example a profile similar to that of the storage channel structure 119. Optionally, in the direction parallel to the substrate, the maximum width (e.g., diameter) of the channel hole 123 proximate to the substrate is smaller than the maximum width (e.g., diameter) of the end of the storage channel structure 119 away from the substrate.

In some other examples, it is also possible to alternatively form a plurality of second dielectric layers 121 and a plurality of second conductive layers 122 on the stacked layers 110 to form the initial select gate structure 120', wherein the second dielectric layers 121 and the second conductive layers 122 are disposed in pair to extend from the side of the stacked layers 110 away from the substrate towards the direction away from the substrate.

In some examples, materials for the second dielectric layer 121 may be the same as that for the first dielectric layer 111, which may for instance both includes silicon oxide.

Figure 19C:
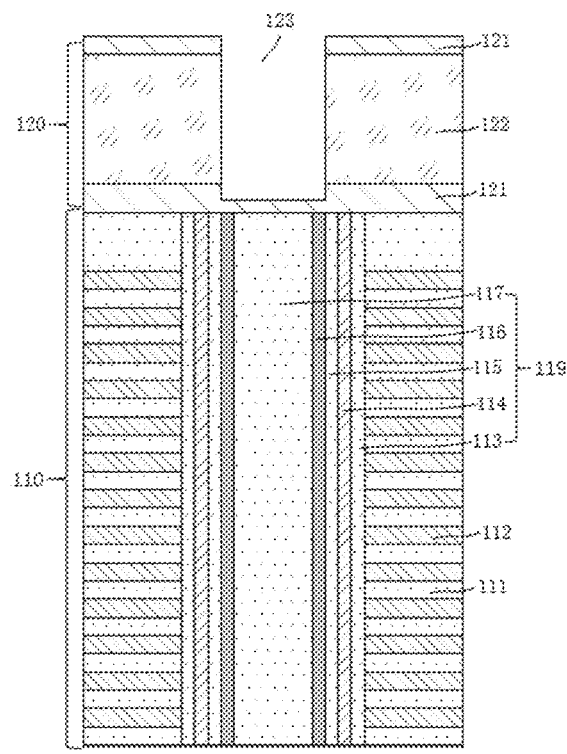

In some implementations, as shown in FIG. 19C, a channel hole 123 penetrating through the initial select gate structure 120' may be formed therein by suitable dry or wet etch process, wherein the initial select gate structure 120' formed with the channel hole 123 is the select gate structure 120. Optionally, in the extending direction of the storage channel structure 119 and the channel hole 123, the channel hole 123 and the storage channel structure 119 are aligned at least in part. Illustratively, the channel hole 123 may penetrate through the initial select gate structure 120' and extend into one second dielectric layer 121 in contact with the stacked layers 110.

In some other examples, the channel hole 123 may penetrate through one second dielectric layer 121 in contact with the stacked layers 110 and extend into the first dielectric core 117 that may serve as the stop layer for the channel hole 123.

In some examples, the channel hole 123 may have for example a profile similar to that of the storage channel structure 119. Considering profiles of the channel hole 123 and the storage channel structure 119 being cylinder as an example, in the direction parallel to the substrate, the diameter of the channel hole 123 in any direction parallel to the substrate is smaller than the diameter of the storage channel structure 119 in any direction parallel to the substrate.

Figure 19D:
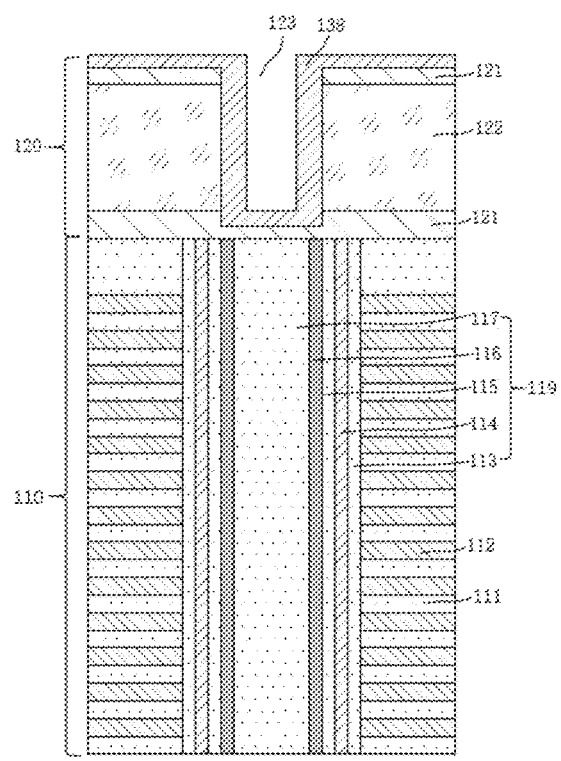
Figure 19E:
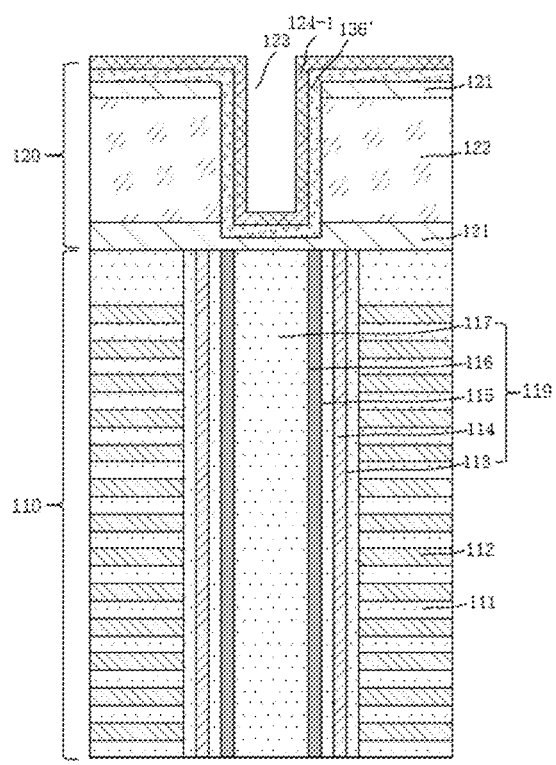
Figure 19F:
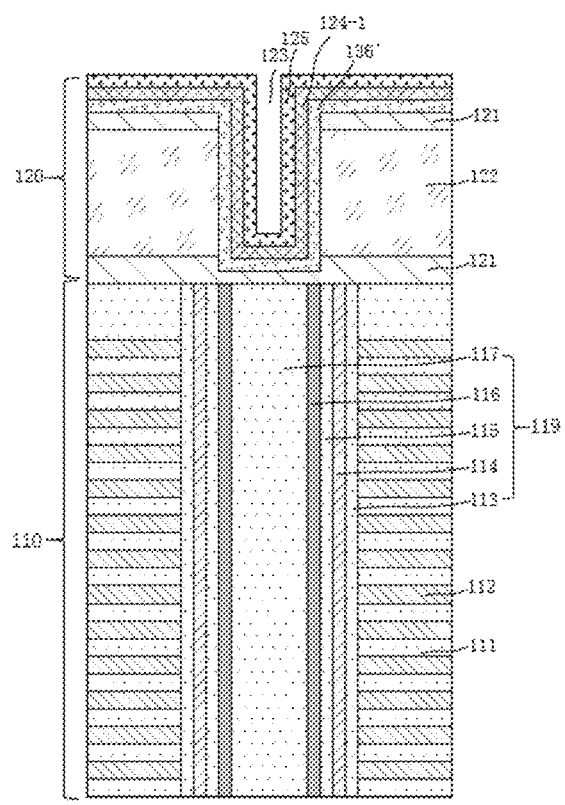
Figure 19G:
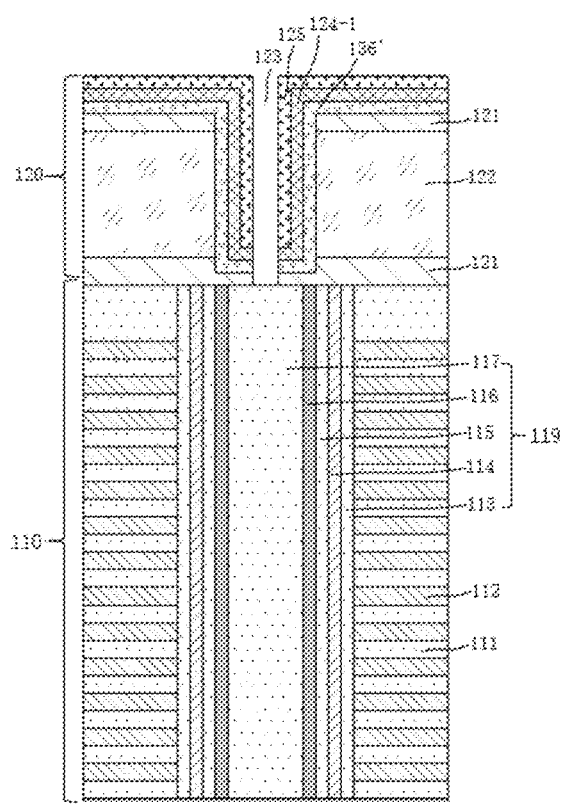
Figure 19H:
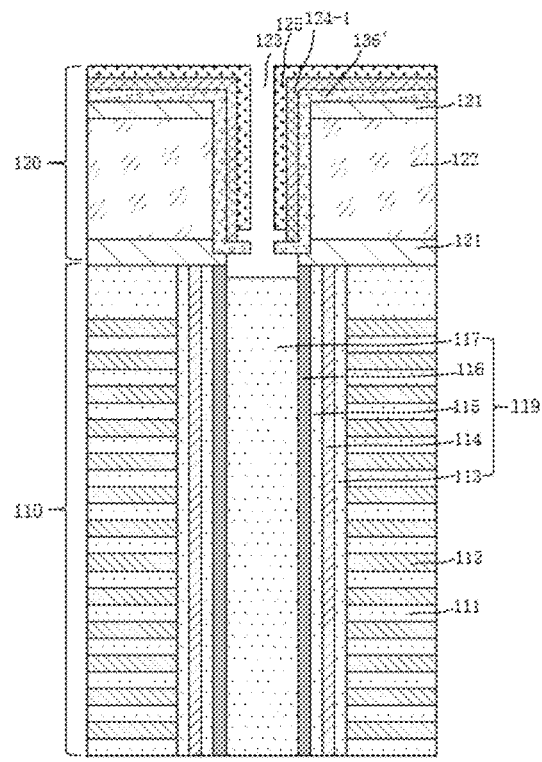
Figure 19I:
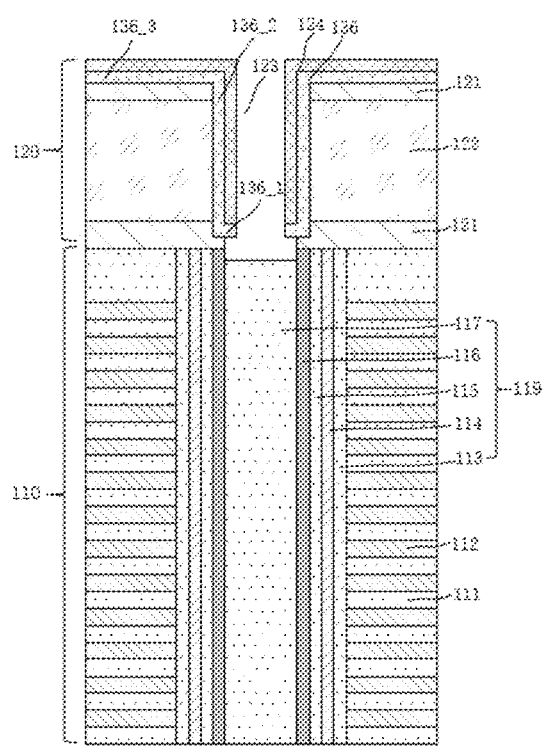

In some examples, referring to FIG. 19I, it is possible to form stacked block layer 136 and insulating layer 124 on the inner wall of the channel hole 123. Optionally, the block layer 136 may include a first block portion 136_1 at the end surface of the insulating layer 124 proximate to the substrate and a second block portion 136_2 at the end surface of the insulating layer 124 facing away from the second channel layer 126. As an option, in addition to the block layer 136, the three-dimensional memory device 800 further includes a third block portion 136_3 at the surface of the select gate structure 120 facing away from the substrate.

Figure 19J:
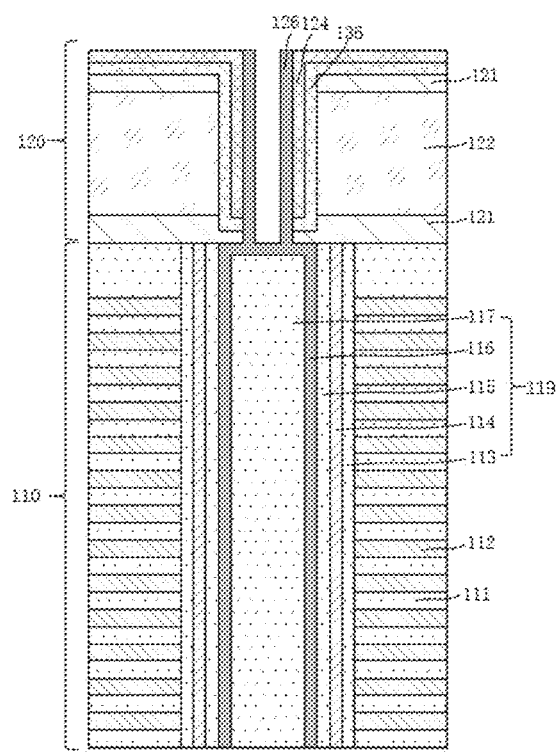

In some examples, referring to FIG. 19J, after forming the block layer 136 and the insulating layer 124, it is further possible to form a second channel layer 126 in contact with the first channel layer 116 on the surface of the insulating layer 124.

FIGS. 19D to 19I illustrate some schematic processes of forming the block layer 136 and the insulating layer 124. As shown in FIG. 19D, in some examples, it is possible to form a nitride layer 138 with a preset thickness on the inner wall of the channel hole 123 by using one or more thin film deposition processes such as ALD, CVD, PVD, any other suitable processes or any combinations thereof. Optionally, it is further possible to form the nitride layer 138 on the top surface of the select gate structure 120 away from the substrate.

As shown in FIG. 19E, in some examples, it is possible to oxidize a portion of the nitride layer 138 proximate to the inner wall of the channel hole 123 into the initial insulating layer 124-1 and oxidize the remainder of the nitride layer 138 into the initial block layer 136' via the exposed surface of the nitride layer 138 and in the thickness direction of the nitride layer 138.

In some implementations, the nitride layer 138 includes for example silicon nitride. It is possible to oxidize the portion of the nitride layer 138 exposed to thermal atmosphere such as hydrogen and oxygen into the initial insulating layer 124-1 such as silicon oxide by oxidation process such as in situ steam and oxidize the remainder of the nitride layer 138 into the initial block layer 136' such as silicon oxynitride at the same time. The oxidation process allows hydrogen and oxygen react in situ at the surface of the nitride layer 138 to form oxygen ions with positive valence that easily generate silicon oxynitride or silicon oxide while encountering silicon nitride with oxygen-nitrogen-oxygen structure.

Since the nitride layer 138 has a certain thickness, by controlling the duration of oxidation process such that oxygen ions diffused into the nitride layer 138 at different locations have different concentrations, for example, it is possible to make oxygen ions accepted by the portion that is to be oxidized into the initial insulating layer 124-1 have a concentration greater than that of the oxygen ions accepted by the remainder that is to be oxidized into the initial block layer 136', and thus the initial insulating layer 124-1 has a higher degree of oxidation.

In some other examples, it is possible to form an oxynitride layer (not shown) with a preset thickness on the inner wall of the channel hole 123 by using one or more thin film deposition processes such as ALD, CVD, PVD, any other suitable processes or any combinations thereof. Illustratively, the oxynitride layer includes for example silicon oxynitride. It is possible to oxidize the portion of the oxynitride layer exposed to thermal atmosphere such as hydrogen and oxygen into the initial insulating layer 124-1 such as silicon oxide by oxidation process such as in situ steam.

In some examples after forming the oxynitride layer, it is further possible to oxidize the portion of the oxynitride layer that is proximate to the inner wall of the channel hole 123 into the initial insulating layer 124-1, wherein, the remainder of the oxynitride layer may serve as the initial block layer 136'.

In some examples, as shown in FIG. 19I, after forming the initial insulating layer 124-1 and the initial block layer 136', it is possible to remove portions of the initial insulating layer 124-1 and the initial block layer 136' that are at the bottom of the channel hole 123 to form the insulating layer 124 and the block layer 136, respectively. Optionally, in the process of removing the portions of the initial insulating layer 124-1 and the initial block layer 136' that are at the bottom of the channel hole 123, it is further possible to remove a portion of the first dielectric core 117 to expose the first channel layer 116 in a direction away from the substrate.

With continued reference to FIG. 19J, after exposing the first channel layer 116, it is possible to form a second channel layer 126 in contact with the exposed first channel layer 116 on the surface of the insulating layer 124 and the remainder of the first dielectric core 117.

FIGS. 19F to 19I illustrate some schematic processes of processing the initial insulating layer 124-1 and the initial block layer 136' into the insulating layer 124 and the block layer 136, respectively. As shown in FIG. 19F, a sacrificial layer 125 may be formed on the surface of the initial insulating layer 124-1. Illustratively, it is possible to deposit any suitable sacrificial materials on the surface of the initial insulating layer 124-1 by using one or more thin film deposition processes such as ALD, CVD, PVD, any other suitable processes or any combinations thereof to form the sacrificial layer 125.

In some implementations, as shown in FIG. 19G, it is possible to remove first portions of the sacrificial layer 125, the initial insulating layer 124-1 and the initial block layer 136' that are at the bottom of the channel hole 123 successively by anisotropic dry etch process. In some examples, in the process of removing the first portions of the sacrificial layer 125, the initial insulating layer 124-1 and the initial block layer 136' that are at the bottom of the channel hole 123, it is further possible to further remove a portion of one second dielectric layer 121 in contact with the select gate structure 120 that is at the bottom of the channel hole 123, thereby exposing at least partial surface of the first dielectric core 117 away from the substrate 101.

In some implementations, as shown in FIG. 19H, it is possible to remove a second portion of the initial insulating layer 124-1 that is at the bottom of the channel hole 123 by for example anisotropic dry etch process. Specifically, it is possible to remove the second portion of the initial insulating layer 124-1 that is between the initial block layer 136' and the sacrificial layer 125 via the channel hole 123, thereby forming the insulating layer 124 by removing a portion of the initial insulating layer 124-1 that is at the bottom of the channel hole 123. Optionally, it is further possible to remove a portion of the first dielectric core 117 away from the substrate, thereby exposing the portion of the first channel layer 116 away from the substrate 101.

Optionally, in an example in which the first dielectric core 117, the initial insulating layer 124-1 and the one second dielectric layer 121 in contact with the select gate structure 120 include the same material such as silicon oxide, it is possible to remove at the same time the portion of the initial insulating layer 124-1 at the bottom of the channel hole, the portion of the second dielectric layer 121 at the bottom of the channel hole 123 and the portion of the first dielectric core 117 away from the substrate by the same etching process.

Optionally, the sacrificial layer 125 and the initial insulating layer 124-1 may include different materials such that they have difference in etch selection. For example, the sacrificial layer 125 may include silicon oxynitride, and the insulating layer 124 may include silicon oxide. Therefore, in the process of removing a portion of the initial insulating layer 124-1 that is at the bottom of the channel hole 123, the sacrificial layer 125 may serve as the etch protection layer to protect the insulating layer 124 on sidewall of the channel hole 123 from damaging.

In some implementations, as shown in FIG. 19I, it is possible to further remove the remainder of the sacrificial layer 125 by for example anisotropic dry etch process to expose the insulating layer 124. In some examples in which the sacrificial layer and the initial block layer 136' include the same material, in the process of removing the remainder of the sacrificial layer 125, it is possible to further remove yet another portion of the initial block layer 136' in the radial direction of the channel hole 123 along the sidewall of the channel hole 123, thereby forming the block layer 136. after the above processes, the channel hole 123 may have a relatively flat sidewall. In some examples, in the process of removing the remainder of the sacrificial layer 125, it is possible to further remove yet another portion of the first dielectric core 117 away from the substrate 101, thereby increasing the exposed area of the first channel layer 116.

With continued reference to FIG. 19I, in some examples, in the plane formed by any direction parallel to the substrate and the extending direction of the select channel structure 129, the third block portion 136_3, the second block portion 136_2 and the first block portion 136_1 are generally distributed as letter "z", thereby reducing diffusion of impurity such as boron atoms in the second conductive layer 122 into the insulating layer 124 in various directions.

The block layer 136 provided in the present implementation may be located between the second conductive layer 122 and the insulating layer 124, and can effectively block conductive particles doped in the semiconductor layer 101' (e.g., boron atoms) from diffusing towards the insulating layer 124, which on the one hand can increase the doping concentration of the second conductive layer 122, thereby increasing the conductivity of the second conductive layer 122; and on the other hand can reduce the diffusion concentration of impurity such as boron atoms in the insulating layer 124, thereby reducing influence of impurity on reliability of the TSG transistors.

In the example in which the material for the block layer 136 includes for example silicon oxynitride, the nitrogen content in the block layer 136 is in negative correlation with the content of impurity such as boron atoms diffused in the insulating layer 124.

In some examples, as shown in FIG. 19J, it is possible to form the second channel layer 126 in contact with the exposed portion of the first channel layer 116 on the portion of the insulating layer 124 that is on the sidewall of the channel hole 123 and the exposed portion of the first dielectric layer 117 by using one or more thin film deposition processes such as ALD, CVD, PVD, any other suitable processes or any combinations thereof. Optionally, the second channel layer 126 may be lightly P-doped to form the doped second channel layer 126.

In case that the second channel layer 126 and the first channel layer 116 include the same material, it may be difficult to distinguish the interface where the second channel layer 126 contacts the first channel layer 116, such that the second channel layer 126 and the first channel layer 116 form an integral structure.

With the method 930 according to some implementations of the present disclosure, on the one hand, it is possible to form the first channel layer 116 and the second channel layer 126 by two processes such that the two channel layers have uniform thickness; and on the other hand, the first channel layer 116 can contact and connect with the second channel layer 126 directly, thereby avoiding introduction of the channel plug and mitigating the problem of programming interference.

Figure 19K:
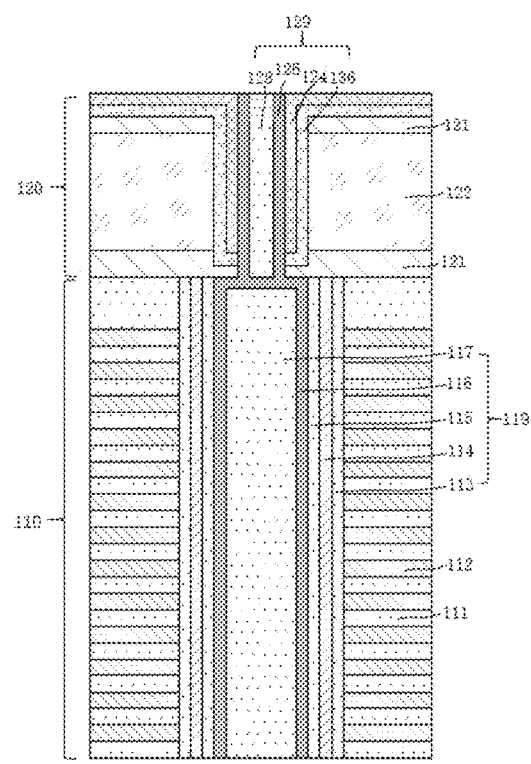

In some implementations, as shown in FIG. 19K, it is possible to form the second dielectric core 128 in at least portion of the space defined by the second channel layer 126, thereby forming the select channel structure 129. During the operation of the three-dimensional memory device, the select channel structure 129 is controlled by for example the top select gate (e.g., the second conductive layer 122). Illustratively, it is possible to form the second dielectric core 128 in the space defined by the second channel layer 126 by using a deposition process such as ALD, CVD, PVD, any other suitable process or any combinations thereof. As an option, the material for the second dielectric core 128 may be the same as that for the first dielectric core 117.

In some implementations, the select channel structure 129 may have for example a profile similar to that of the storage channel structure 119. Optionally, the select channel structure 129 and the storage channel structure 119 may both include the pillar shape. In some examples, in the direction parallel to the substrate, the diameter of the select channel structure 129 at any place is smaller than that of the storage channel structure 119 at any place.

Figure 19L:
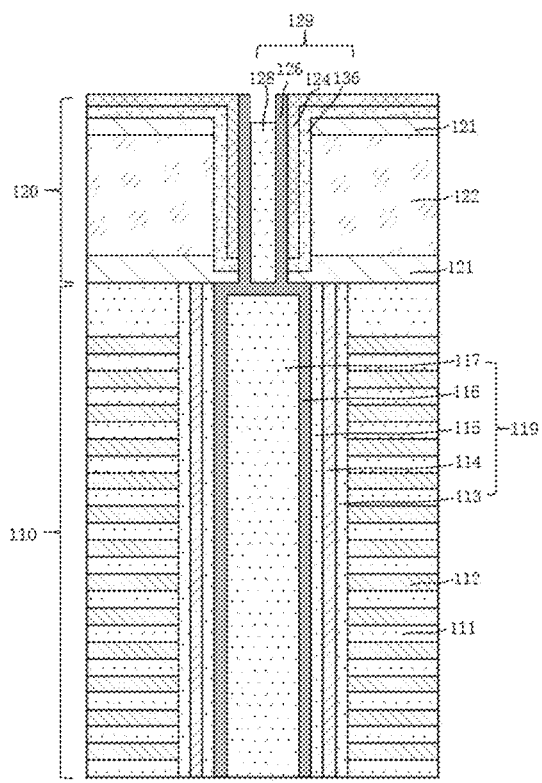
Figure 19M:
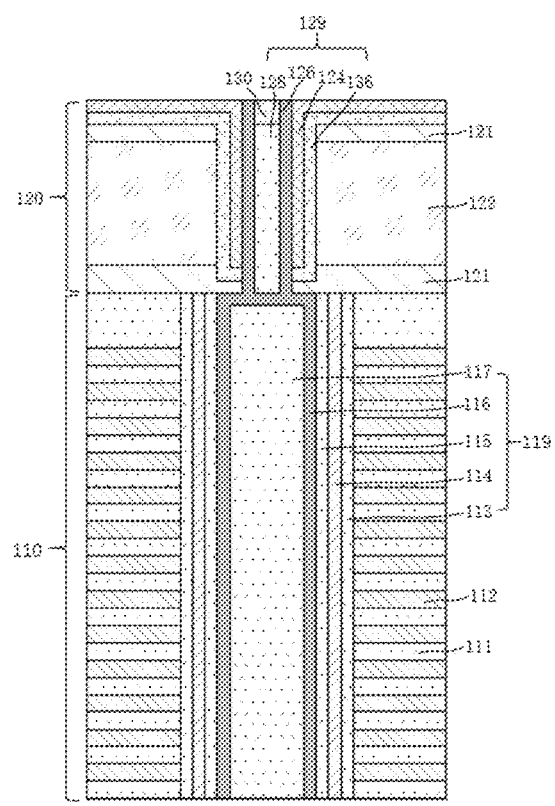

In some implementations, as shown in FIG. 19M, an electrode plug 130 in contact with the second channel layer 126 may be formed at the end of the select channel structure 129 away from the substrate. Illustratively, as shown in FIG. 19L, it is possible to remove a portion of the second dielectric core 128 away from the substrate by suitable etch process, and then form an electrode plug 130 as shown in FIG. 19M on the surface of the second dielectric core 128 away from the substrate by using a deposition process such as ALD, CVD, PVD or any combinations thereof. In some examples, the electrode plug 130 may further serve as a portion of the drain of the corresponding memory cell string.

In some implementations, it is possible to remove the substrate in suitable operations after forming the select channel structure 129, and then for example, form the semiconductor layer 101' as shown in FIG. 17 on the stacked layers 110 after removing the substrate. The semiconductor layer 101' may be for example in contact with the first channel layer 116 and electrically connect the first channel layers 116 of the respective storage channel structures 119.

In some implementations, it is further possible to form the top select gate cut line 132 as shown in FIG. 17 in the select gate structure 120 in suitable operations, for example after forming the select channel structure 129.

Since the contents and structures involved in the forgoing description of the three-dimensional memory device 800 may be fully or partially suitable to the same or similar structures involved in the description of the manufacturing method 930 of three-dimensional memory device herein, no repetition will be made to the related or similar description.

The description above is only for the purpose of explaining implementations and technical principles of the present disclosure. It will be appreciated by those skilled in the art that the scope claimed by the present disclosure is not limited to technical solutions composed of particular combinations of the above-mentioned technical features, and instead will cover any other technical solutions composed of any combinations of the above-mentioned features and their equivalents without departing from the present technical concept. For example, technical solutions resulted from substitutions of the above-mentioned features by technical features of similar functions (including, but not limited to, those disclosed in the present disclosure) still fall within the scope of the present disclosure.

What is claimed is:

1. A three-dimensional memory device, comprising:
   a plurality of stacked layers;
   a storage channel structure vertically penetrating the stacked layers and comprising a first channel layer;
   a select gate structure on the plurality of stacked layers and comprising a conductive layer sandwiched between two dielectric layers; and
   a select channel structure vertically penetrating the select gate structure and comprising a second channel layer.

2. The memory device of claim 1, wherein the select channel structure further comprises:
   a block layer between the second channel layer and the conductive layer of the select gate structure;
   wherein a thickness of the conductive layer is equal to a length of the block layer in a vertical direction.

3. The memory device of claim 2, wherein the block layer comprises silicon oxynitride.

4. The memory device of claim 2, wherein the select channel structure further comprising:
   a dielectric core horizontally surrounded by the second channel layer; and
   an insulating layer located between the block layer and the second channel layer.

5. The memory device of claim 1, further comprising:
   a channel plug in an upper portion of the storage channel structure and interconnecting with the first channel layer and the second channel layer;
   wherein a lower end of second channel layer extends into the channel plug.

6. The memory device of claim 1, wherein the conductive layer comprises one of polysilicon, doped polysilicon, and metal silicide.

7. The memory device of claim 6, wherein the doped polysilicon comprises boron doped polysilicon.

8. A memory system, comprising:
   a three-dimensional memory device configured to store data and comprising:
   a plurality of stacked layers,
   a storage channel structure vertically penetrating the stacked layers and comprising a first channel layer, a select gate structure located on the plurality of stacked layers and comprising a conductive layer sandwiched between two dielectric layers, and a select channel structure vertically penetrating the select gate structure and comprising a second channel layer; and a memory controller coupled to the three-dimensional memory device and configured to control the three-dimensional memory device.

9. The memory system of claim 8, wherein the select channel structure further comprises:

a block layer between the second channel layer and the conductive layer of the select gate structure, wherein a thickness of the conductive layer is equal to a length of the block layer in a vertical direction; and an insulating layer located between the block layer and the second channel layer.

10. The memory device of claim 8, further comprising:

a channel plug in an upper portion of the storage channel structure and interconnecting with the first channel layer and the second channel layer; and a dielectric core in the select channel structure and horizontally surrounded by the second channel layer.

11. A method for forming a three-dimensional memory device, comprising:

forming a plurality of stacked layers;

forming a storage channel structure vertically penetrating through the stacked layers and comprising a first channel layer; and forming a select gate structure on the plurality of stacked layers and comprising a conductive layer sandwiched between two dielectric layers; and forming a select channel structure vertically penetrating the select gate structure and comprising a second channel layer.

12. The method of claim 11, wherein:

forming the plurality of stacked layers comprises alternatively forming a plurality of conductive stack layers and dielectric stack layers; and forming the select gate structure comprises:

forming a lower one of the two dielectric layers on the plurality of stacked layers, forming the conductive layer on the lower one of the two dielectric layers, and forming an upper one of the two dielectric layers on the conductive layer;

wherein a material of the conductive layer is different from a material of the conductive stack layers.

13. The method of claim 12, further comprising:

before forming the select gate structure, forming a channel plug in an upper portion of the storage channel structure and in contact with the first channel layer.

14. The method of claim 13, wherein forming the select channel structure comprises:

forming a select channel hole in the select gate structure to expose the channel plug; and converting a portion of the conductive layer exposed by the select channel hole into a block layer.

15. The method of claim 14, wherein converting the portion of the conductive layer comprises:

applying a nitriding process to the portion of the conductive layer exposed by the select channel hole, such that a formed nitride layer on a sidewall of the select channel hole forms the block layer.

16. The method of claim 15, wherein applying the nitriding process comprises:

introducing a nitrogen-containing gas comprising at least one of $NH_3$, NO, $N_2O$, $N_2$.

17. The method of claim 14, wherein forming the select channel structure further comprises:

forming an insulating layer on a sidewall and a bottom surface of the channel hole to cover the block layer and the channel plug;

forming a sacrificial layer covering the insulating layer;

removing portions of the sacrificial layer and the insulating layer that are located on a bottom of the select channel hole to expose the channel plug.

18. The method of claim 17, wherein forming the select channel structure further comprises:

removing the sacrificial layer to expose the block layer; and forming the second channel layer in the select channel hole to cover the block layer and to contact the exposed channel plug.

19. The method of claim 18, forming the select channel structure further comprises:

forming a dielectric core in the select channel hole and horizontally surrounded by the second channel layer.

20. The method claim 19, forming the select channel structure further comprises:

removing an upper portion of the dielectric core to form a recess; and forming an electrode plug in the recess and horizontally surrounded by the second channel layer.

* * * * *